US012783107B2

(12) United States Patent
Gao et al.

(10) Patent No.: US 12,783,107 B2
(45) Date of Patent: Nov. 3, 2026

(54) INTERFACE DISPLAY METHOD AND ELECTRONIC DEVICE

(71) Applicant: Honor Device Co., Ltd., Shenzhen (CN)

(72) Inventors: Wei Gao, Shenzhen (CN); Menglong Xiao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 236 days.

(21) Appl. No.: 18/841,192

(22) PCT Filed: Aug. 15, 2023

(86) PCT No.: PCT/CN2023/112997
§ 371 (c)(1),
(2) Date: Aug. 23, 2024

(87) PCT Pub. No.: WO2024/087808
PCT Pub. Date: May 2, 2024

(65) Prior Publication Data

US 2025/0190095 A1    Jun. 12, 2025

(30) Foreign Application Priority Data

Oct. 26, 2022 (CN) ......................... 202211319415.6

(51) Int. Cl.
*G06F 3/0484* (2022.01)
*G06F 3/04817* (2022.01)
*G06F 3/0482* (2013.01)

(52) U.S. Cl.
CPC ........ *G06F 3/0484* (2013.01); *G06F 3/04817* (2013.01); *G06F 3/0482* (2013.01)

(58) Field of Classification Search
None
See application file for complete search history.

(56) References Cited

U.S. PATENT DOCUMENTS 12,360,656 B2 * 7/2025 Kang .................. G06F 3/04842
2010/0011285 A1 * 1/2010 Kawata ................. G06F 3/1454
715/246

(Continued)

FOREIGN PATENT DOCUMENTS

CN 104142798 A 11/2014
CN 110750317 A 2/2020

(Continued)

*Primary Examiner* — Toan H Vu
(74) *Attorney, Agent, or Firm* — Leydig, Voit & Mayer, Ltd.

(57) ABSTRACT

This application relates to the technical field of terminals, and provides an interface display method and an electronic device. The method includes: displaying a first interface; displaying a second interface in response to a first switching operation performed on the first interface; displaying a third interface at a first time point in response to an operation of entering a desktop editing mode, where the third interface is an interface of the first interface in the desktop editing mode, and the electronic device was not connected to a network since first power-on to the first time point; and exiting the desktop editing mode, connecting to a network, and then displaying a fourth interface at a second time point in response to the operation of entering the desktop editing mode, where the fourth interface is an interface of the second interface in the desktop editing mode.

18 Claims, 59 Drawing Sheets

(56) References Cited

U.S. PATENT DOCUMENTS

| | | | | |
|---|---|---|---|---|
| 2012/0023407 | A1* | 1/2012 | Taylor | G06F 3/04842<br>715/731 |
| 2013/0021379 | A1* | 1/2013 | Sirpal | G06F 3/0483<br>345/659 |
| 2016/0147434 | A1* | 5/2016 | Lee | G06F 3/0482<br>715/838 |
| 2017/0038955 | A1* | 2/2017 | Zhao | G06F 3/04883 |
| 2017/0060390 | A1* | 3/2017 | Hashimoto | G06F 40/169 |
| 2020/0042268 | A1* | 2/2020 | Kim | G06F 3/04886 |
| 2020/0333994 | A1* | 10/2020 | Sepulveda | G06F 3/0488 |
| 2020/0356252 | A1* | 11/2020 | Ko | G06F 1/163 |
| 2020/0409534 | A1* | 12/2020 | Xia | G06F 3/04817 |
| 2024/0176628 | A1 | 5/2024 | Yang et al. | |

FOREIGN PATENT DOCUMENTS

| | | | |
|---|---|---|---|
| CN | 110879679 | A | 3/2020 |
| CN | 113986070 | A | 1/2022 |
| CN | 115033140 | A | 9/2022 |
| EP | 4283454 | A1 | 11/2023 |
| WO | 2022068862 | A1 | 4/2022 |

* cited by examiner

CONT. FROM FIG. 1D

TO FIG. 1F

CONT. FROM FIG. 1C

CONT. FROM FIG. 1E

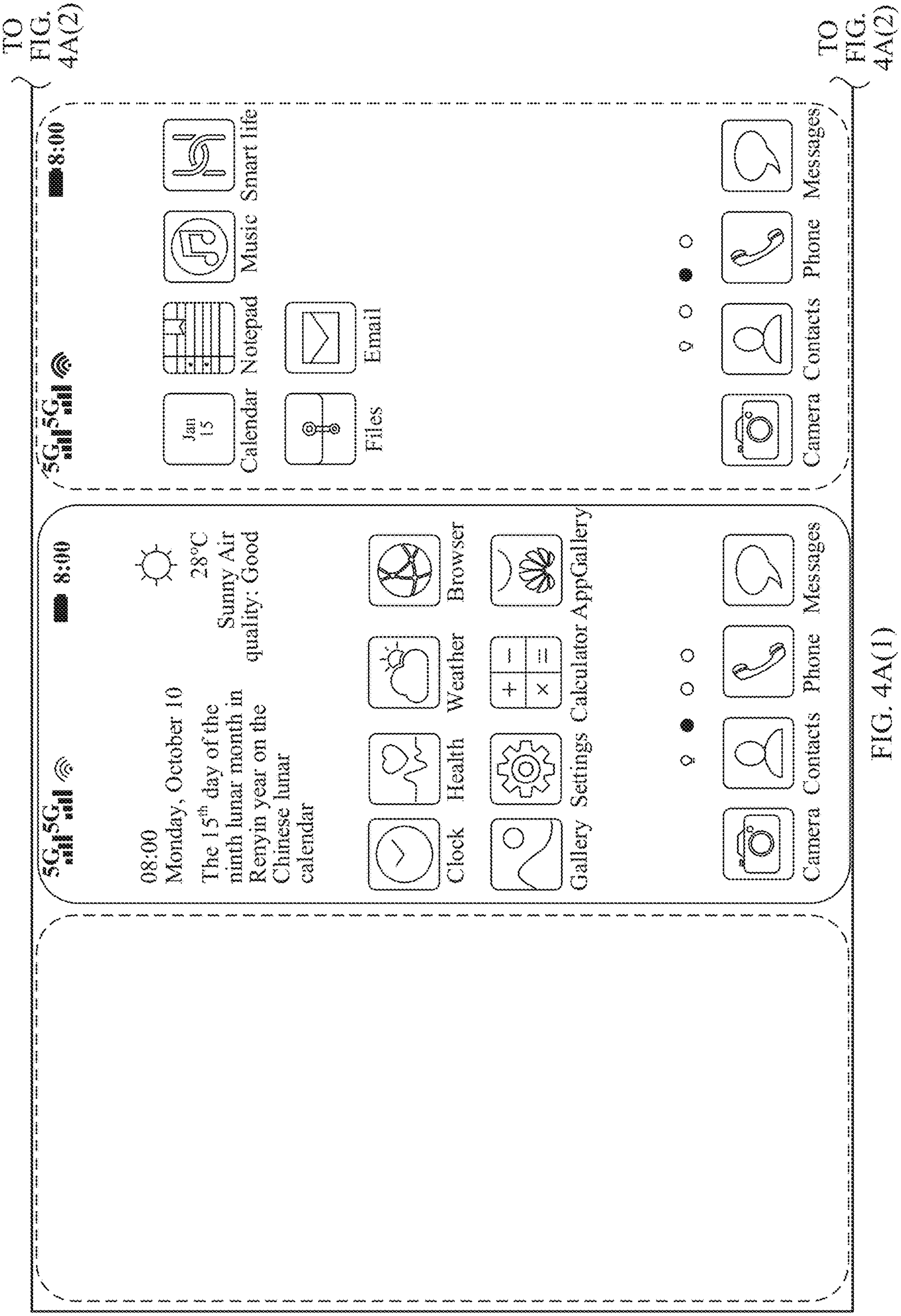
FIG. 4A(1)

CONT. FROM FIG. 4A(1)
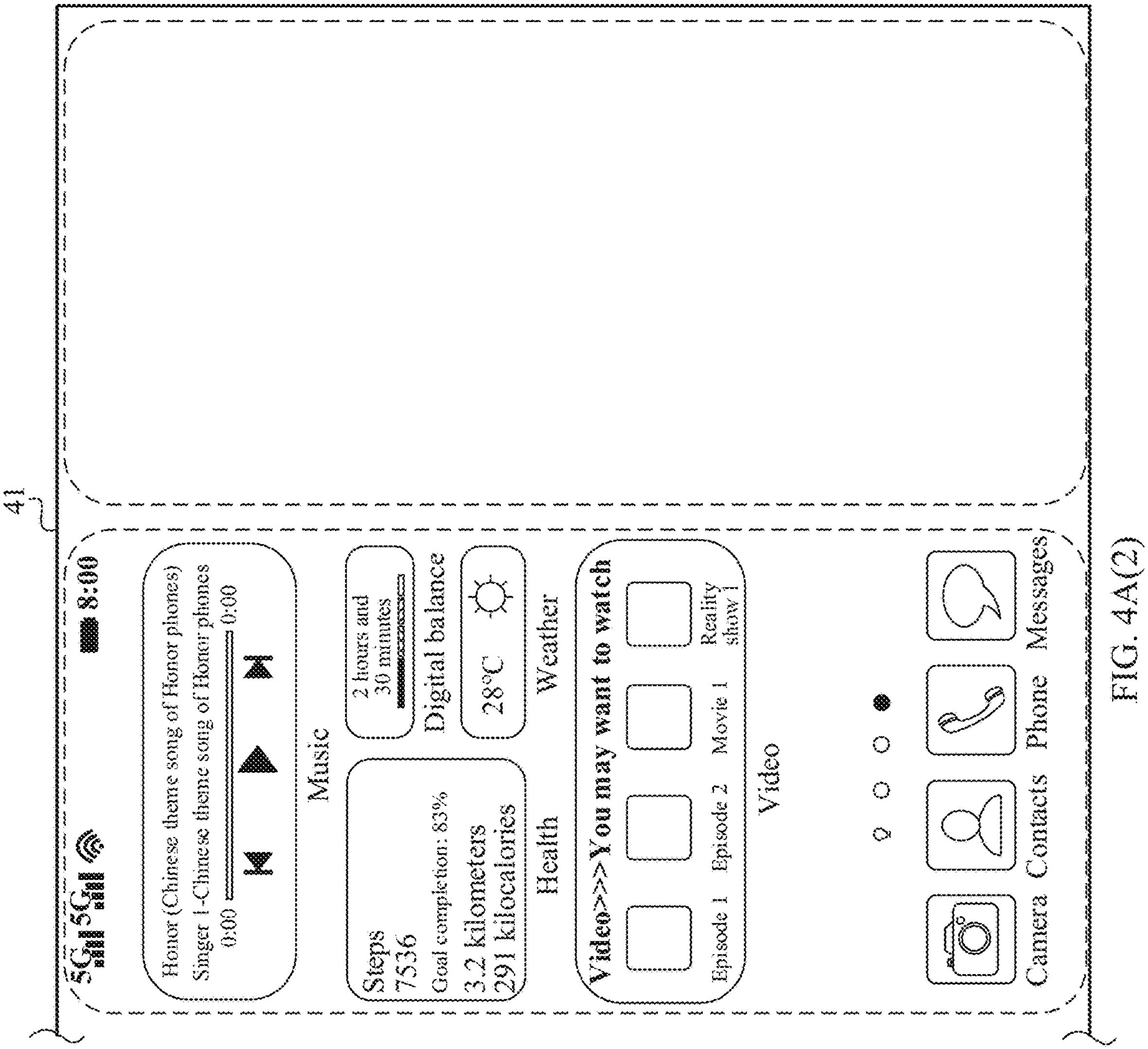
CONT. FROM FIG. 4A(1)
FIG. 4A(2)

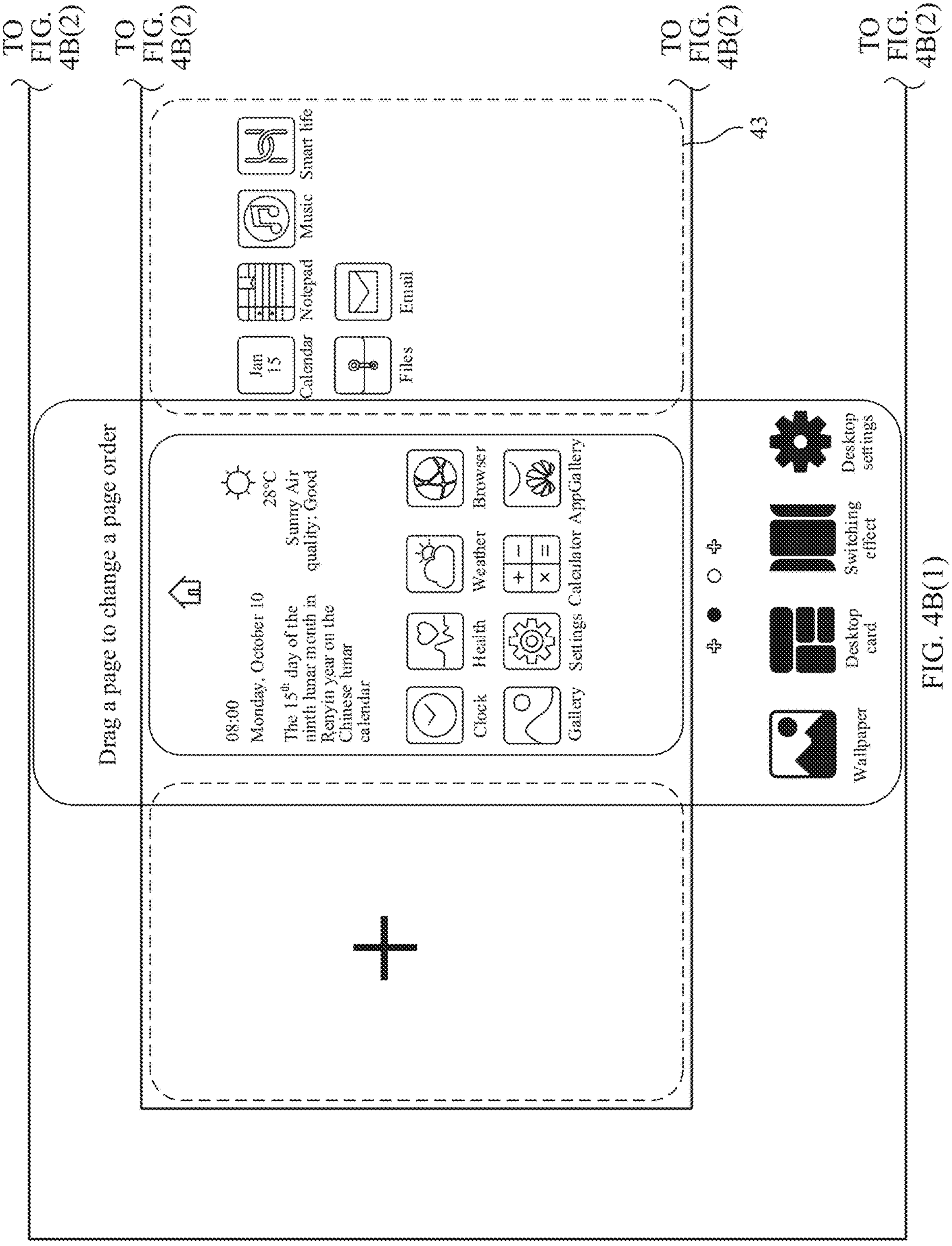
FIG. 4B(1)

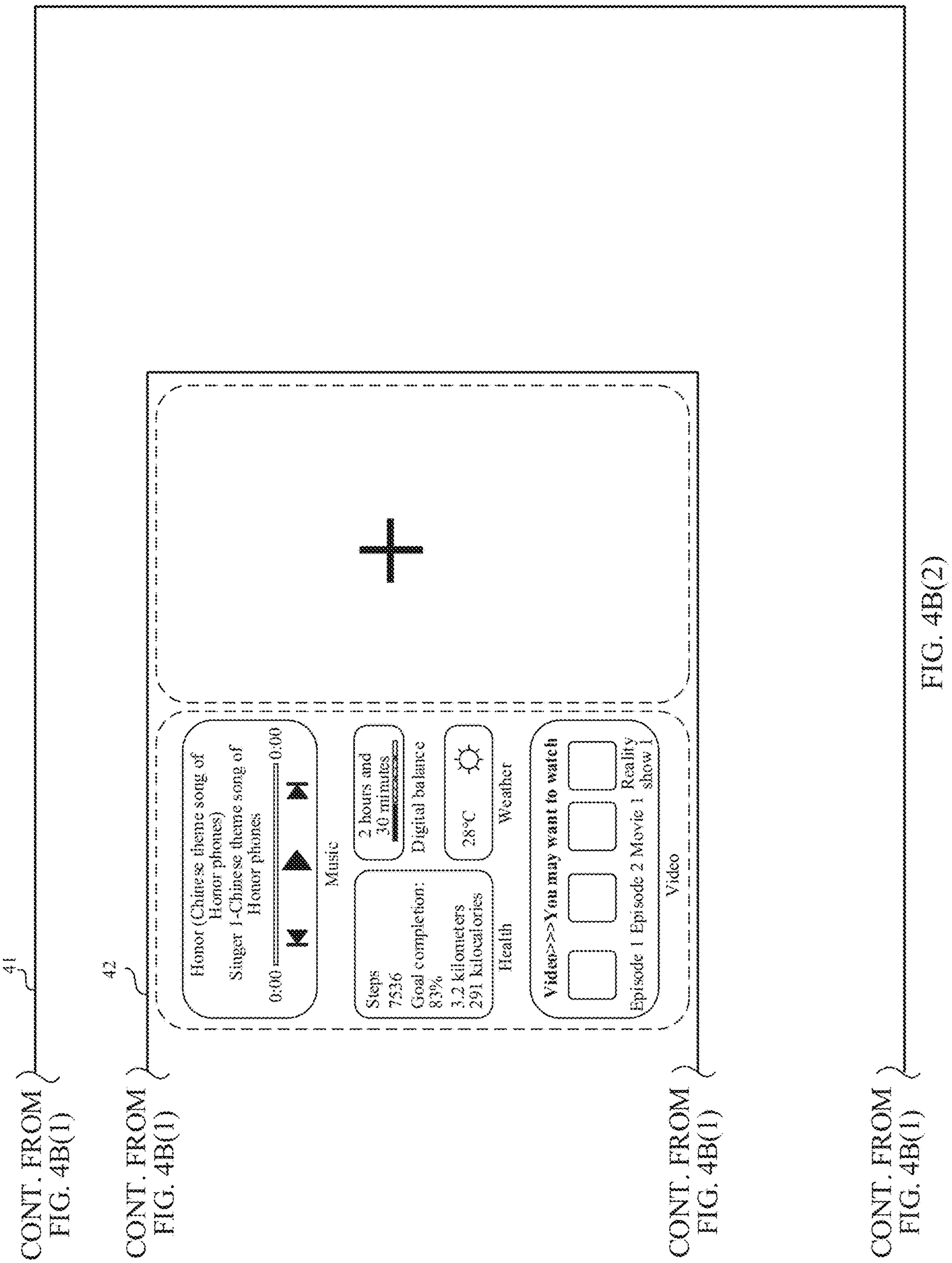
FIG. 4B(2)

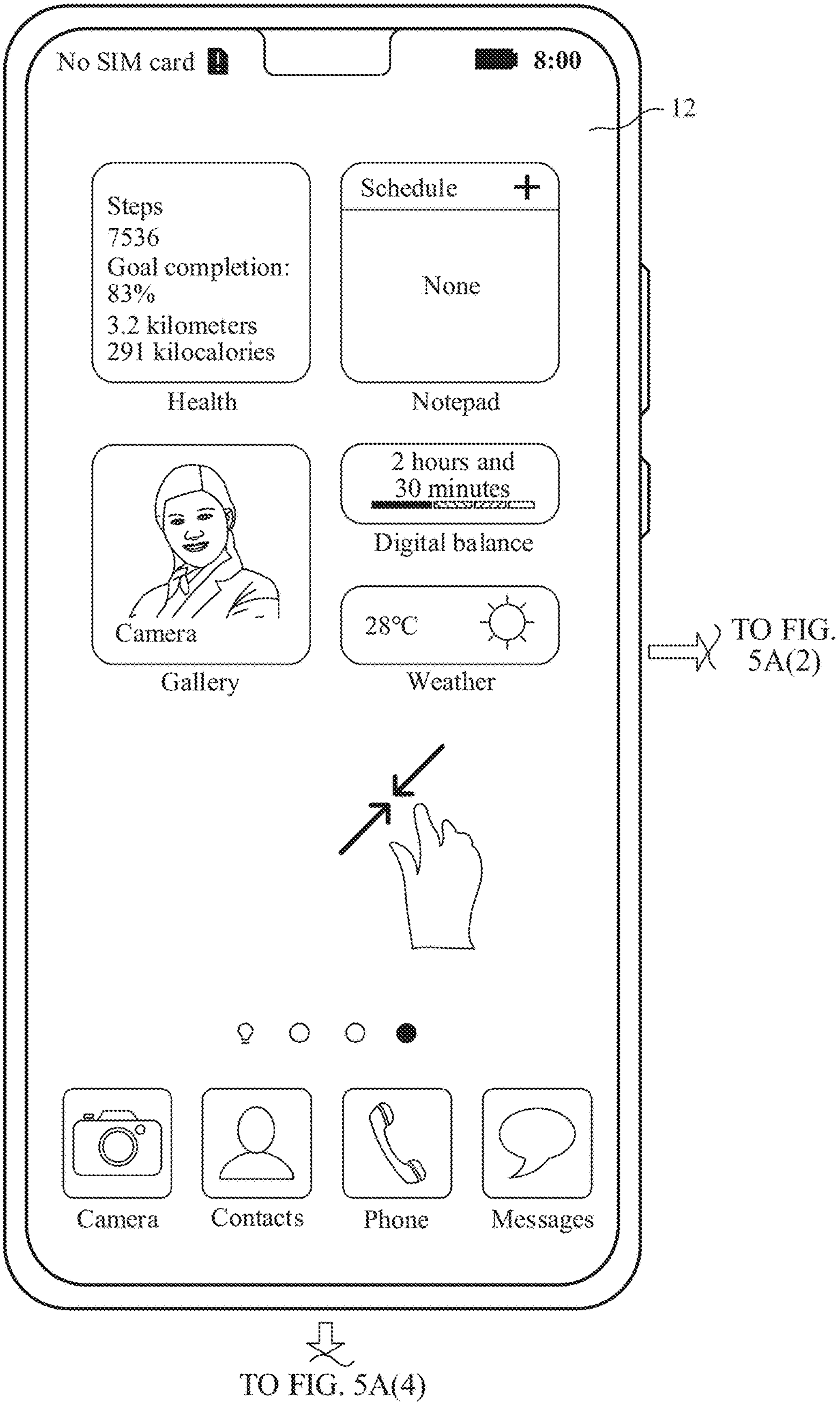
FIG. 5A(1)

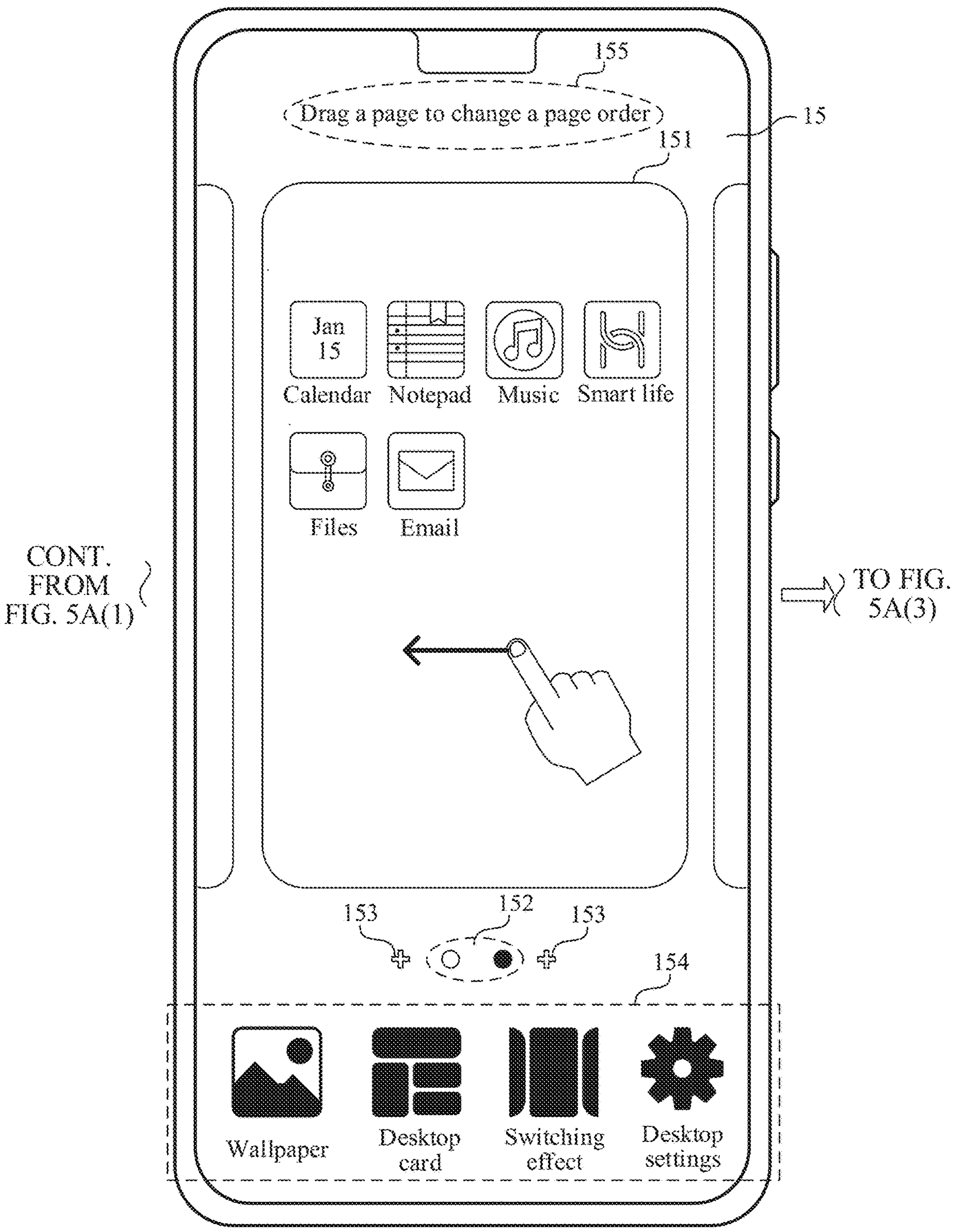
FIG. 5A(2)

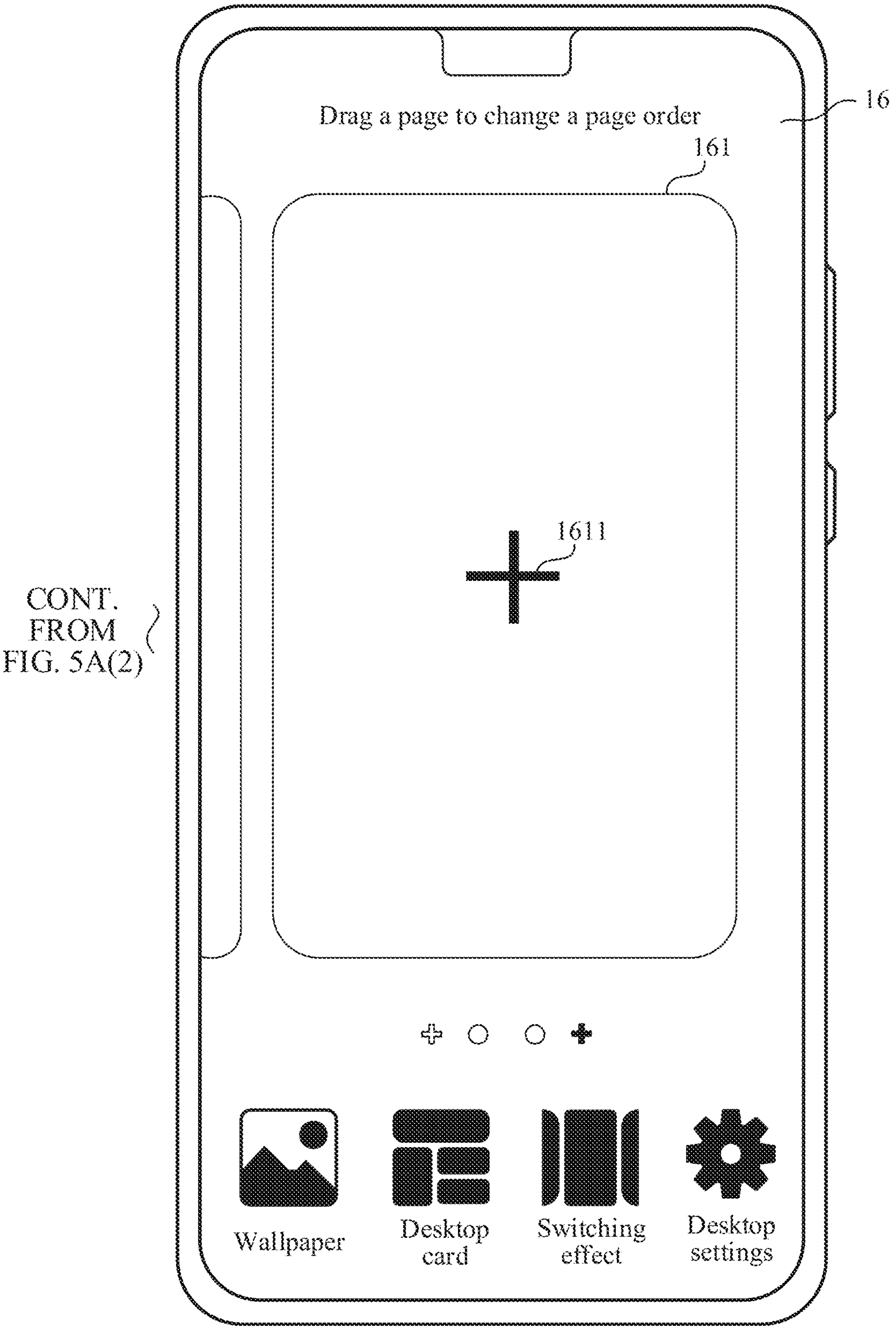
FIG. 5A(3)

CONT. FROM
FIG. 5A(1)
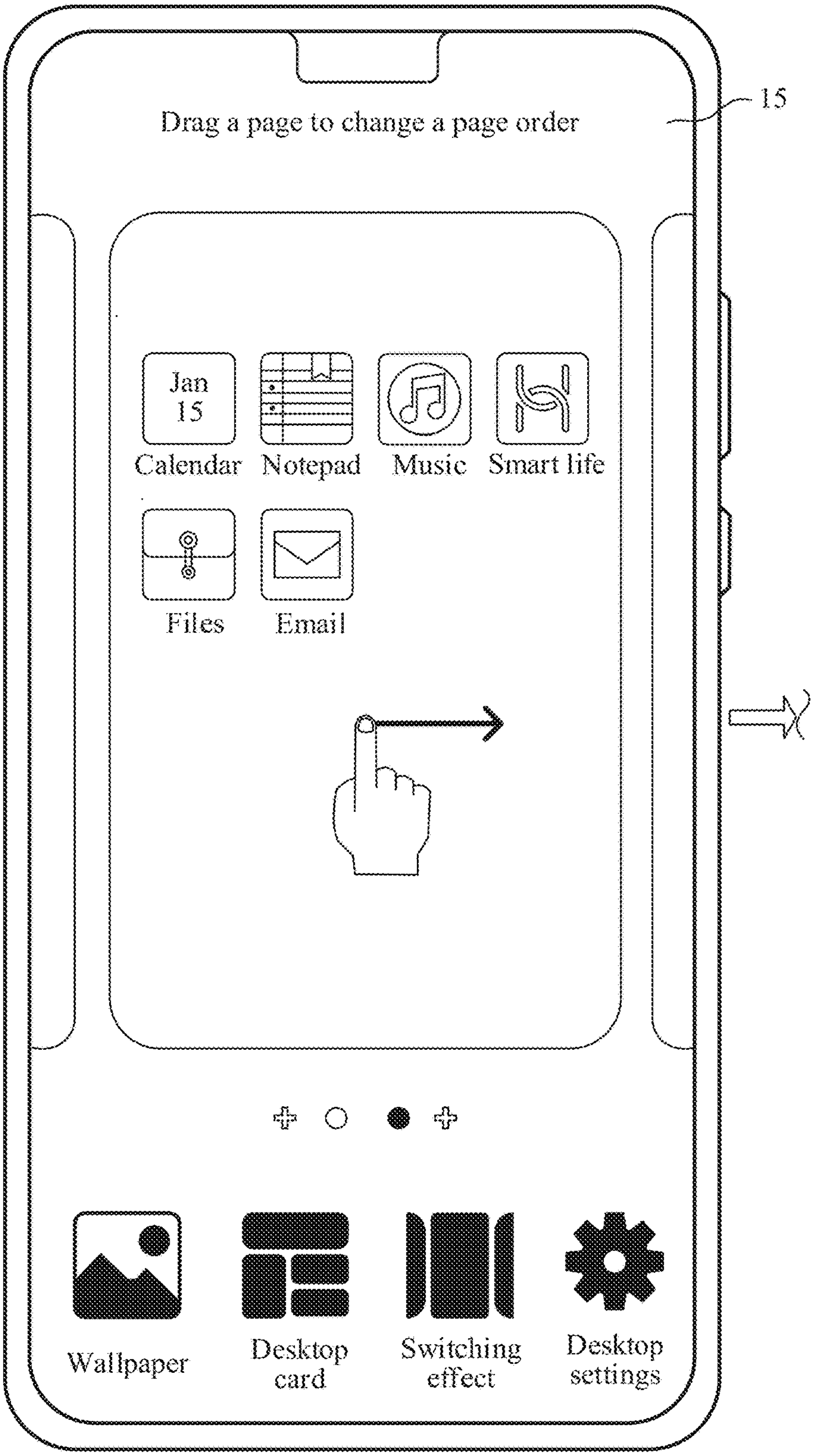
TO FIG.
5A(5)
FIG. 5A(4)

CONT. FROM FIG. 5A(4)
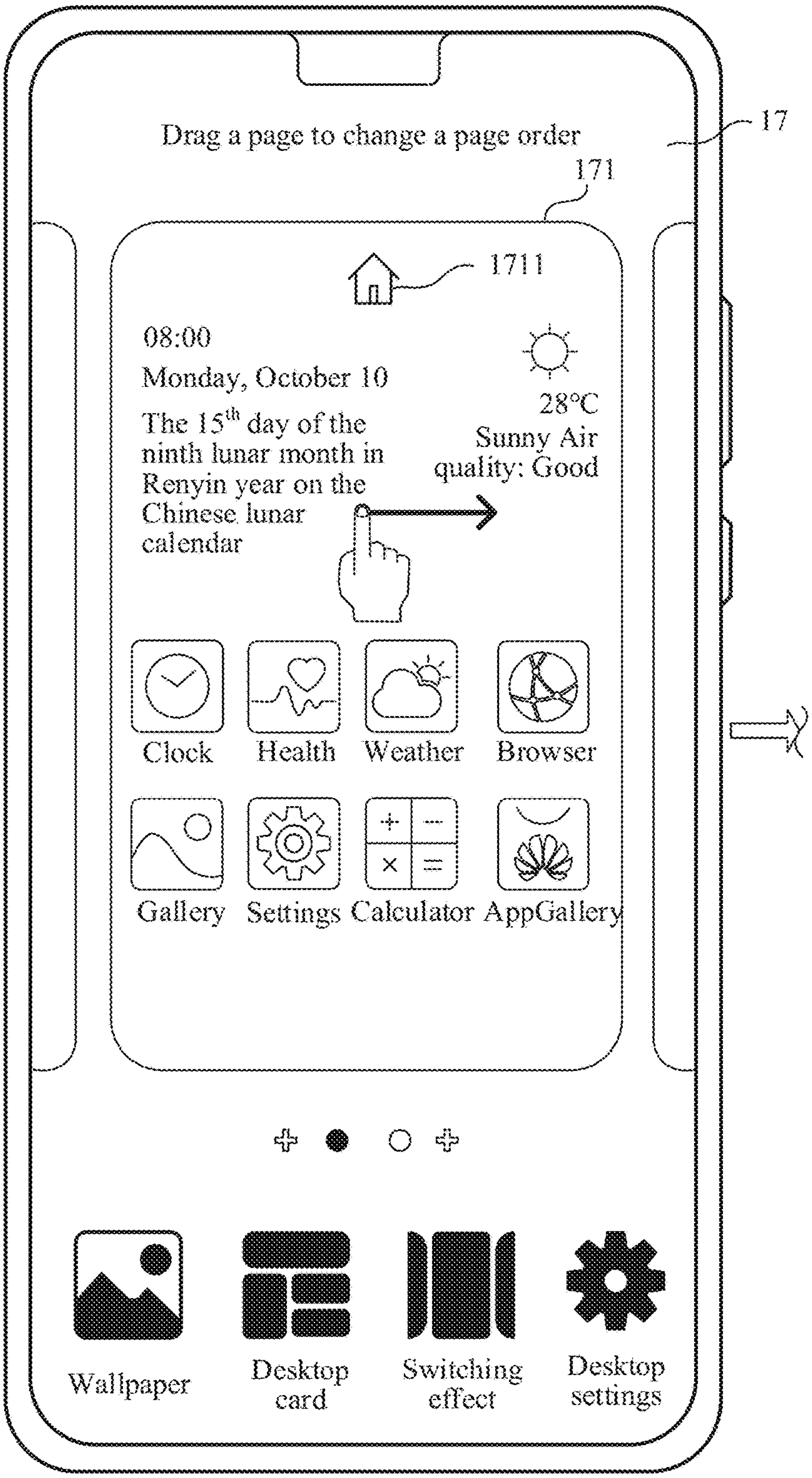
TO FIG. 5A(6)
FIG. 5A(5)

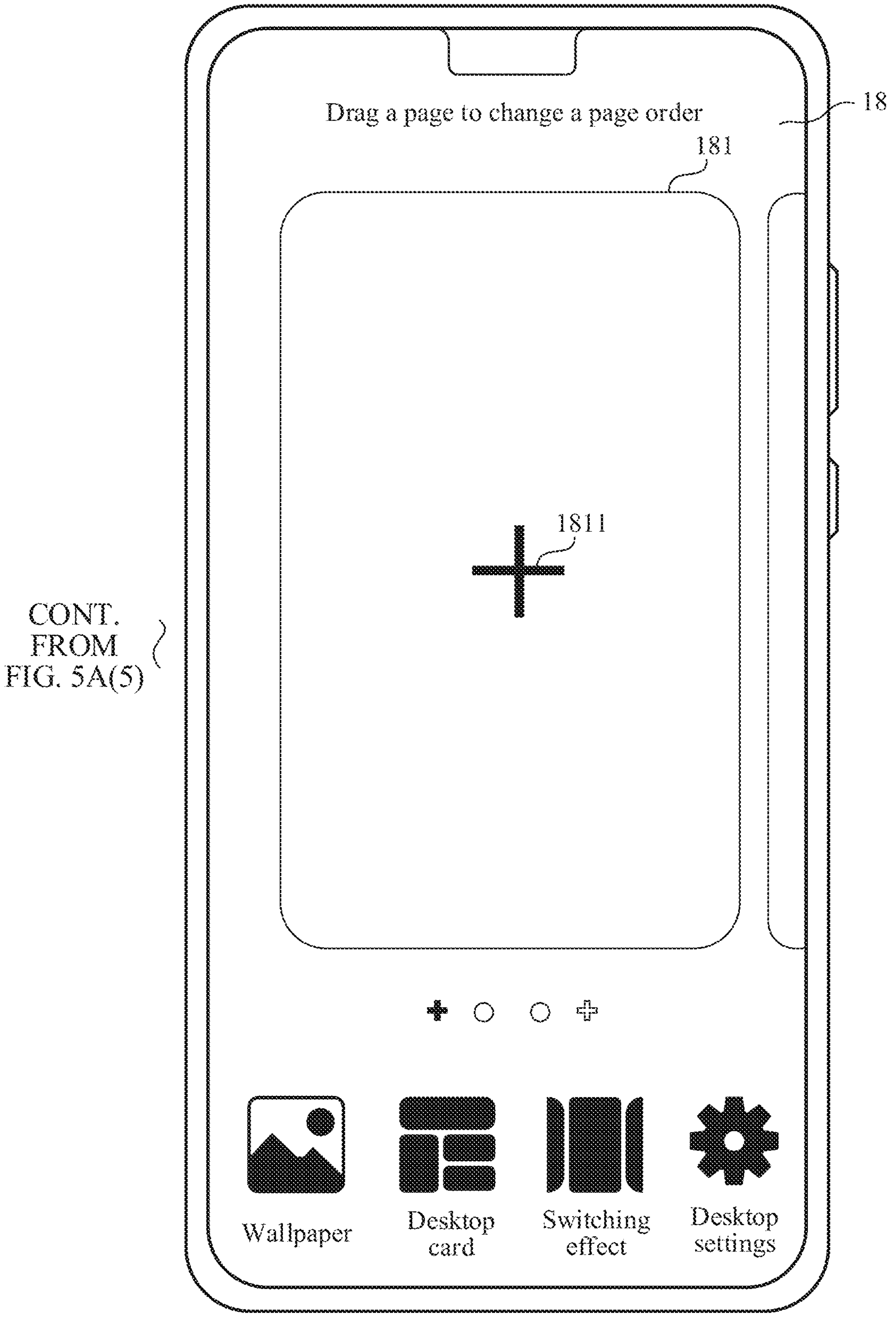
FIG. 5A(6)

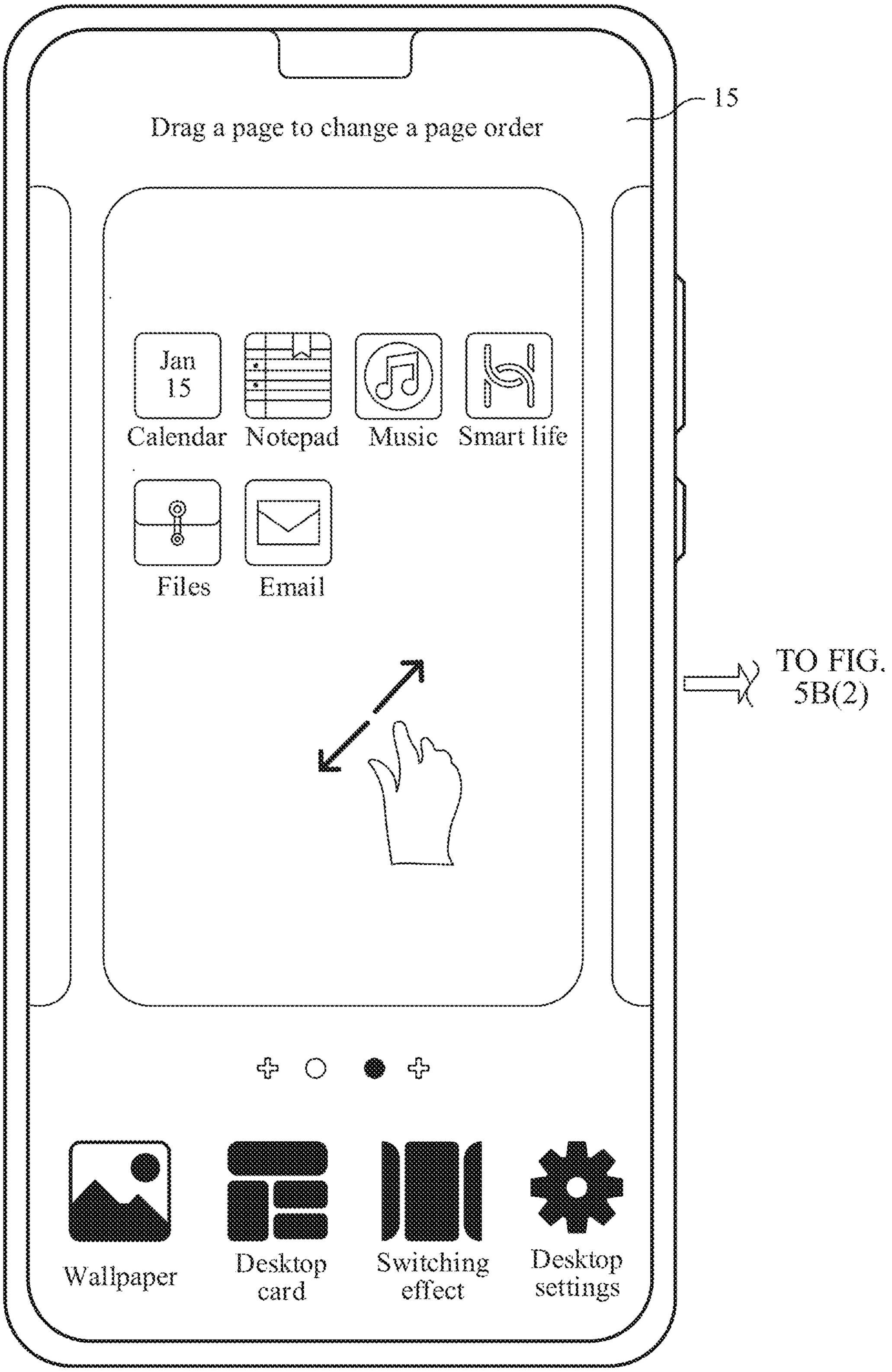
FIG. 5B(1)

CONT. FROM FIG. 5B(1)
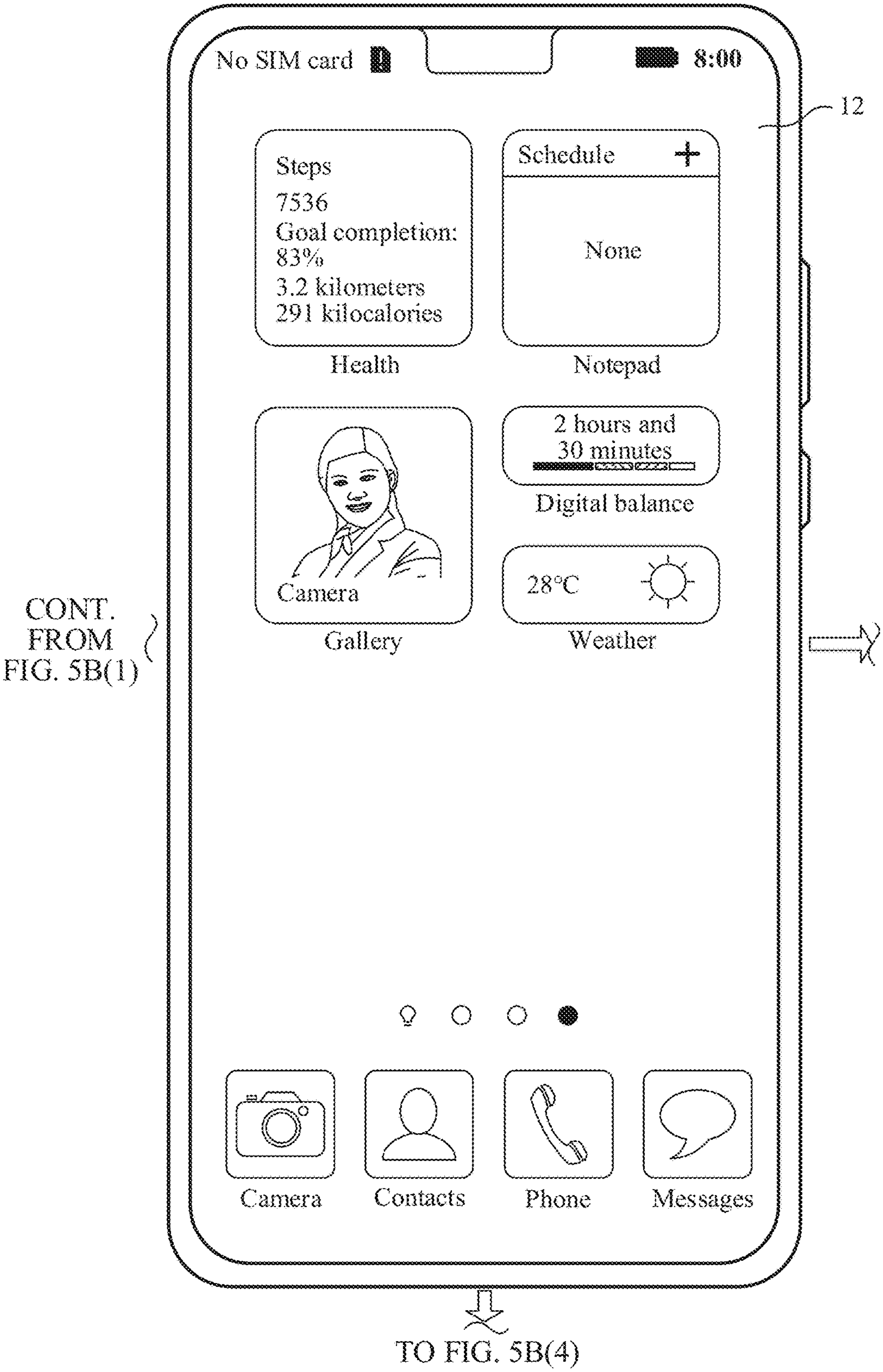
TO FIG. 5B(3)
TO FIG. 5B(4)
FIG. 5B(2)

CONT. FROM FIG. 5B(2)
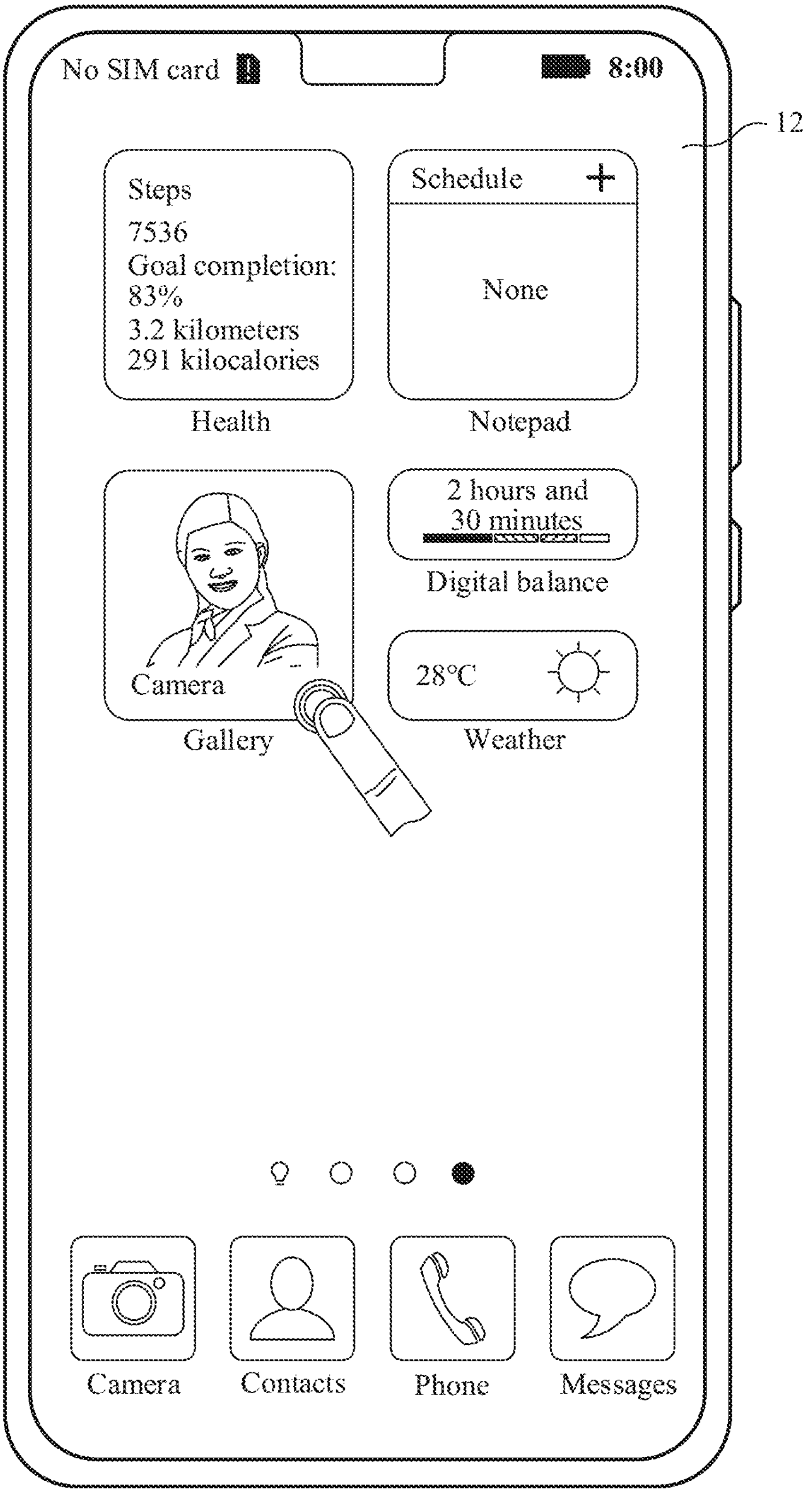
FIG. 5B(3)

CONT. FROM
FIG. 5B(2)
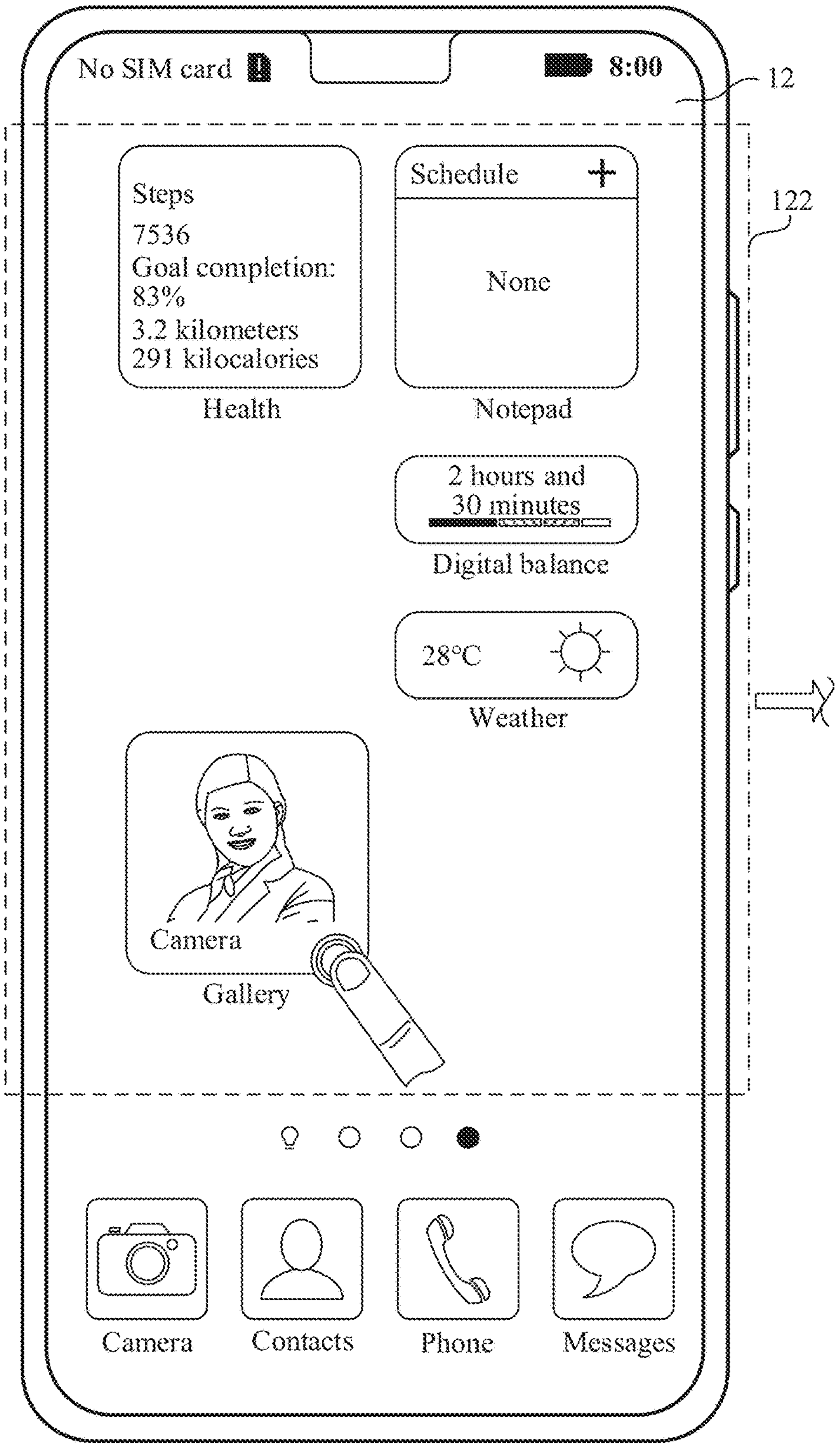
TO FIG.
5B(5)
FIG. 5B(4)

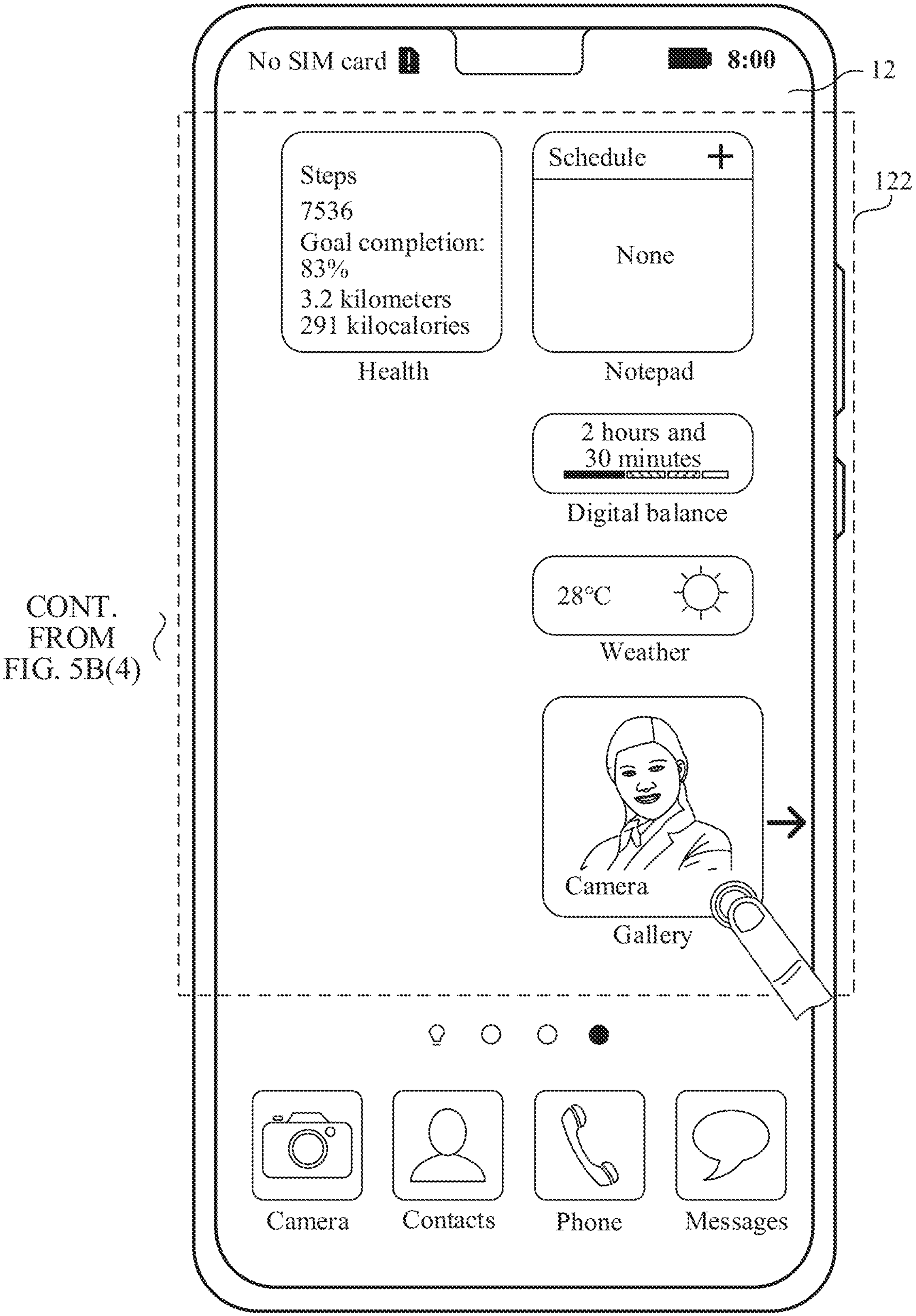
FIG. 5B(5)

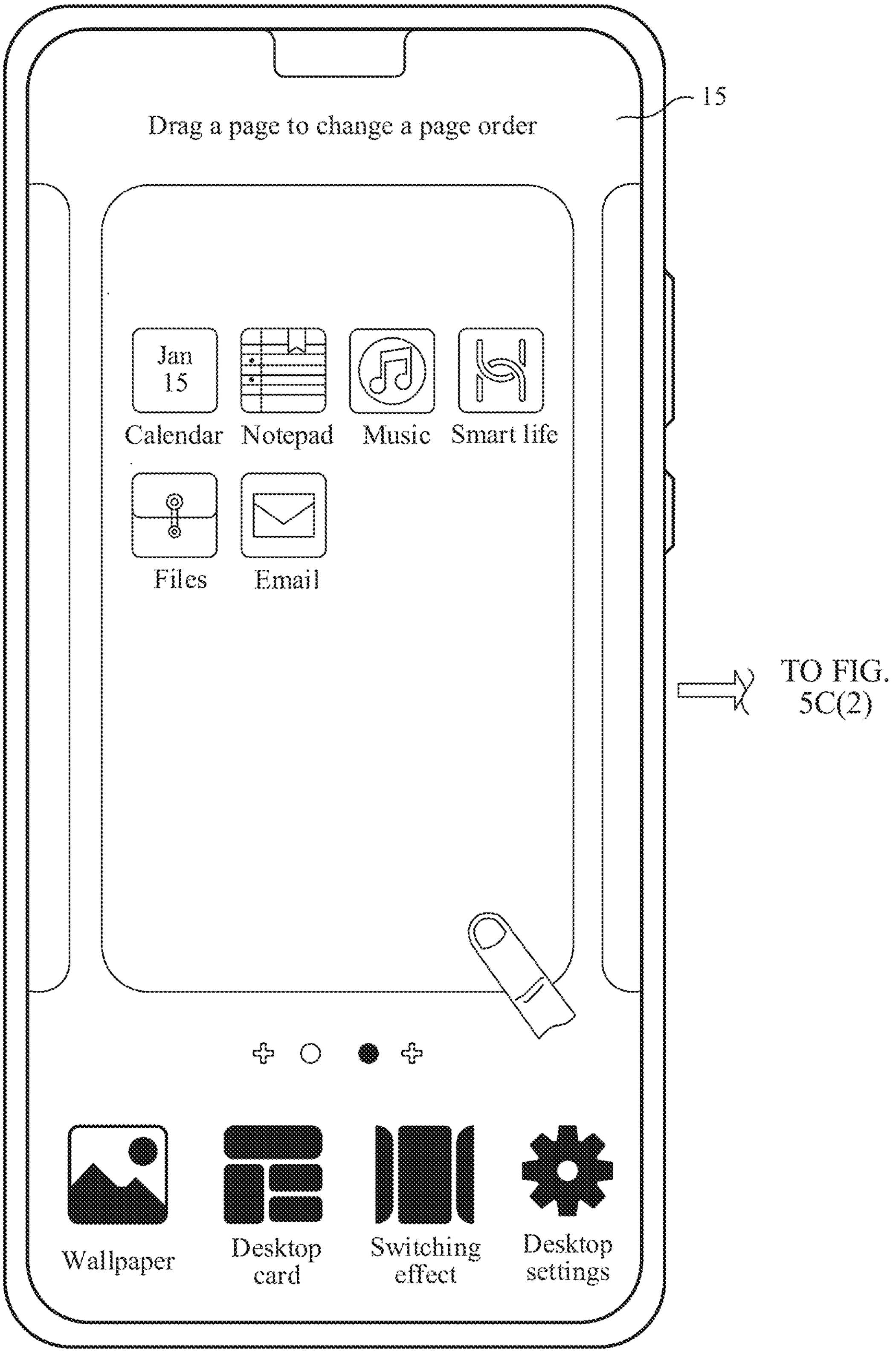
FIG. 5C(1)

CONT. FROM FIG. 5C(1)
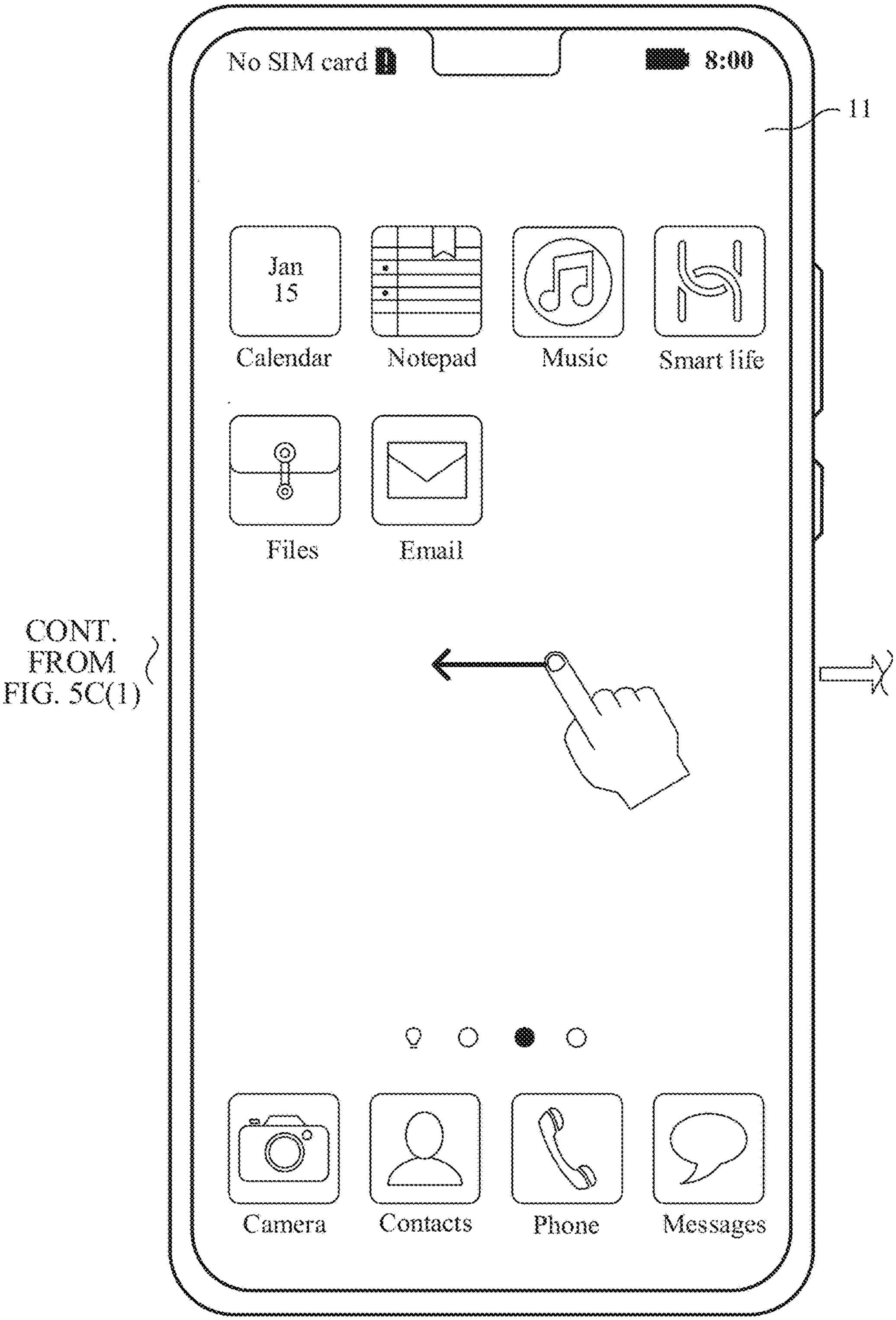
TO FIG. 5C(3)
FIG. 5C(2)

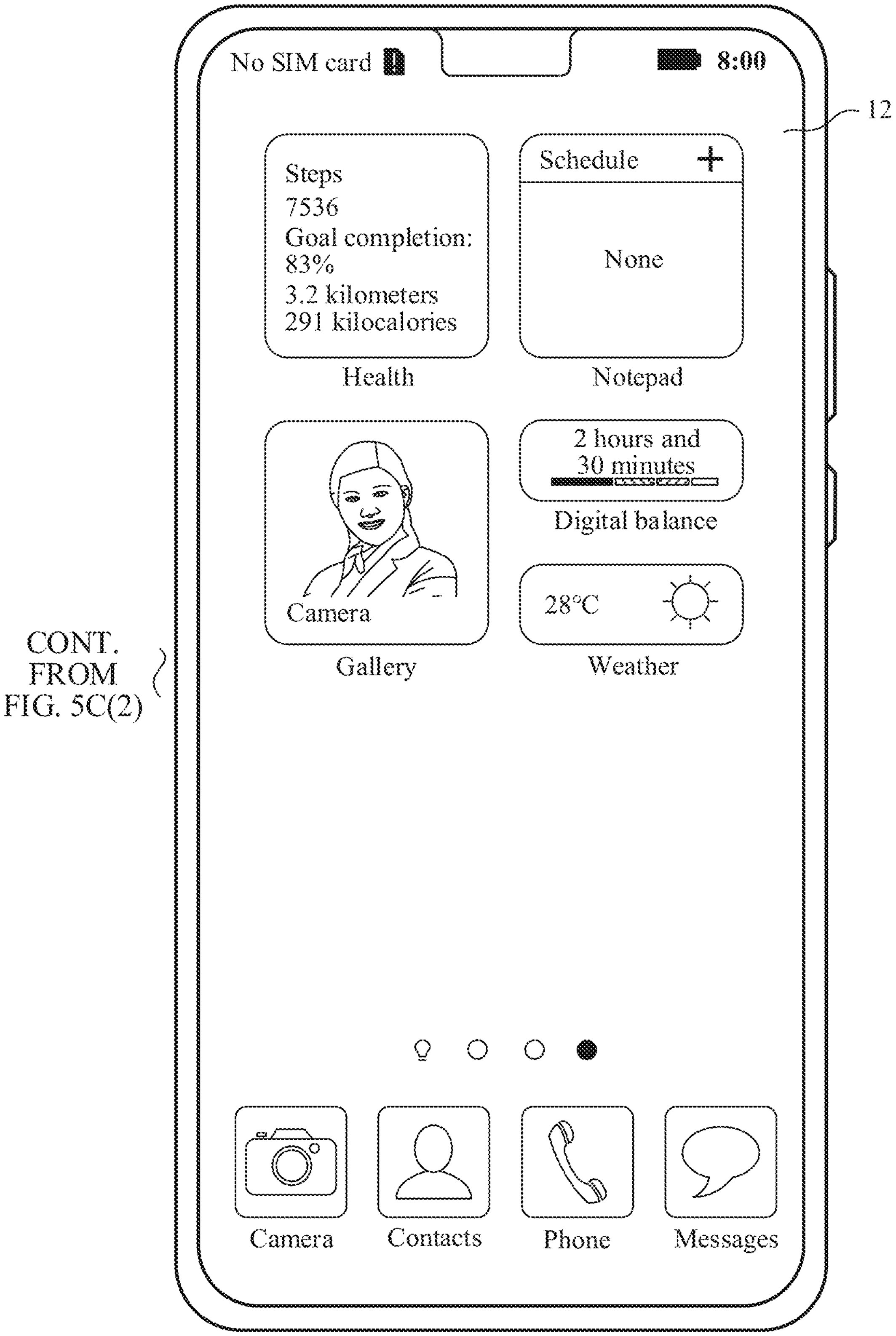
FIG. 5C(3)

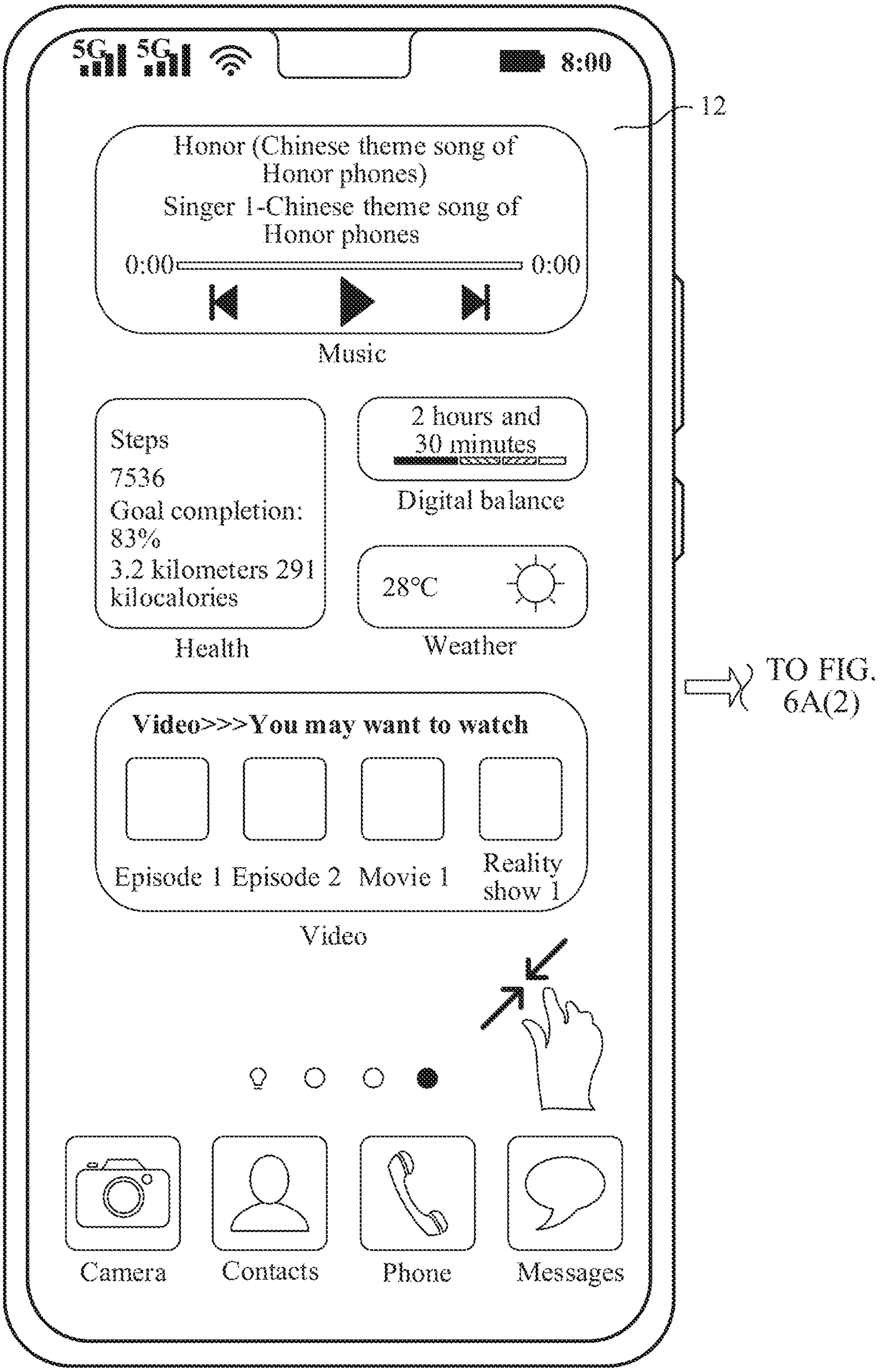
FIG. 6A(1)

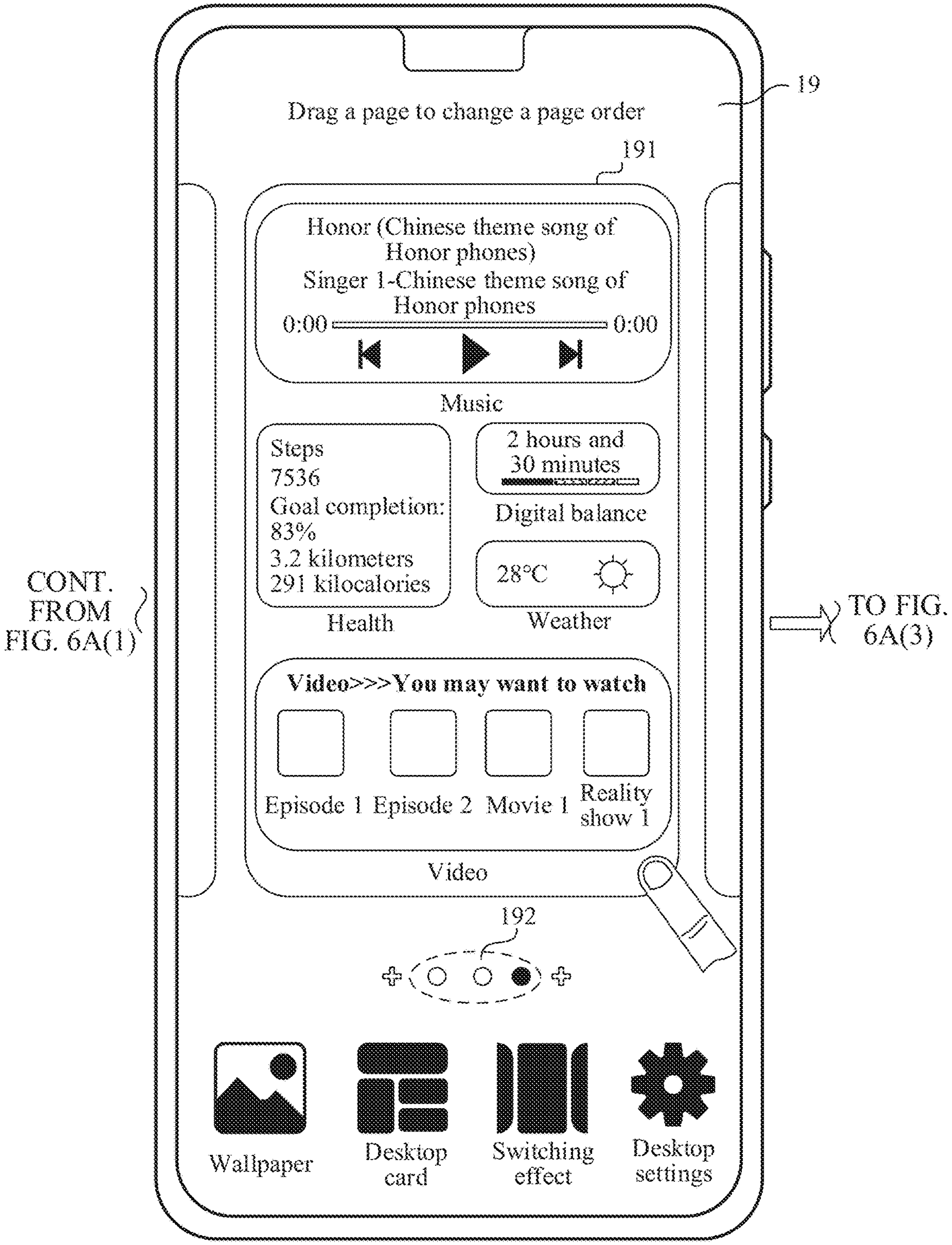
FIG. 6A(2)

CONT. FROM FIG. 6A(2)
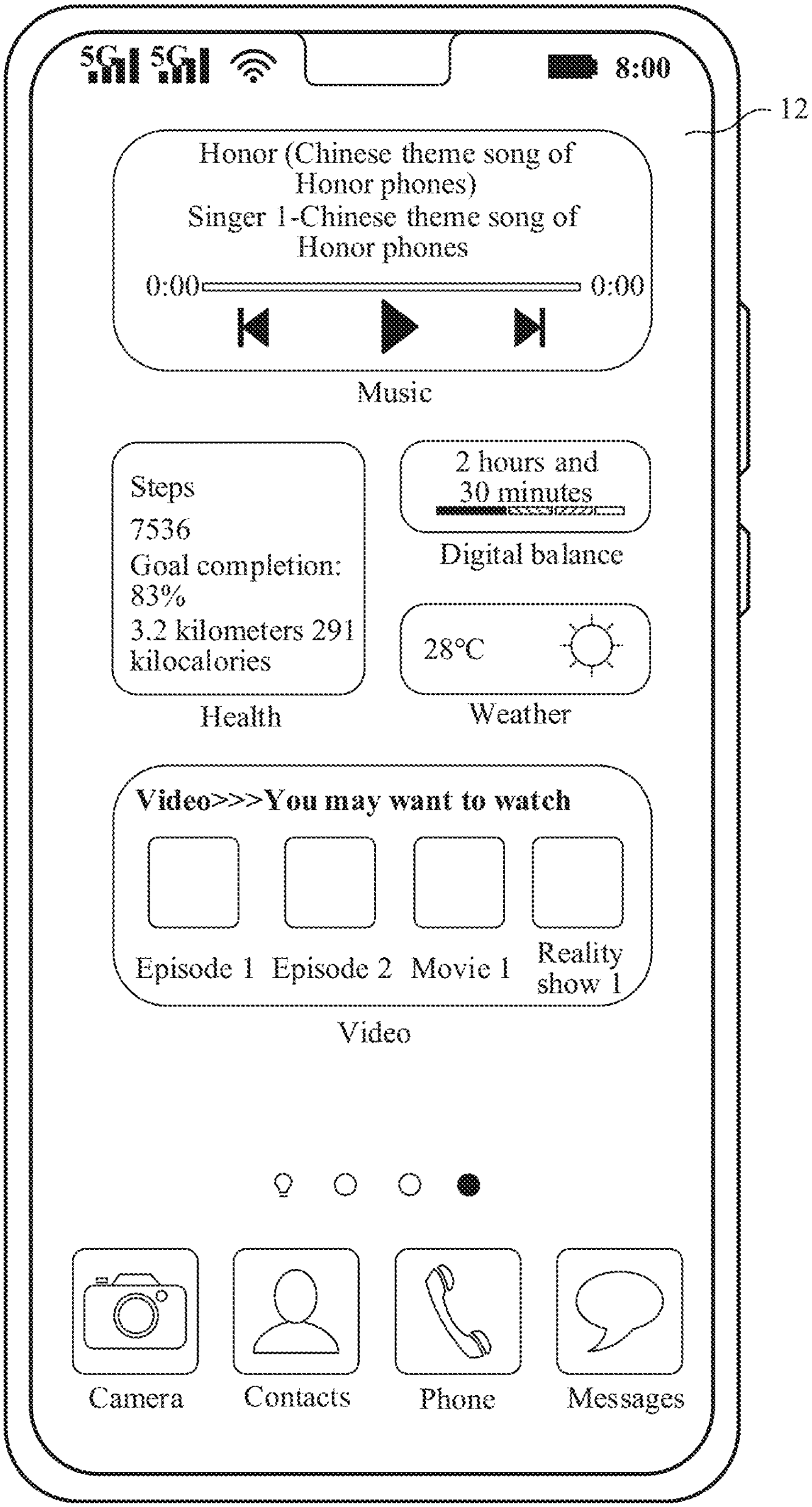
FIG. 6A(3)

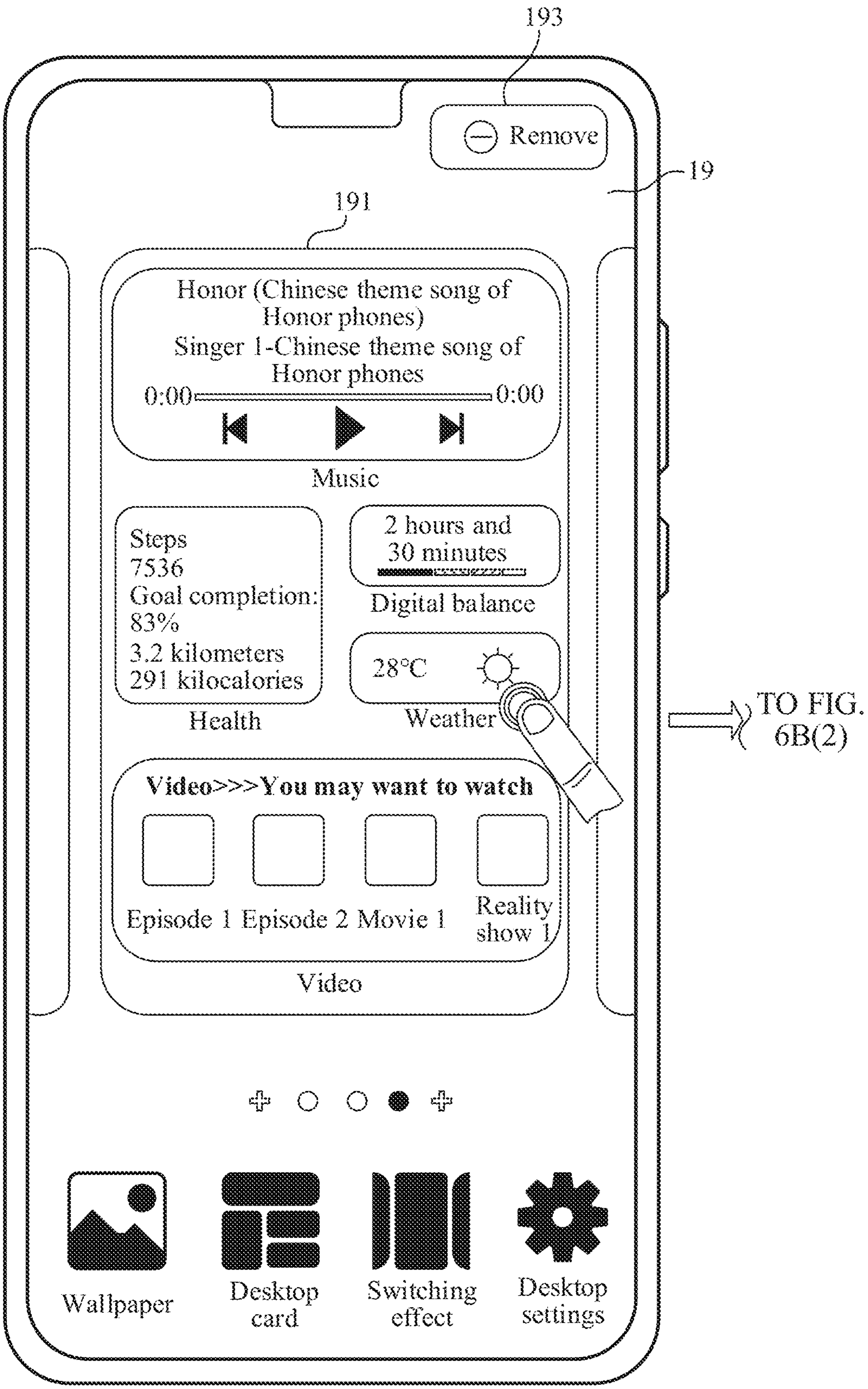
FIG. 6B(1)

CONT. FROM FIG. 6B(1)
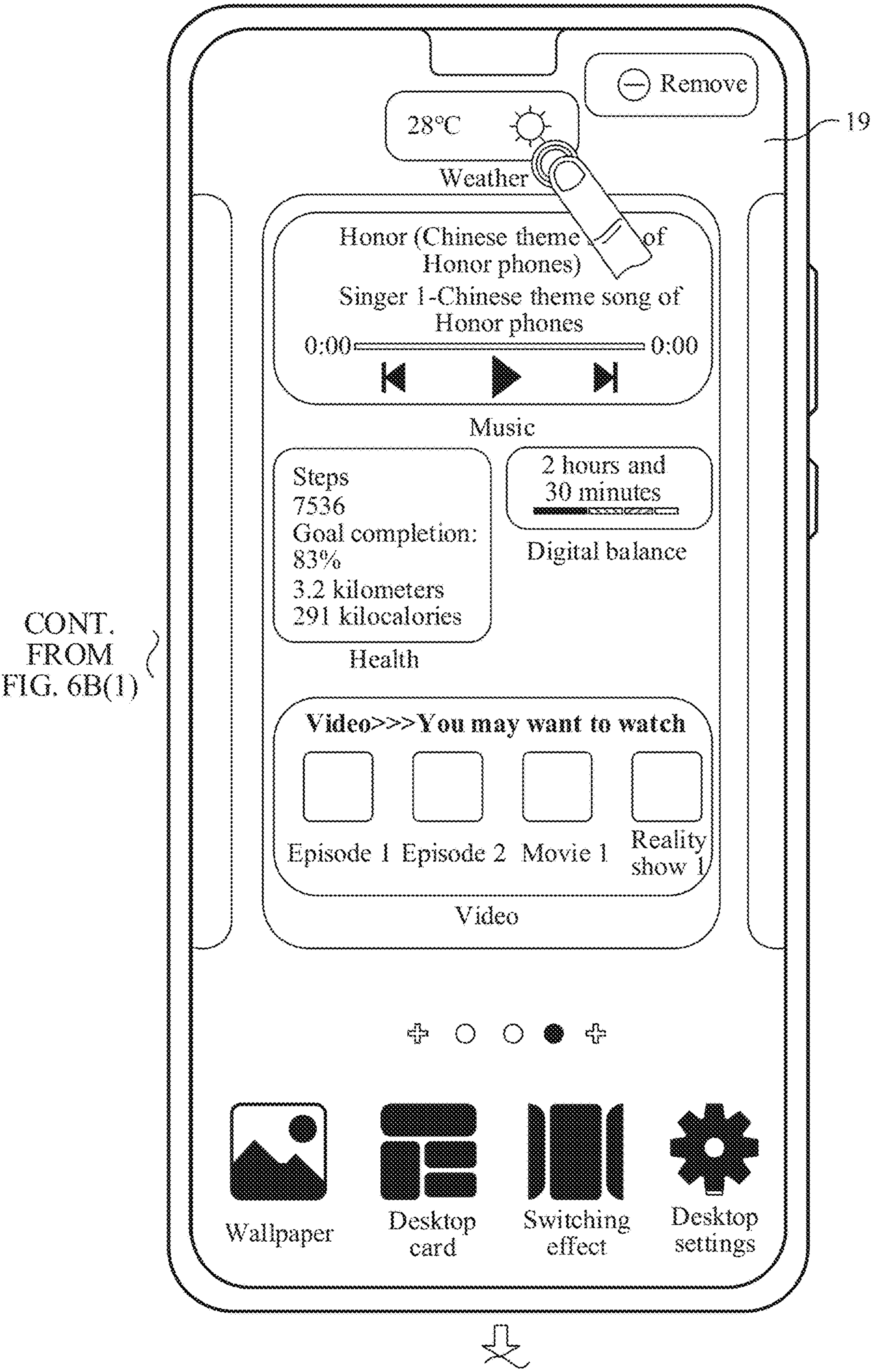
TO FIG. 6B(3)
FIG. 6B(2)

CONT. FROM FIG. 6B(2)
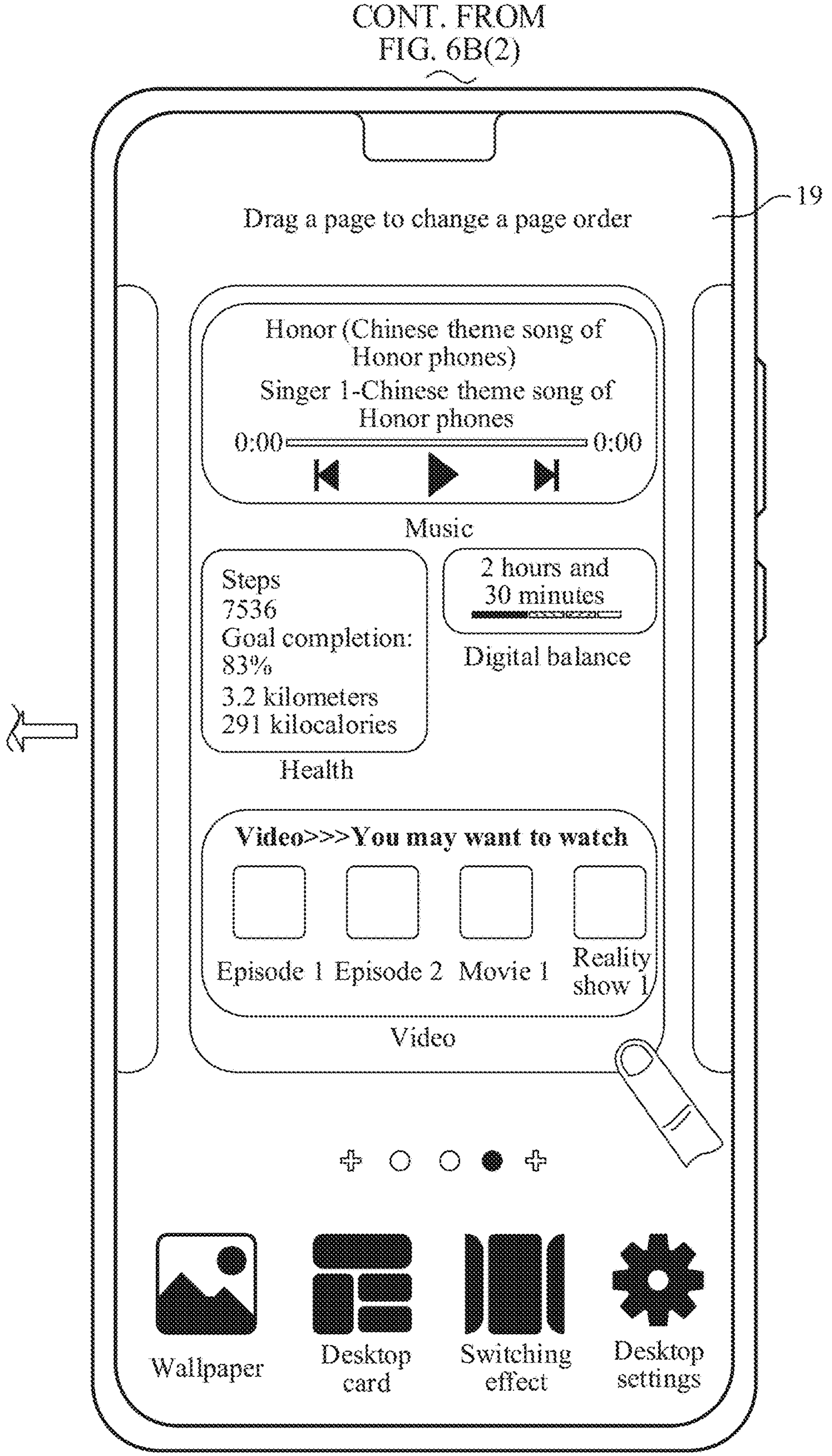
TO FIG. 6B(4)
FIG. 6B(3)

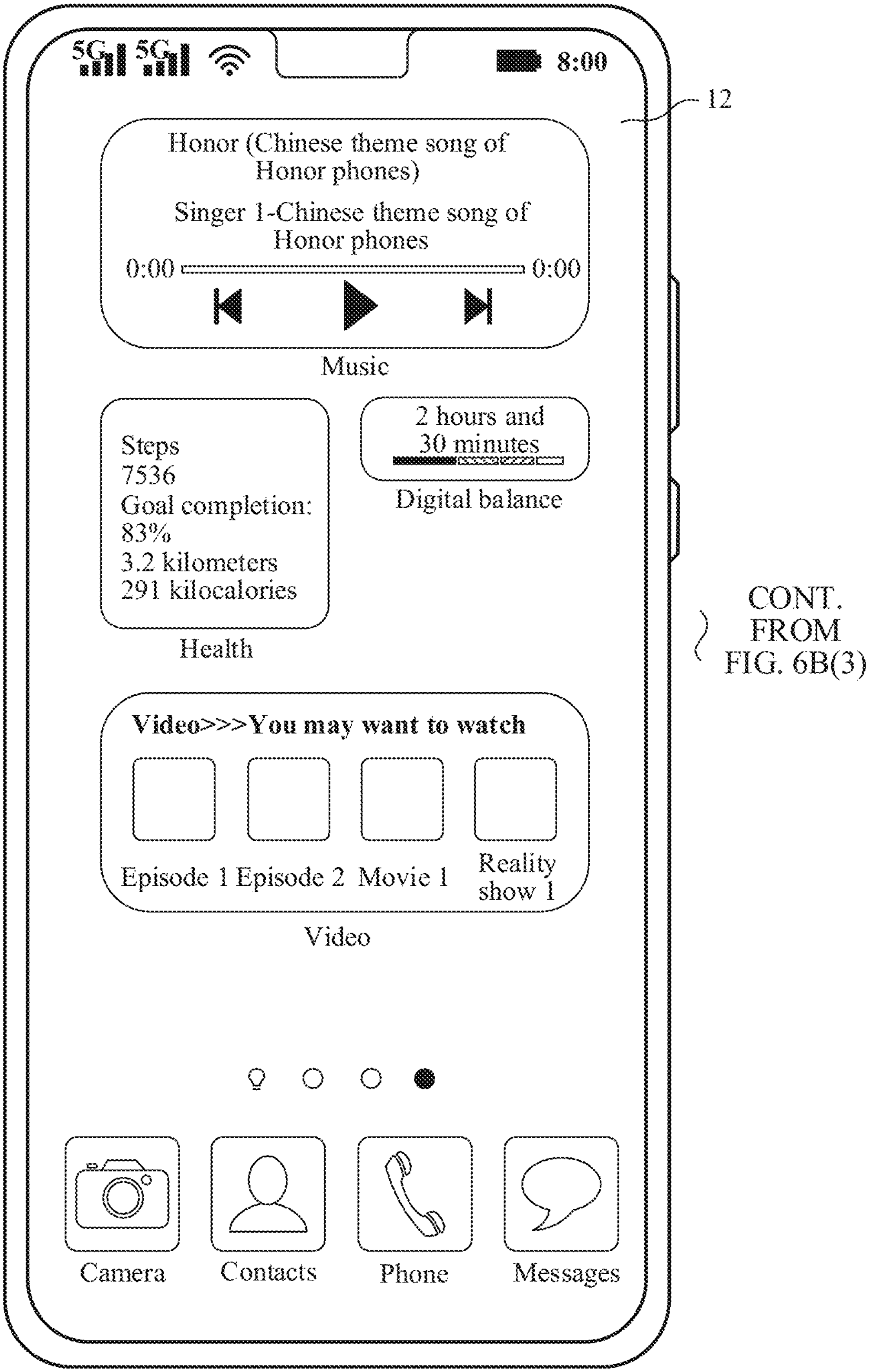
CONT. FROM FIG. 6B(3)
FIG. 6B(4)

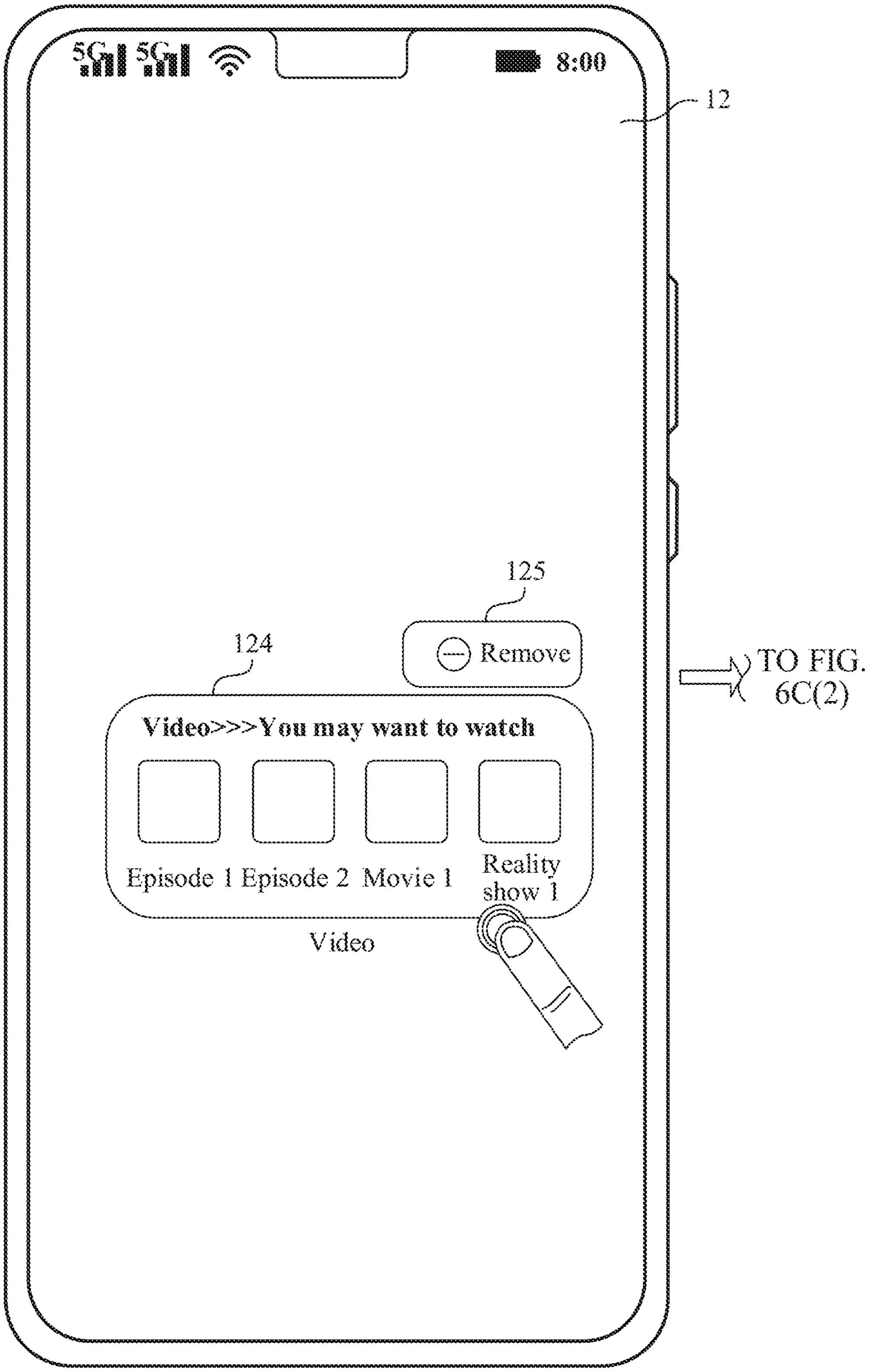
FIG. 6C(1)

CONT. FROM FIG. 6C(1)
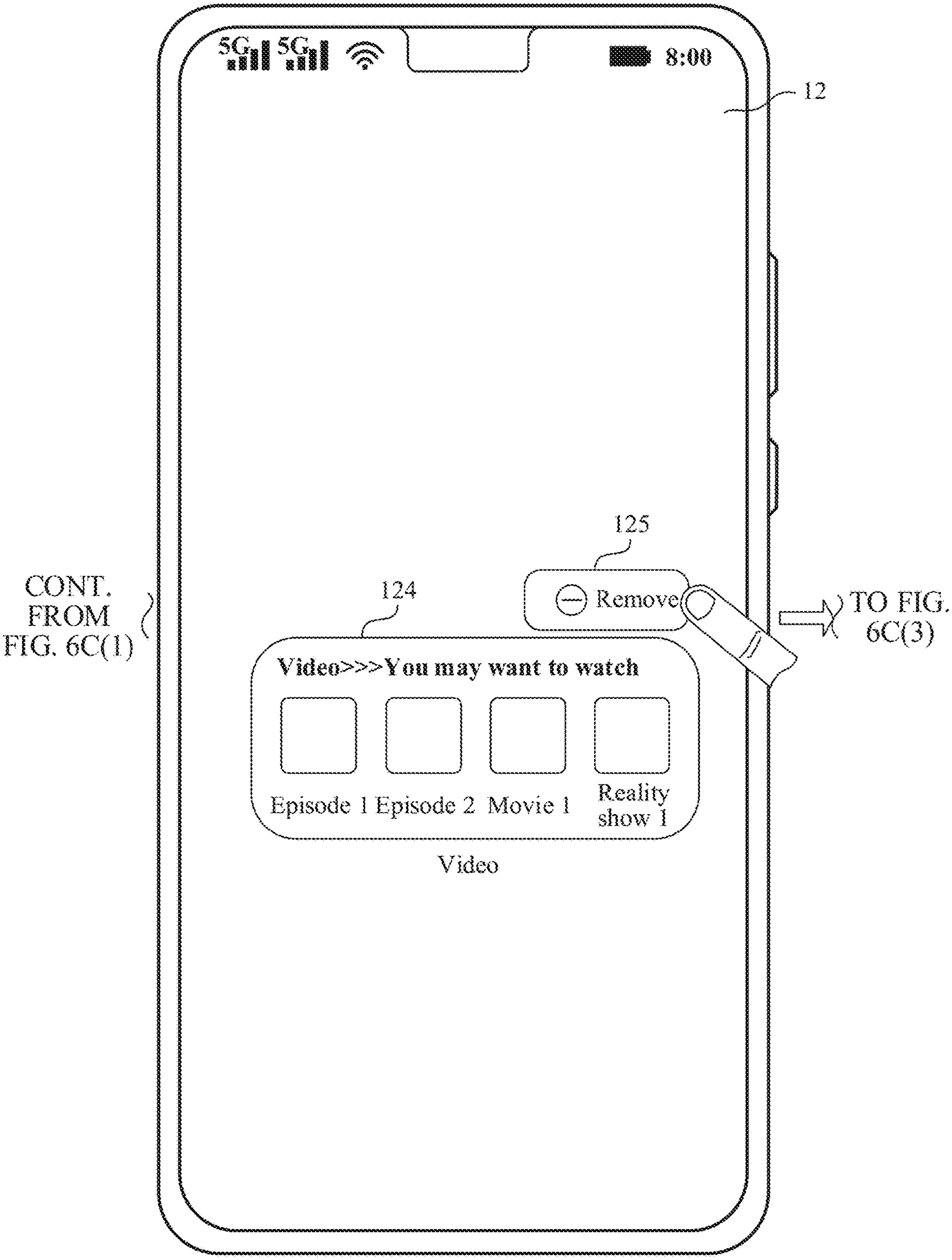
TO FIG. 6C(3)
FIG. 6C(2)

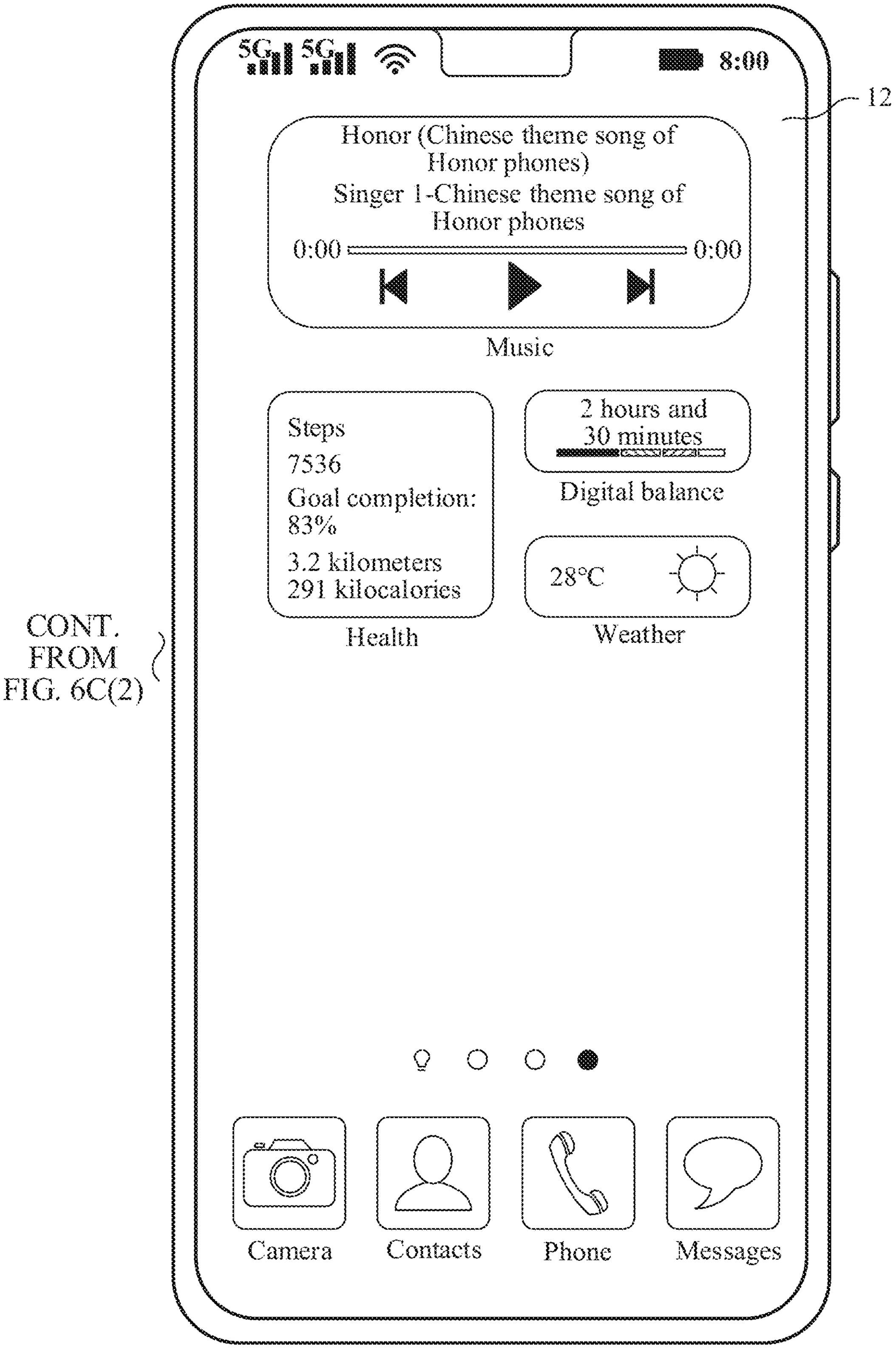
FIG. 6C(3)

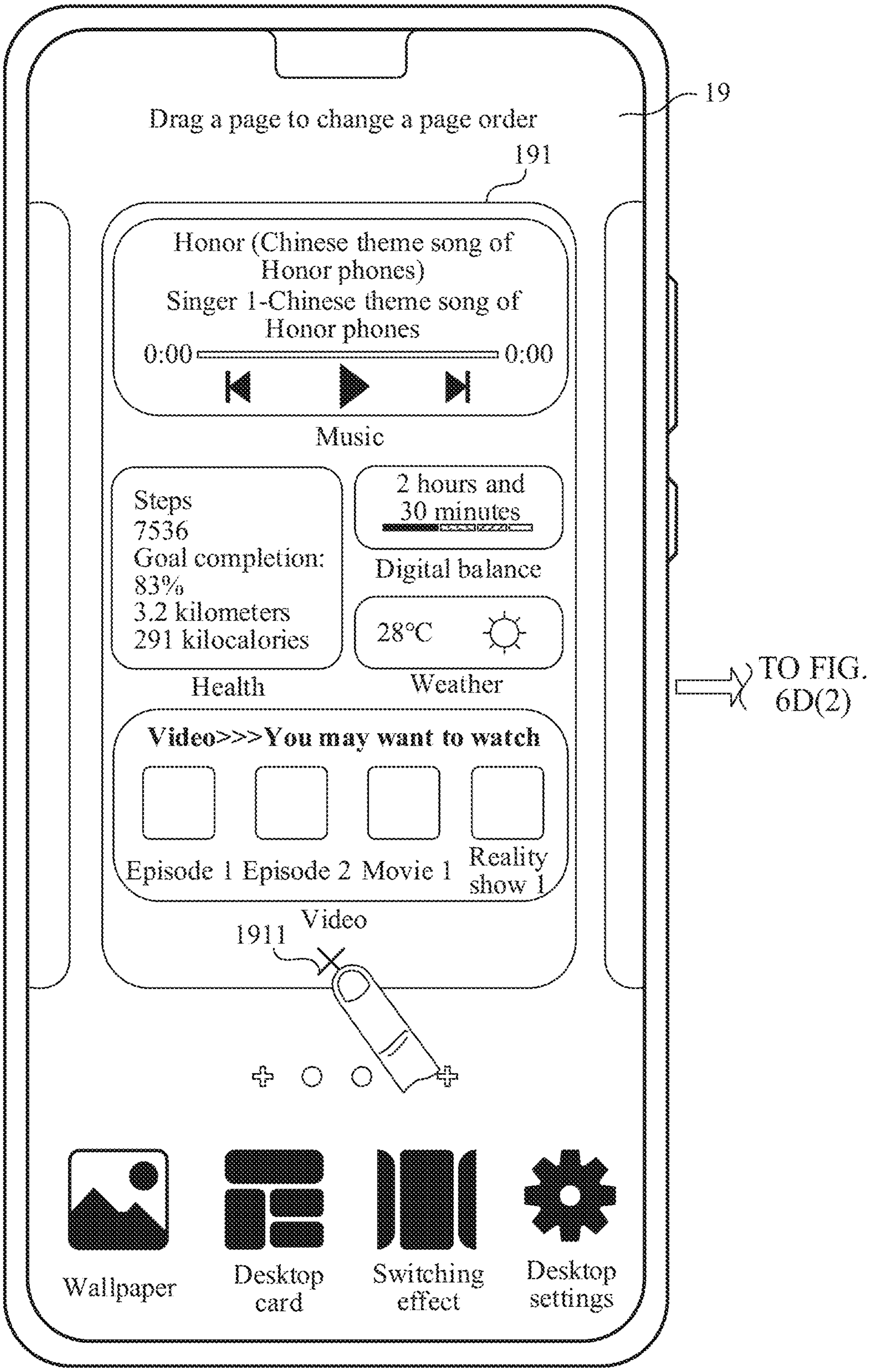
FIG. 6D(1)

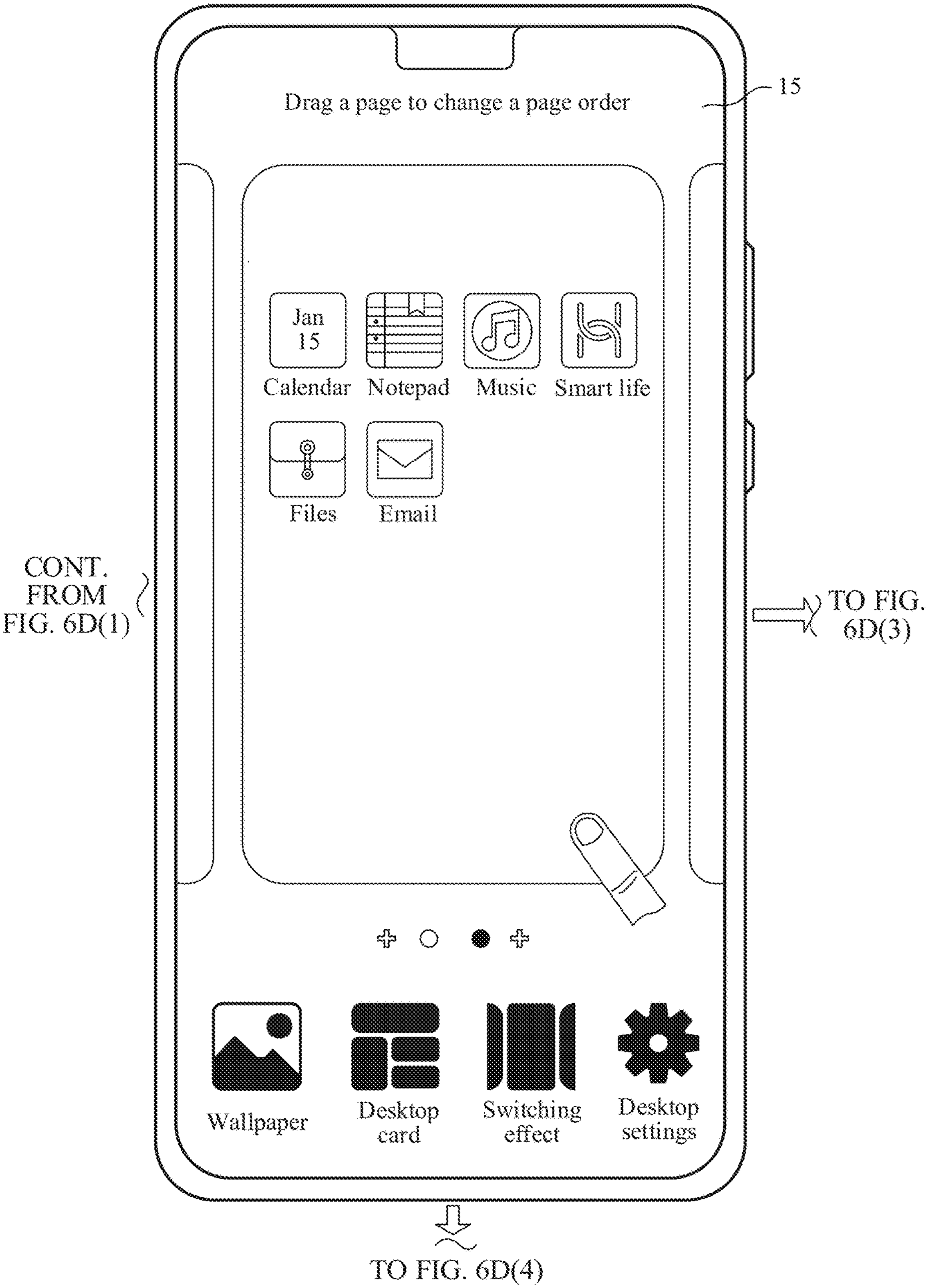
CONT. FROM FIG. 6D(1)
TO FIG. 6D(3)
TO FIG. 6D(4)
FIG. 6D(2)

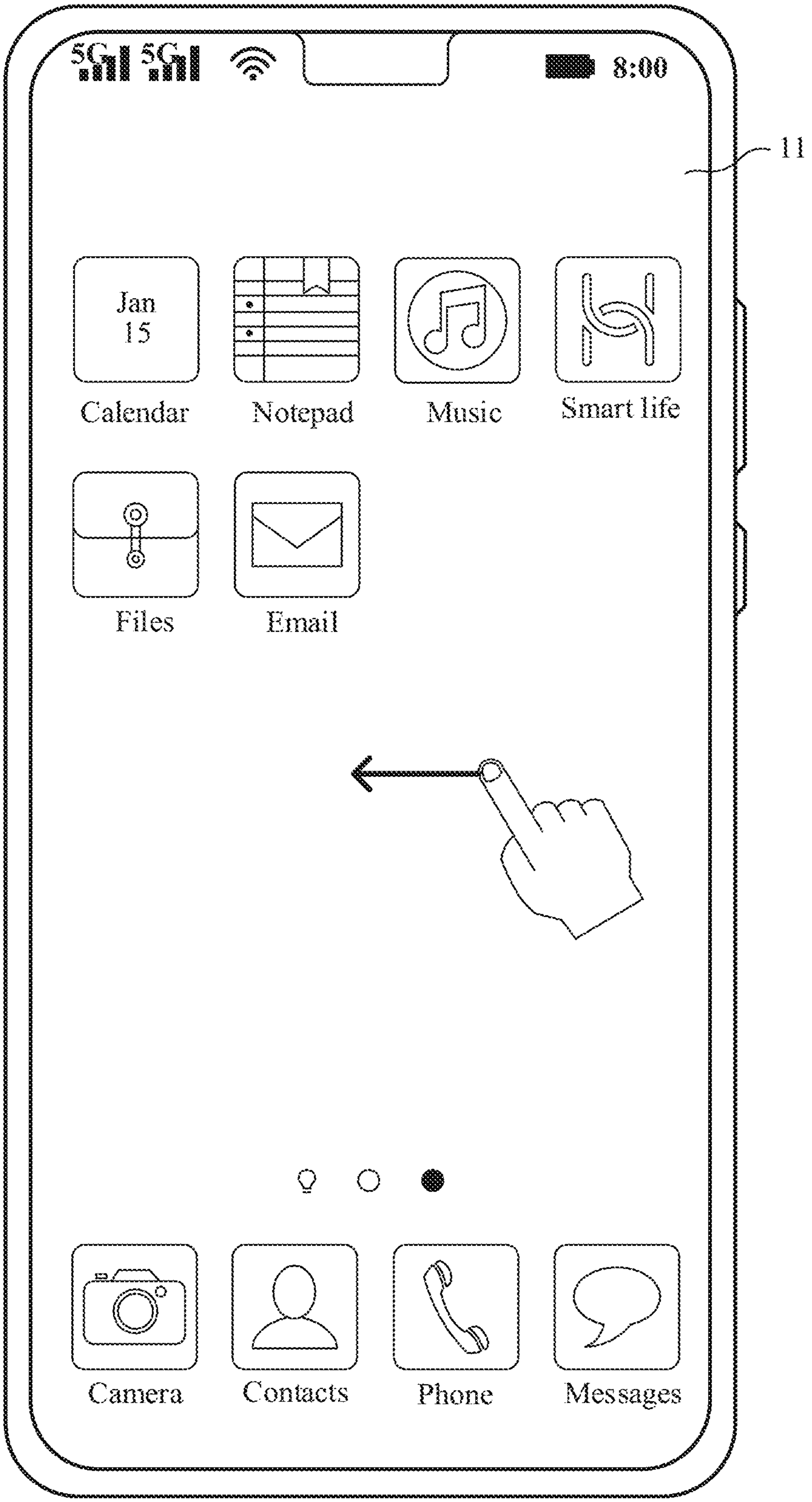
CONT. FROM FIG. 6D(2)
FIG. 6D(3)

CONT. FROM
FIG. 6D(2)
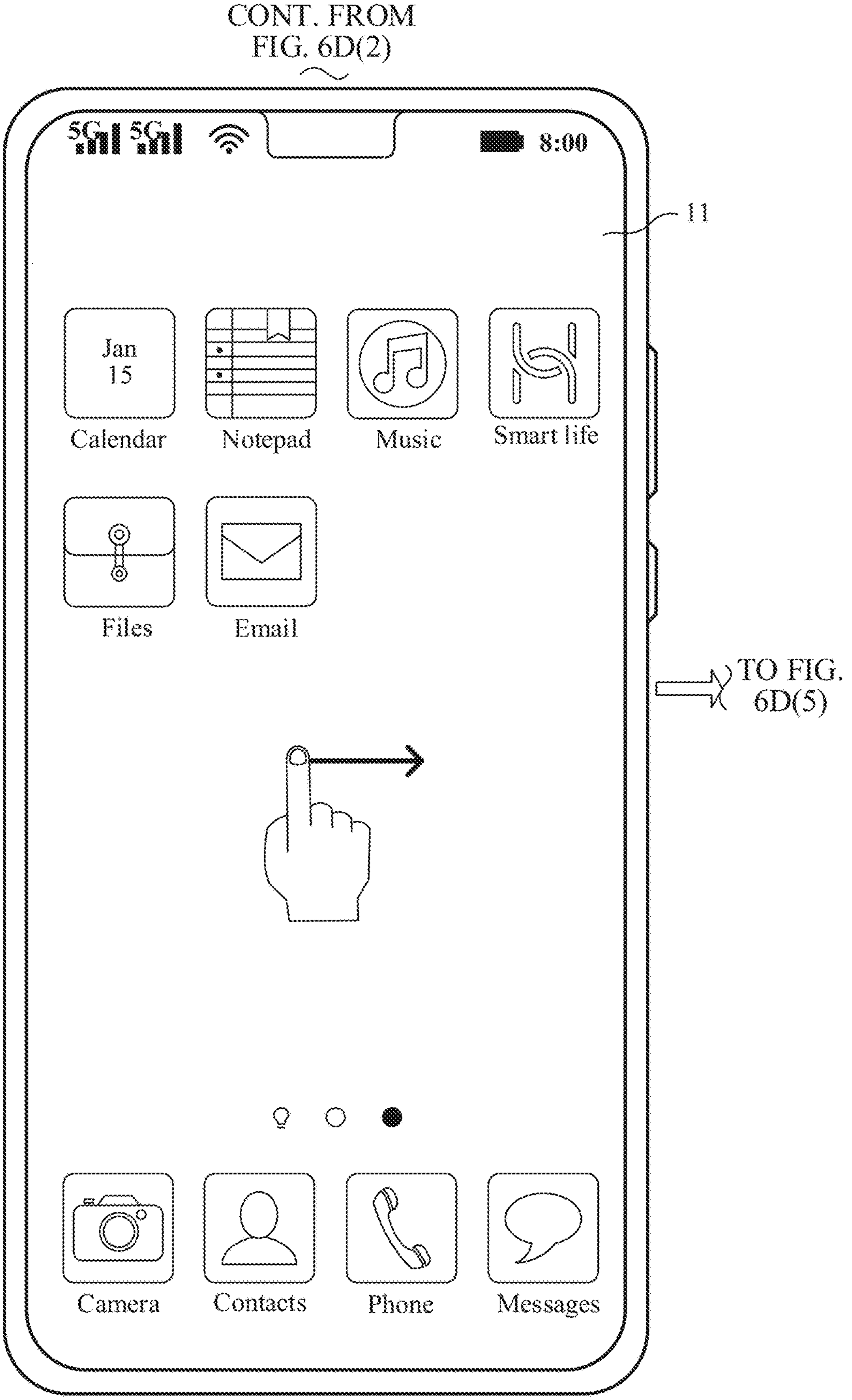
TO FIG.
6D(5)
FIG. 6D(4)

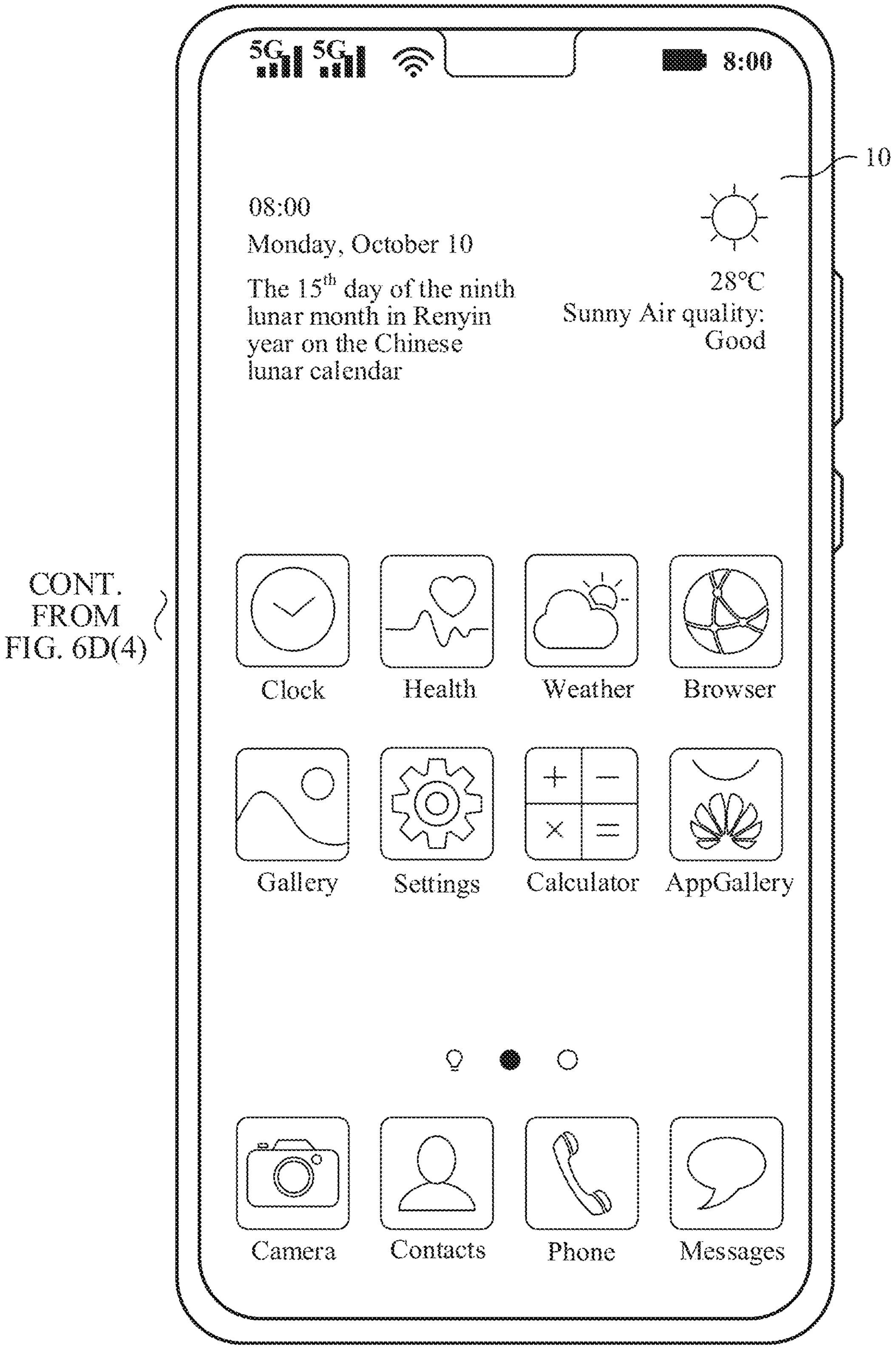
FIG. 6D(5)

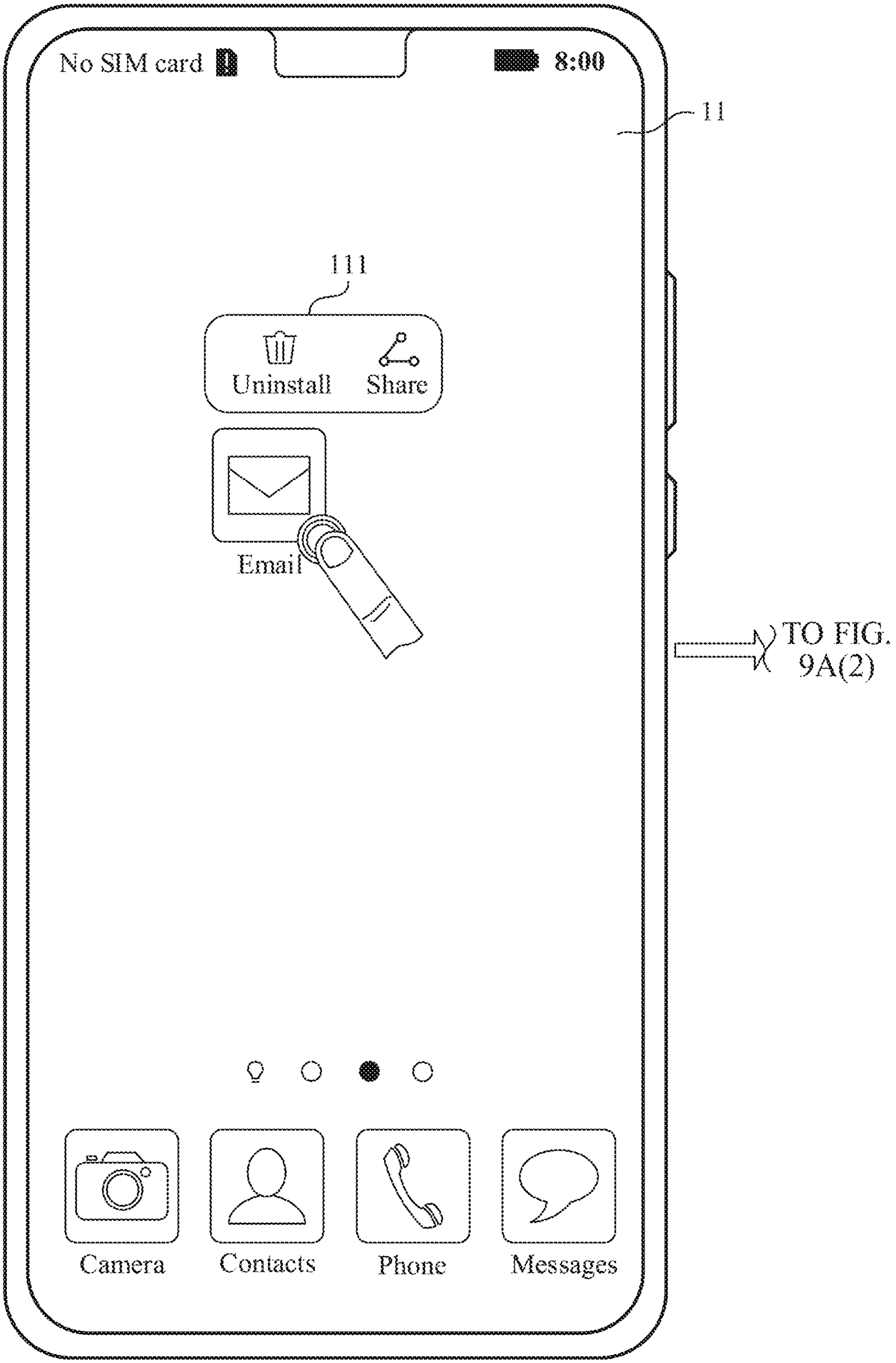
FIG. 9A(1)

CONT. FROM FIG. 9A(1)
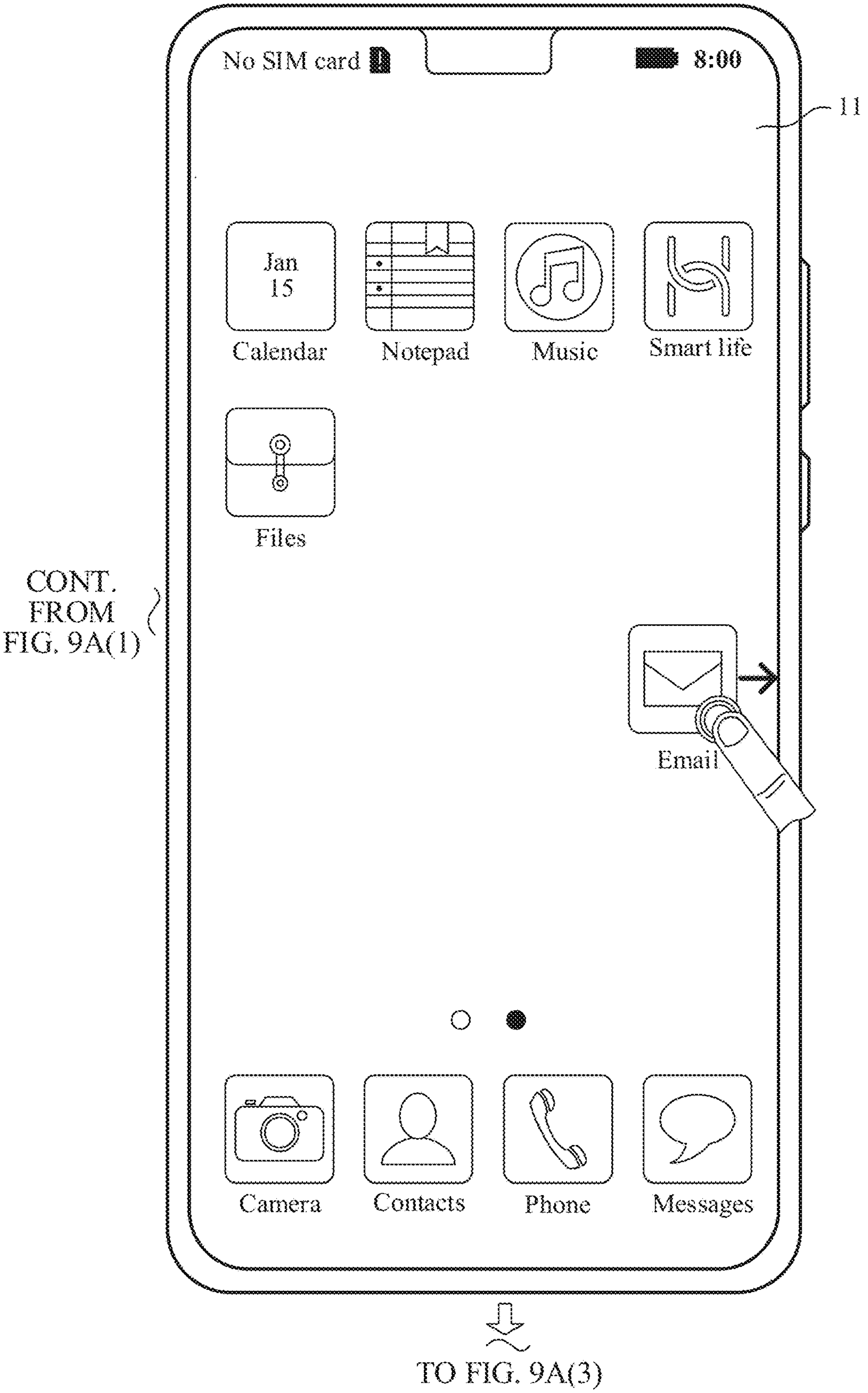
TO FIG. 9A(3)
FIG. 9A(2)

CONT. FROM FIG. 9A(2)
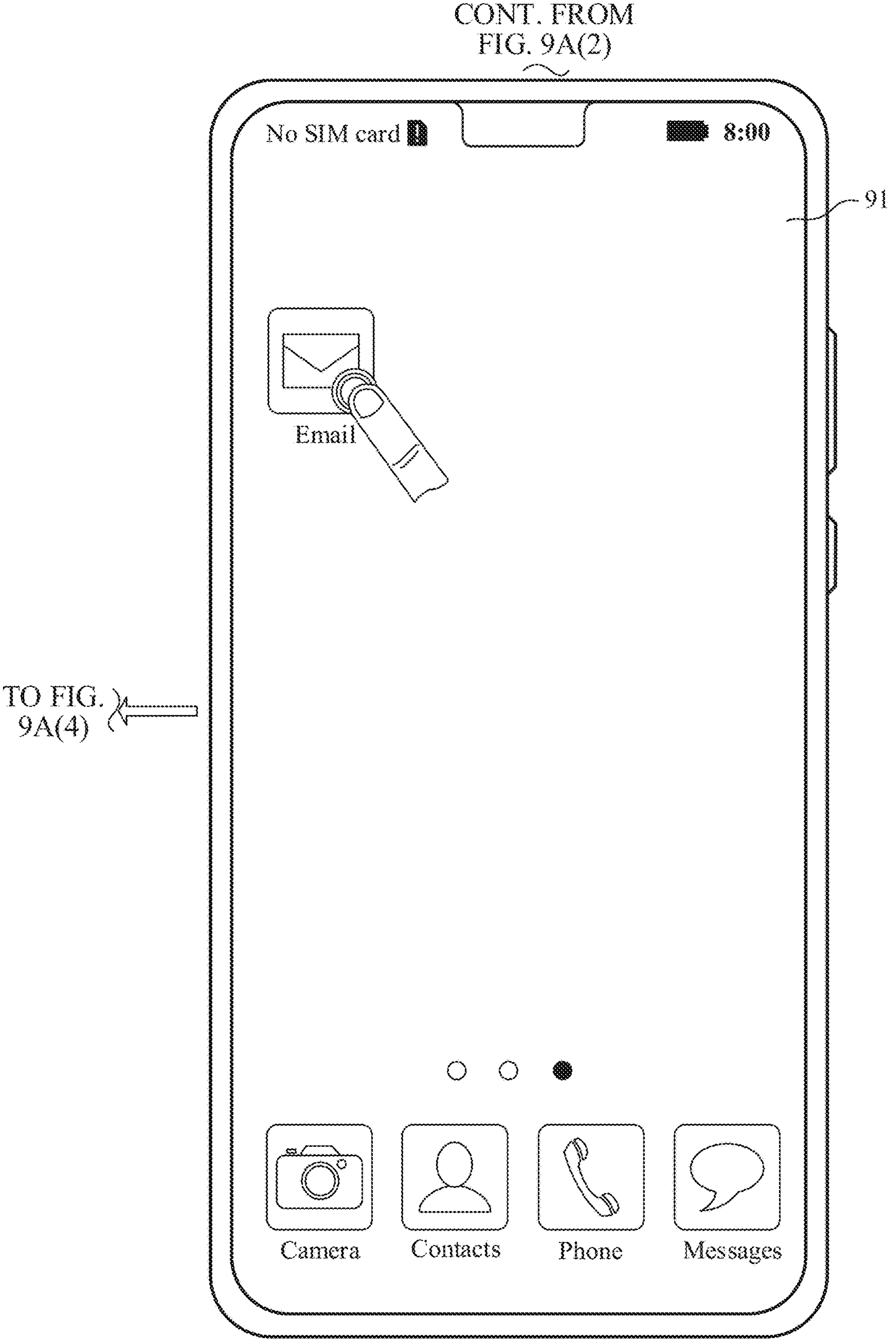
TO FIG. 9A(4)
FIG. 9A(3)

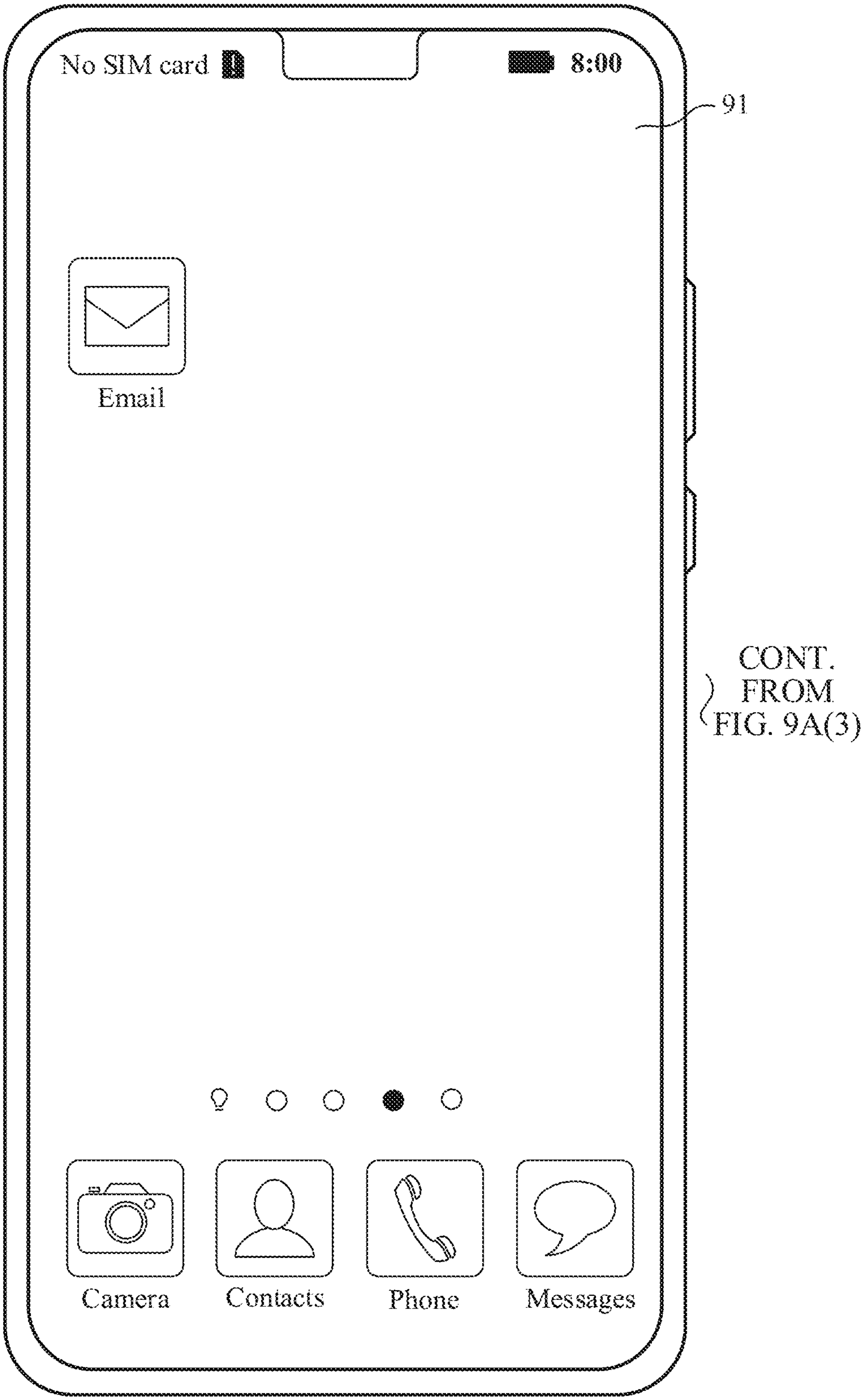
CONT. FROM FIG. 9A(3)
FIG. 9A(4)

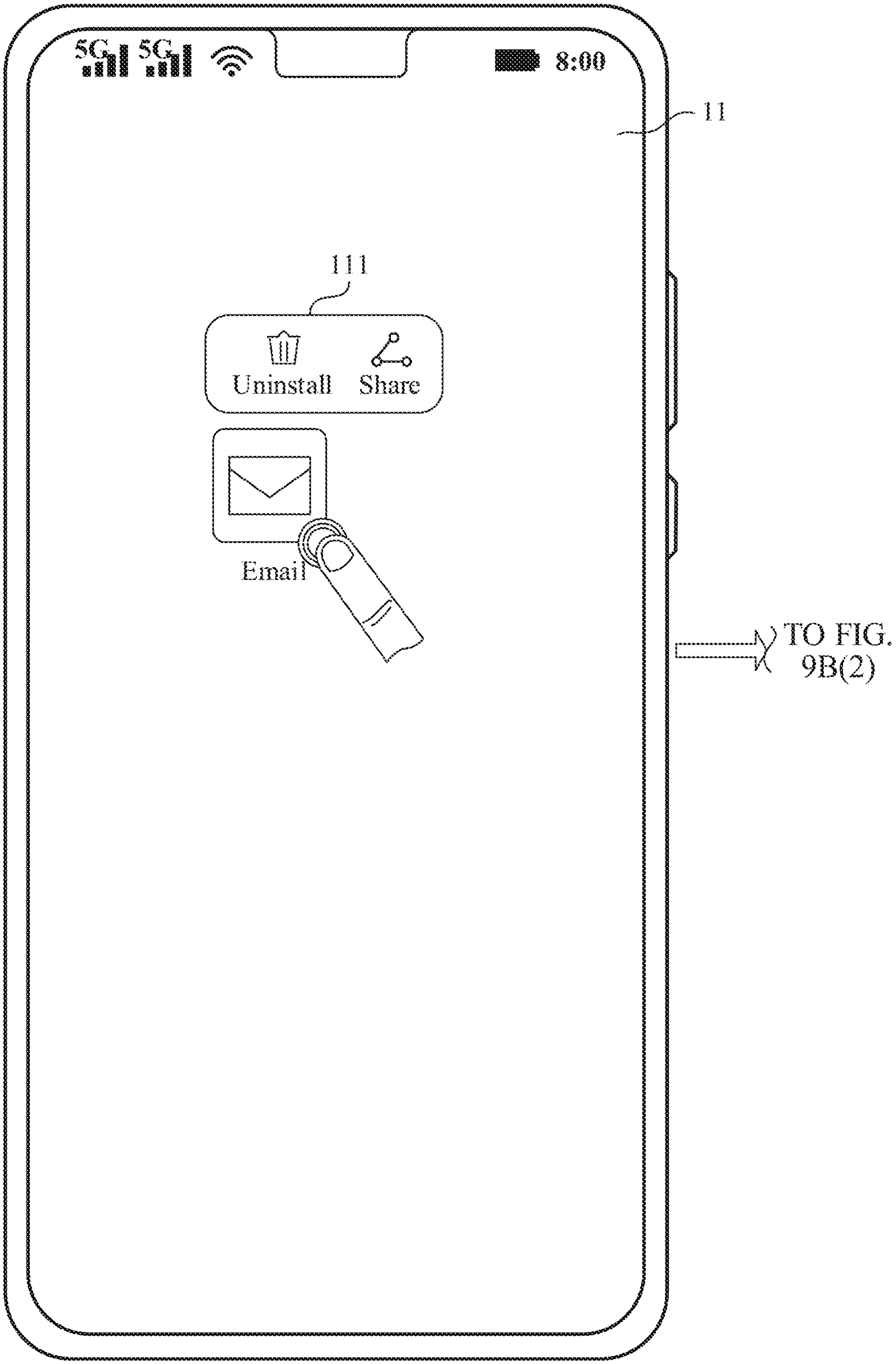
FIG. 9B(1)

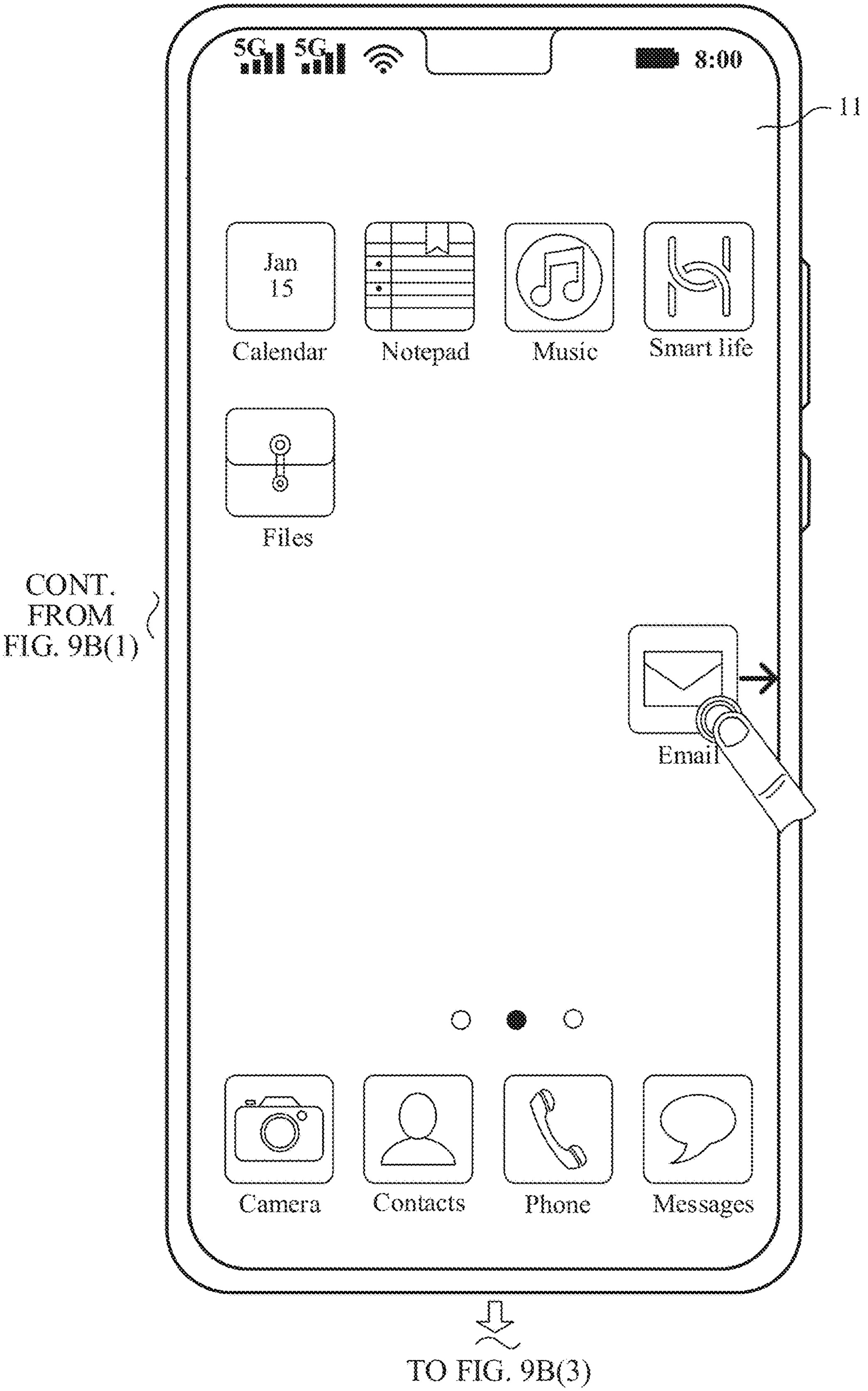
FIG. 9B(2)

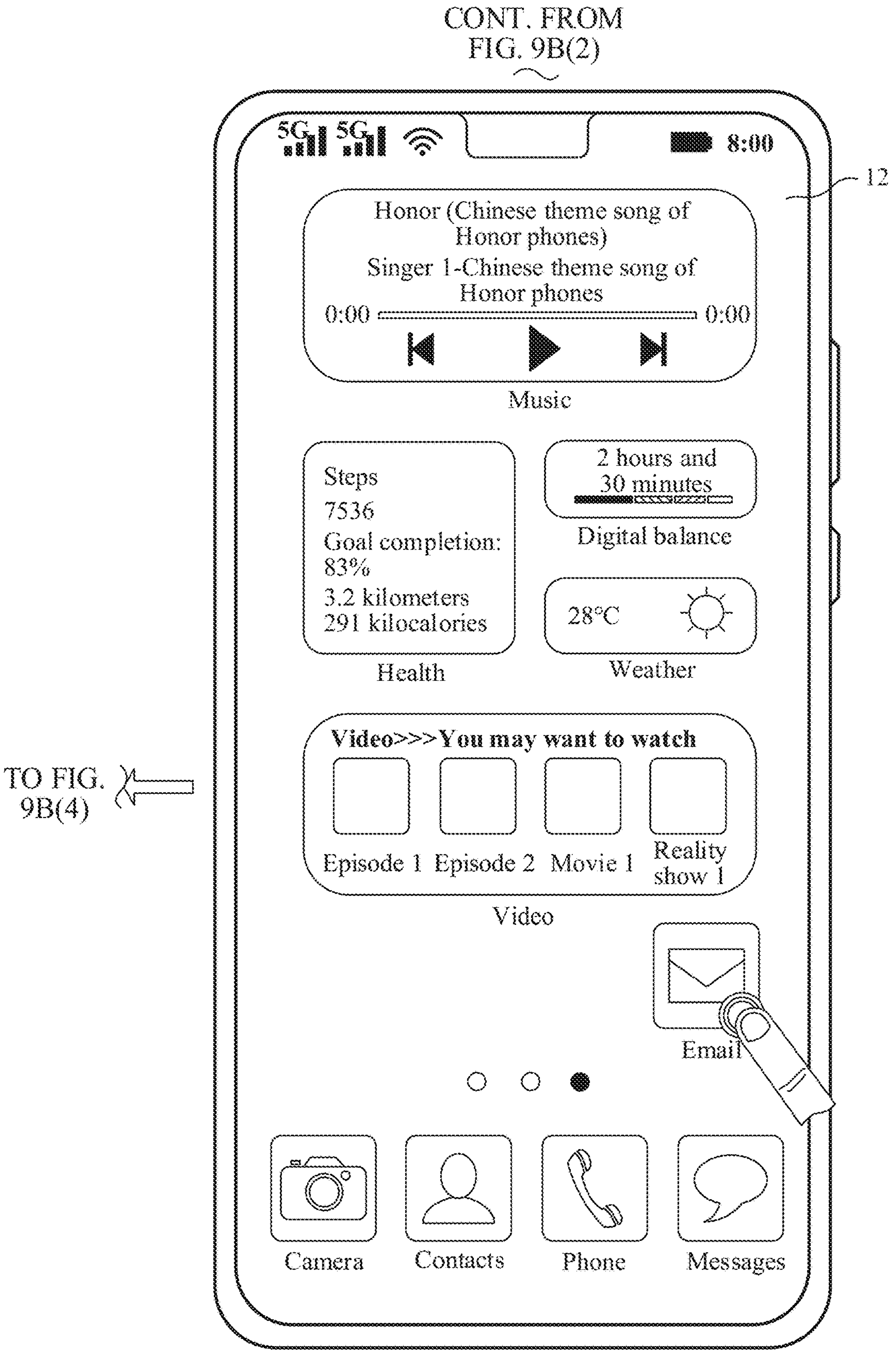
FIG. 9B(3)

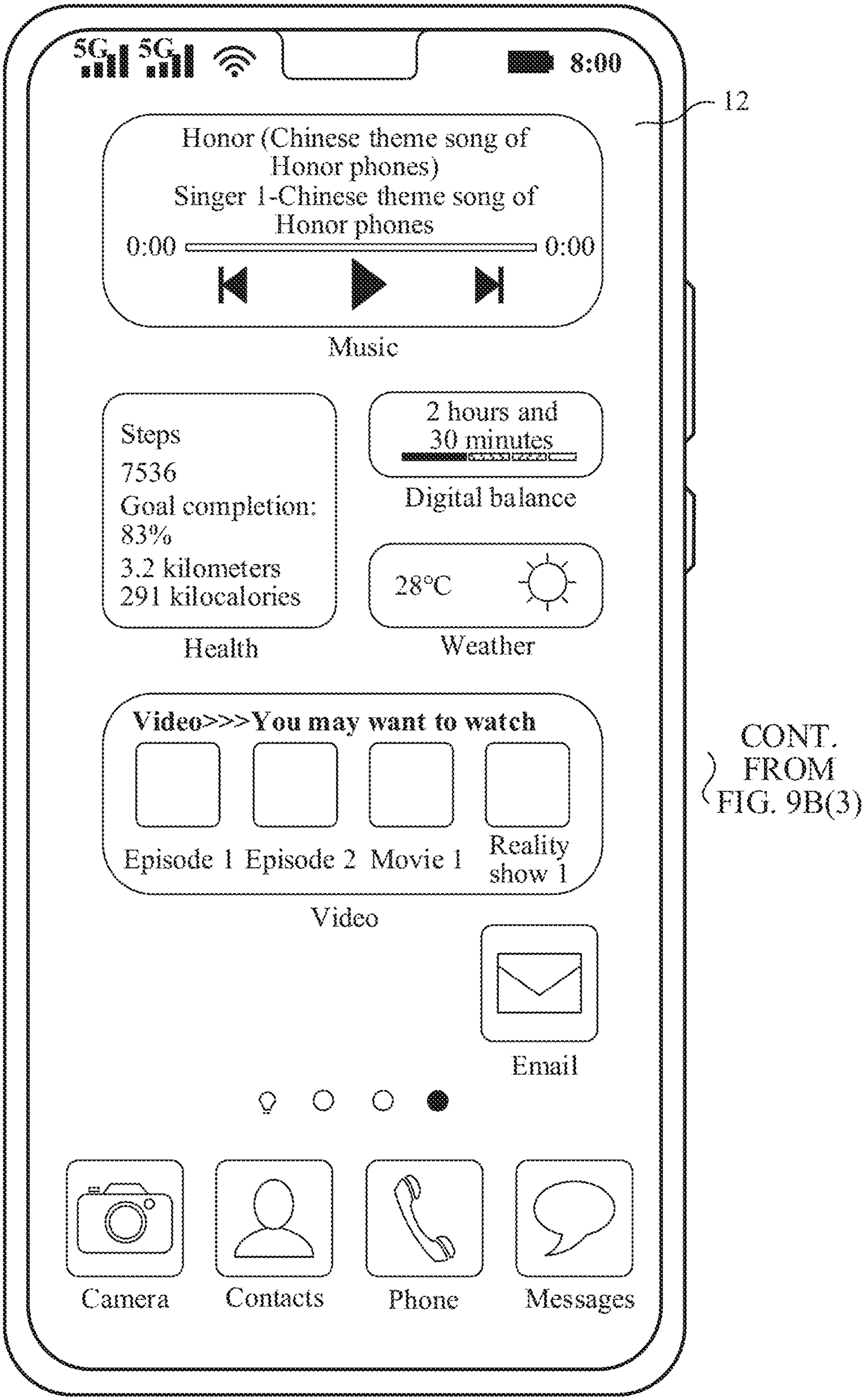
FIG. 9B(4)

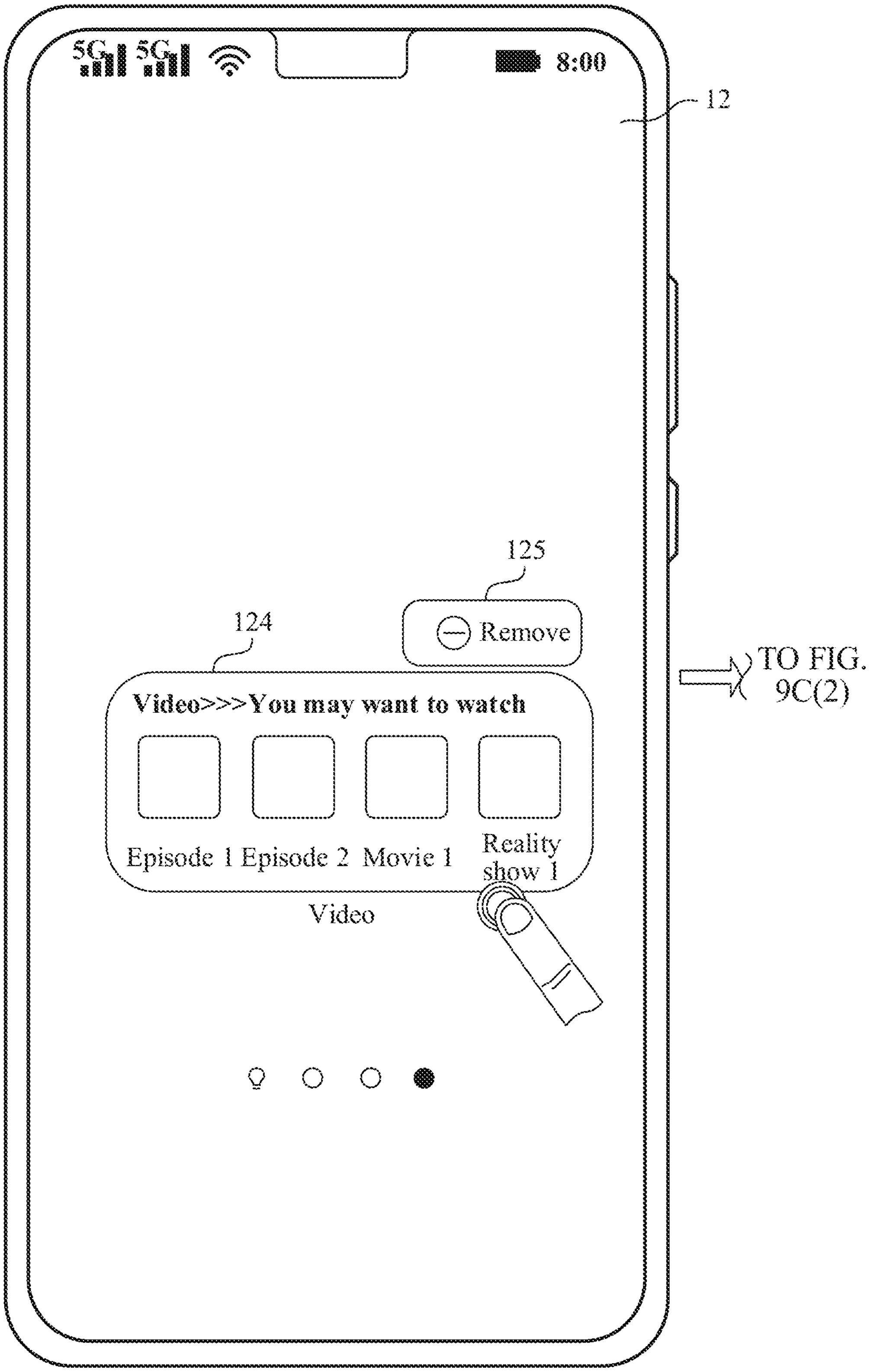
FIG. 9C(1)

CONT. FROM FIG. 9C(1)
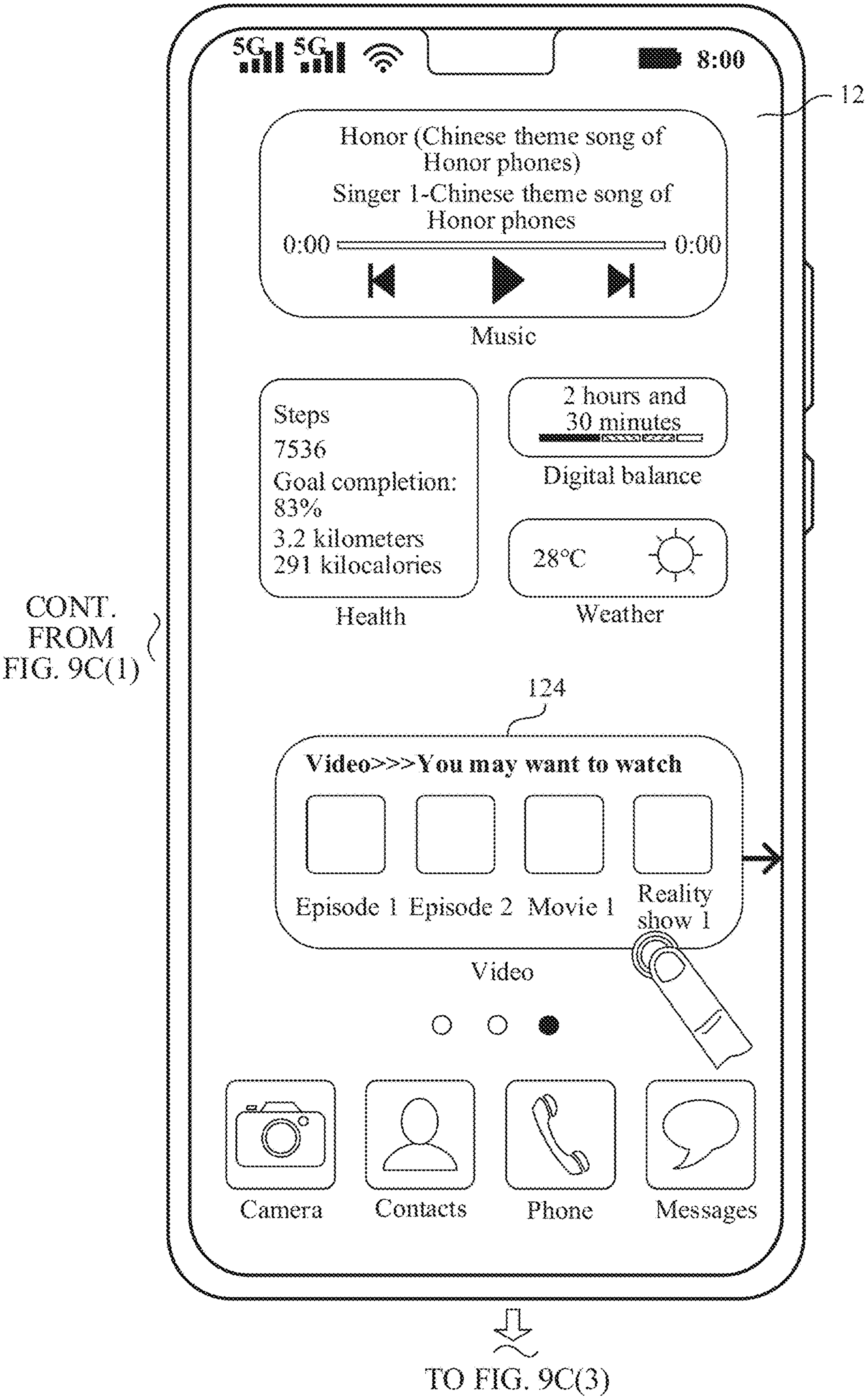
TO FIG. 9C(3)
FIG. 9C(2)

CONT. FROM
FIG. 9C(2)
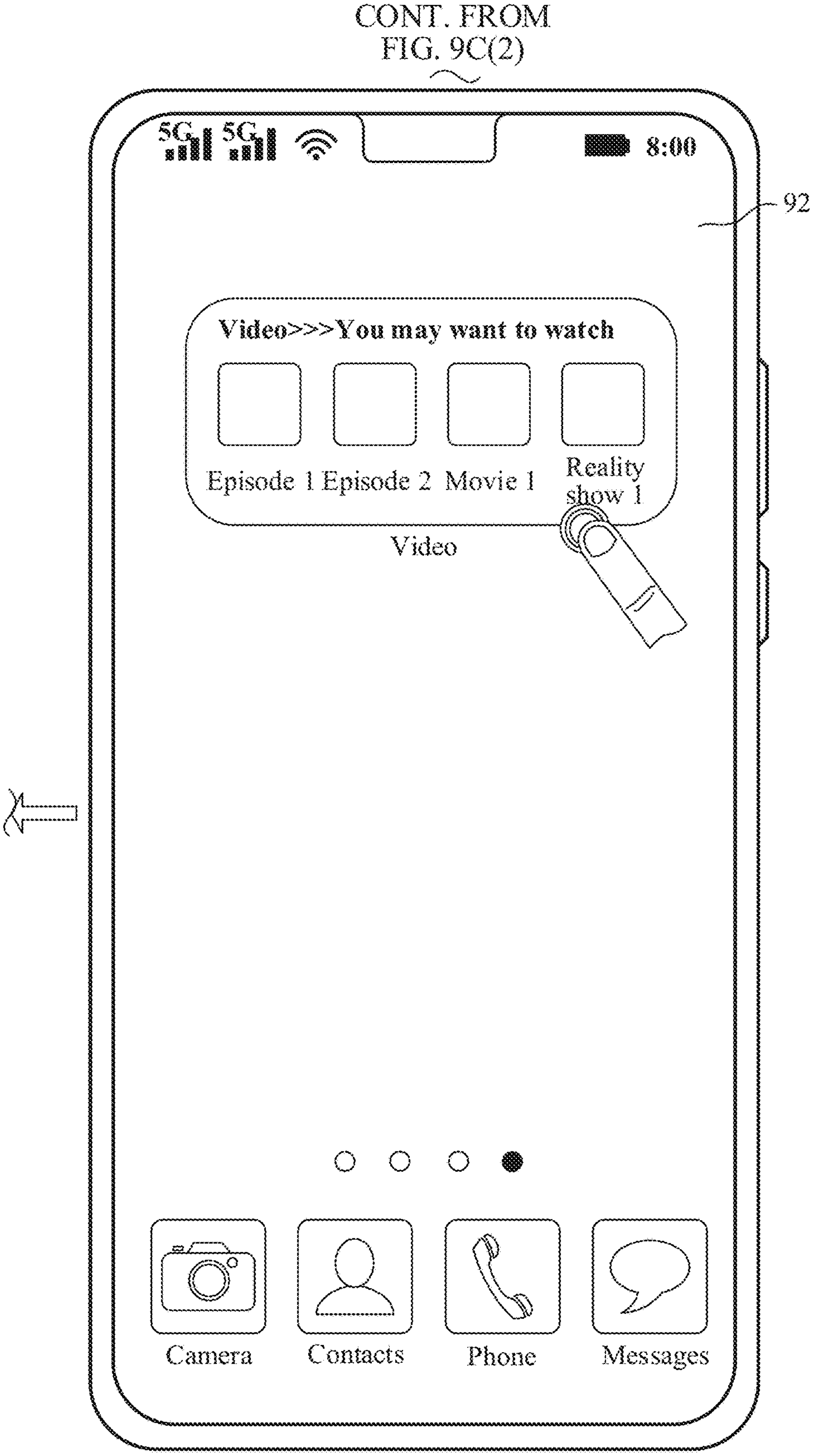
TO FIG.
9C(4)
FIG. 9C(3)

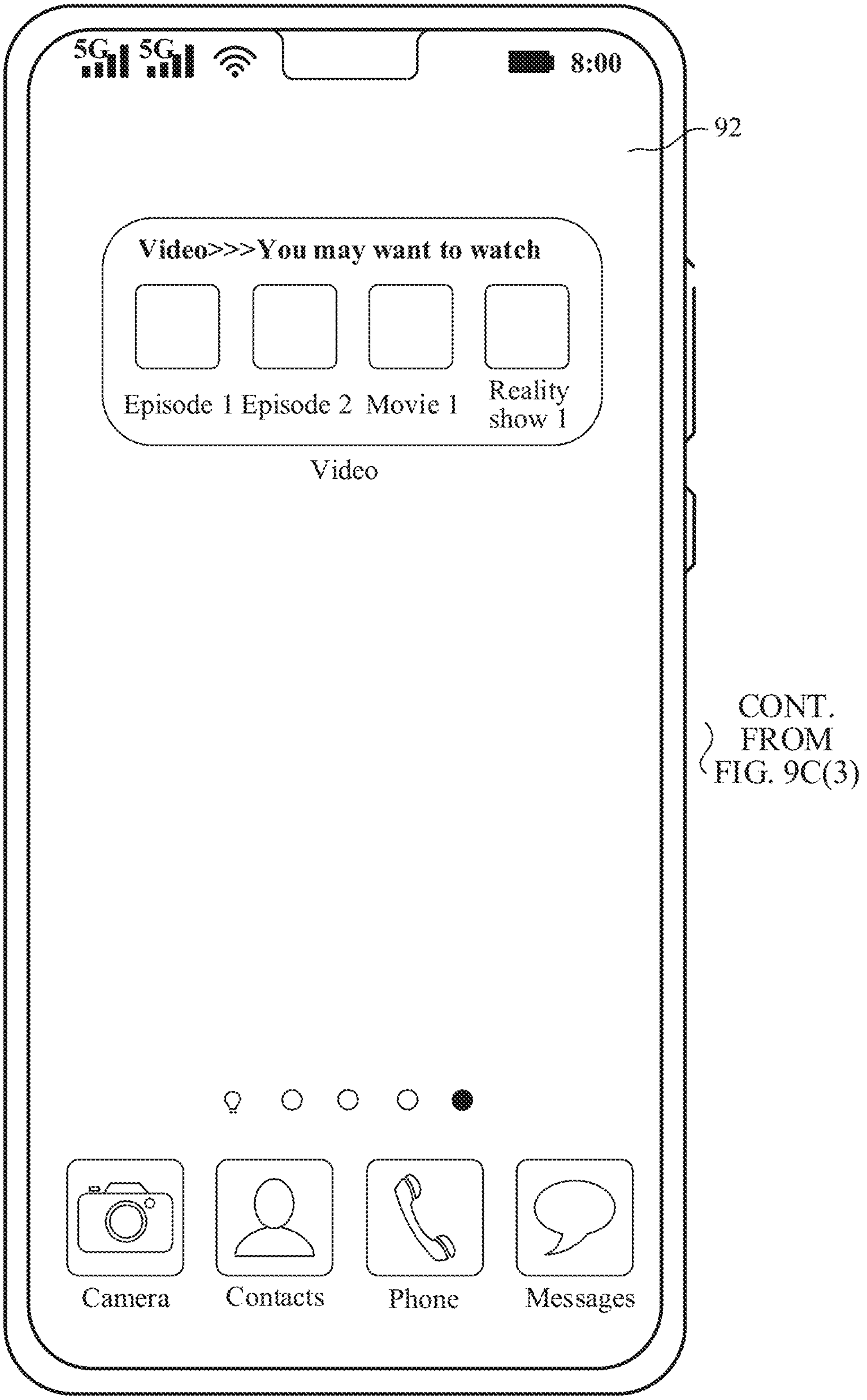
FIG. 9C(4)

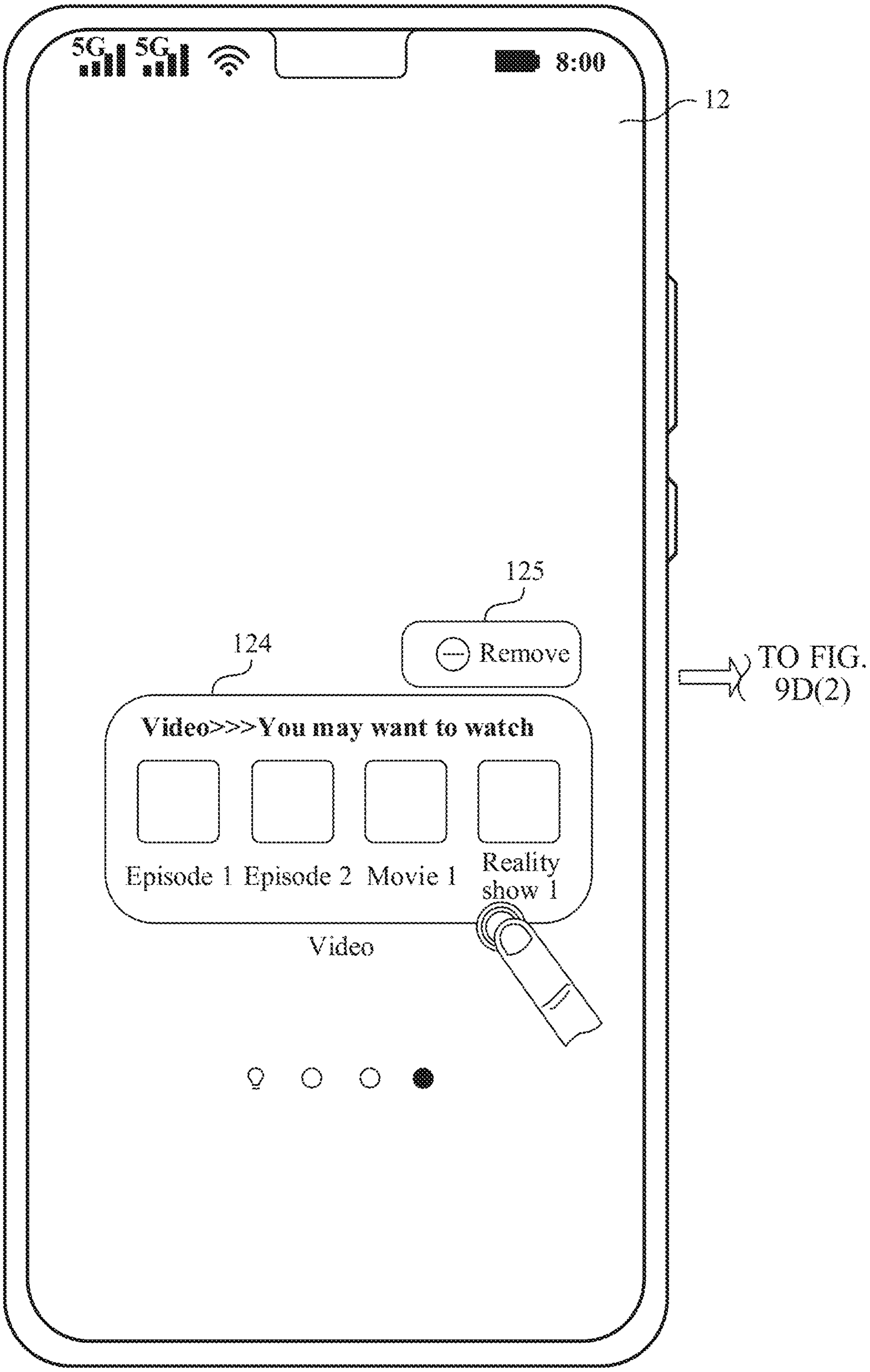
FIG. 9D(1)

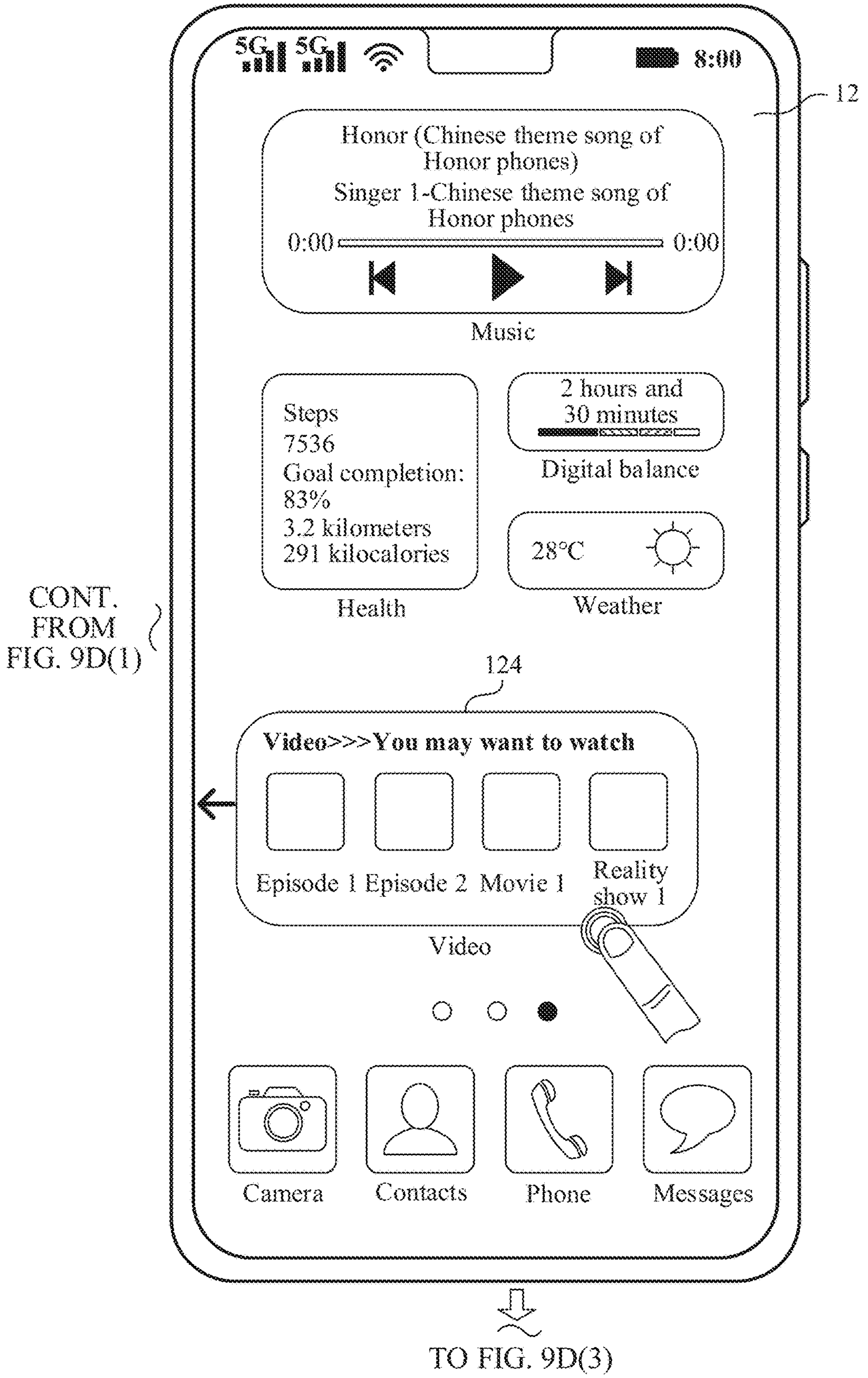
FIG. 9D(2)

CONT. FROM FIG. 9D(2)
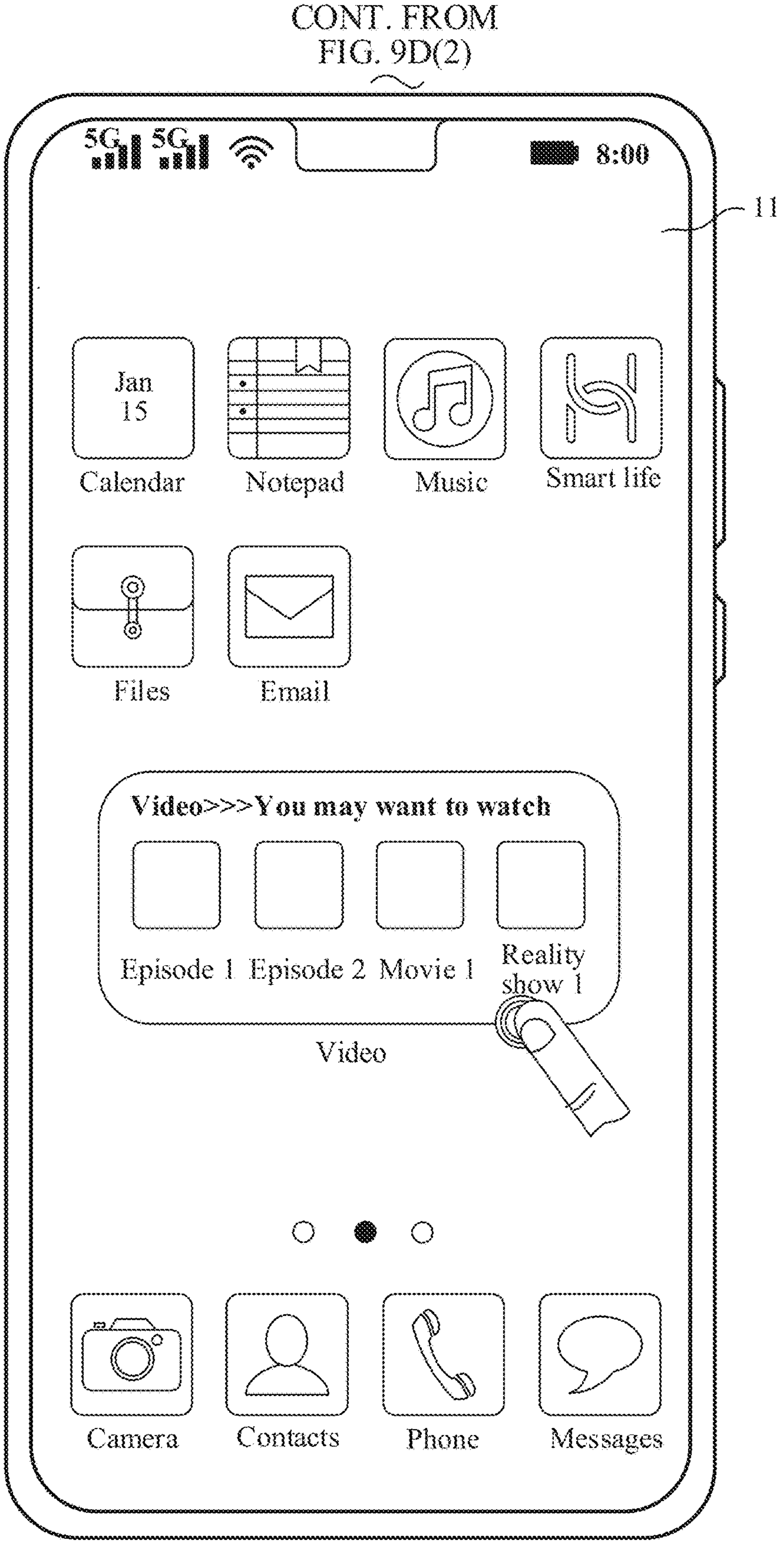
TO FIG. 9D(4)
FIG. 9D(3)

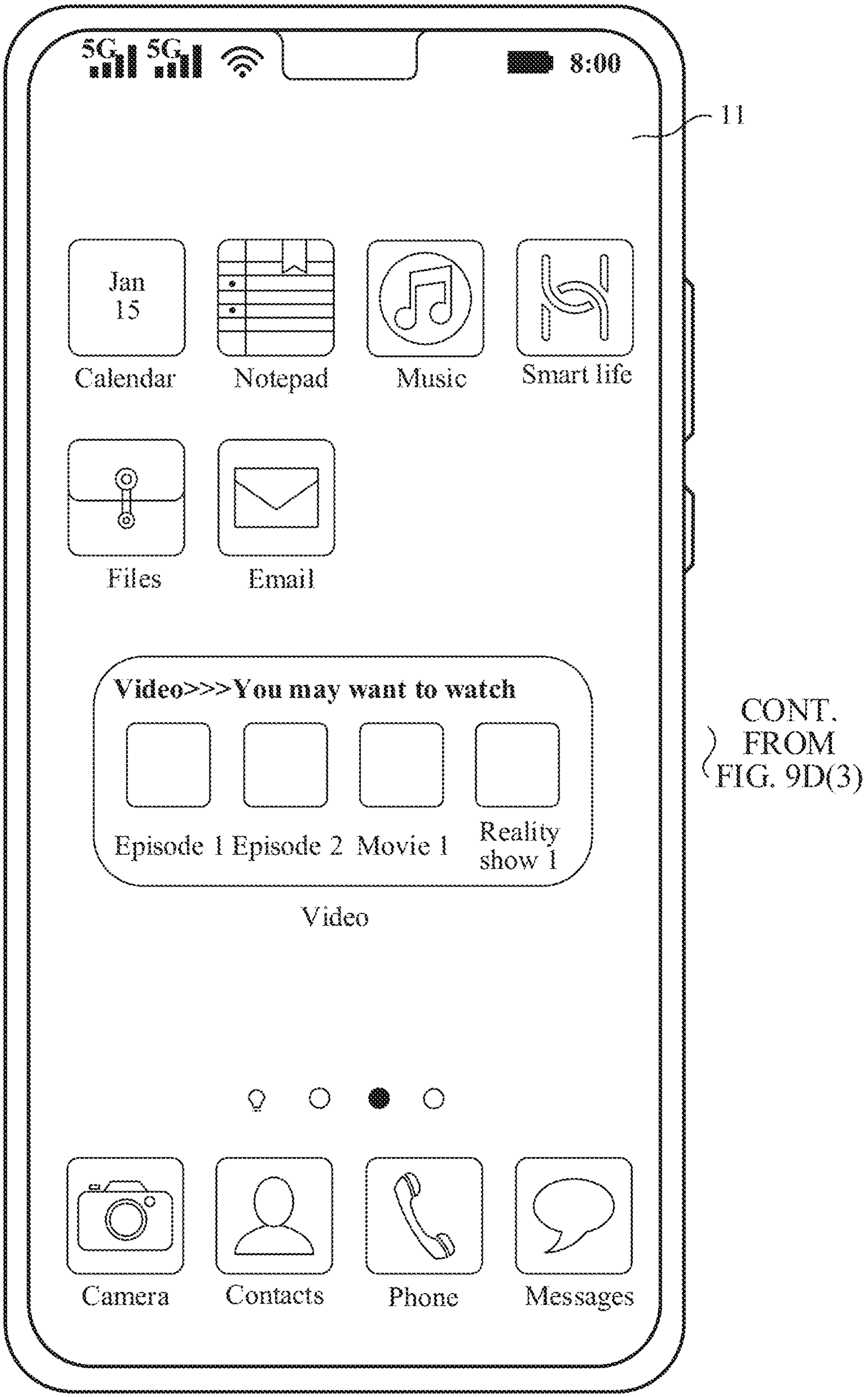
FIG. 9D(4)

INTERFACE DISPLAY METHOD AND ELECTRONIC DEVICE

CROSS-REFERENCE TO RELATED APPLICATIONS

This application is a national stage of International Application No. PCT/CN2023/112997, filed on Aug. 15, 2023, which claims priority to Chinese Patent Application No. 202211319415.6, filed on Oct. 26, 2022, both of which are incorporated herein by reference in their entireties.

TECHNICAL FIELD

This application relates to the technical field of terminals, and in particular, to an interface display method and an electronic device.

BACKGROUND

A card is a new form in which an electronic device presents information to a user. The card not only can serve as an entrance to an application (APP), a fast application, a web page, or the like corresponding thereto, but also can intuitively display key information of the APP, the fast application, or the web page corresponding thereto to a user. Therefore, presenting information to a user in the form of the card not only can improve efficiency of operating an electronic device by the user, but also can facilitate quick obtaining of key information by the user, which can bring significant convenience to the user.

A desktop of an electronic device is one of user interfaces frequently used by users. To promote a card function of an electronic device to users, a manufacturer of the electronic device may use a screen of a desktop as a card display screen before delivery of the electronic device, so that the electronic device displays some pre-recommended cards to users on the card display screen after first power-on since delivery.

However, many users tend to delete the card display screen from the desktop before the electronic device completes display of the pre-recommended card after first power-on. As a result, the card function of the electronic device cannot be effectively promoted.

SUMMARY

Embodiments of this application provide an interface display method and an electronic device. An editing interface of a target screen is not displayed after an electronic device enters a desktop editing mode when the electronic device was not connected to a network since first power-on. Because a user cannot edit the target screen when the electronic device was not connected to a network since the first power-on, effective promotion of a card function of the electronic device can be achieved.

According to a first aspect, an embodiment of this application provides an interface display method, including:

displaying a first interface;

displaying a second interface in response to a first switching operation inputted by a user on the first interface, where the second interface is a target screen of a desktop of the electronic device, and the target screen is configured to display a pre-recommended card;

displaying a third interface at a first time point in response to an operation used for entering a desktop editing mode inputted by the user on the second interface, where the third interface is an interface of the first interface in the desktop editing mode, and the electronic device was not connected to a network since first power-on to the first time point;

displaying an interface of another screen in the desktop editing mode in response to a second switching operation inputted by the user on the third interface, where the another screen is a screen of the desktop other than the target screen and the first interface;

exiting the desktop editing mode, and then connecting the electronic device to a network in response to a networking operation; and displaying a fourth interface at a second time point in response to the operation used for entering the desktop editing mode inputted by the user on the second interface after connecting to the network, where the fourth interface is an interface of the second interface in the desktop editing mode, and the second time point is later than the first time point.

Optionally, the target screen may be a second right screen of the desktop of the electronic device. The first interface may be a rightmost home screen of the desktop of the electronic device, and the first switching operation inputted by the user on the first interface may be a leftward swiping operation.

Optionally, the operation used for entering the desktop editing mode inputted by the user on the second interface may be a pinch-in operation or a long press operation.

Optionally, the network may include a wide area network. In an example, the connecting the electronic device to the network may include connecting to the wide area network (which may be the Internet) through a mobile communication network or a wireless local area network. Optionally, after being connected to the wide area network, the electronic device may obtain data through the network.

Optionally, the second switching operation inputted by the user on the third interface may be a leftward swiping operation or a rightward swiping operation.

Optionally, the networking operation may be as follows. The user installs a subscriber identification module (SIM) card in the electronic device, so that the electronic device is triggered to connect to the mobile communication network. Alternatively, the user clicks/taps a wireless local area network connection control.

According to the interface display method provided in this embodiment, when the electronic device enters the desktop editing mode from the target screen of the desktop in a case that the electronic device was not connected to a network since the first power-on, the interface of the first interface in the desktop editing mode, that is, the third interface, is displayed. Moreover, when the user inputs the second switching operation on the third interface, the electronic device displays the interface of the another screen in the desktop editing mode. The another screen is a screen of the desktop other than the target screen and the first interface. In other words, the electronic device does not display an editing interface of the target screen. Because the user cannot edit the target screen when the electronic device was not connected to a network since the first power-on, effective promotion of a card function of the electronic device can be achieved. In addition, when the electronic device enters the desktop editing mode from the target screen of the desktop in a case that the electronic device was connected to a network since the first power-on, the electronic device displays the interface of the second interface in the desktop editing mode, that is, the fourth interface. The user can edit the target screen when the electronic device was connected to a network after the first power-on. That the electronic device was connected to a network means that after the electronic device completes effective promotion of the card function. In this case, the user is allowed to edit the target screen, which can improve usage experience for the user.

In an optional implementation of the first aspect, the first interface, the second interface, the third interface, and the fourth interface each include first navigation points. A quantity of the first navigation points on the first interface is equal to a quantity of the first navigation points on the second interface.

When a leftmost home screen of the desktop is enabled, a quantity of the first navigation points on the third interface is less than the quantity of the first navigation points on the first interface by 2, and a quantity of the first navigation points on the fourth interface is less than the quantity of the first navigation points on the first interface by 1.

When the leftmost home screen of the desktop is disabled, the quantity of the first navigation points on the third interface is less than the quantity of the first navigation points on the first interface by 1, and the quantity of the first navigation points on the fourth interface is equal to the quantity of the first navigation points on the first interface.

Optionally, the first navigation points indicate positional relationships between a screen of the desktop currently displayed on the electronic device and other screens of the desktop.

According to the interface display method provided in this implementation, arranging the first navigation points on the first interface, the second interface, the third interface, and the fourth interface helps the user learn the positional relationships between the screen of the desktop currently displayed on the electronic device and the other screens of the desktop. In addition, after the electronic device enters the desktop editing mode when the electronic device was not connected to a network since the first power-on, the first navigation point indicating the editing interface of the target screen is not displayed, so that the user cannot edit the target screen.

In an optional implementation of the first aspect, an application icon and/or a widget is displayed in a first display area of the first interface, and an application icon is displayed in a second display area of the first interface.

The third interface does not include the application icon displayed in the second display area of the first interface.

According to the interface display method provided in this implementation, because the third interface does not include the application icon displayed in the second display area of the first interface, the user cannot edit the application icon displayed in the second display area of the first interface in the desktop editing mode.

In an optional implementation of the first aspect, the third interface further includes a thumbnail page of the first interface, a desktop editing option, and two screen addition page navigation points.

The thumbnail page includes the application icon/or the widget displayed in the first display area of the first interface.

Optionally, the screen addition page navigation point indicates a positional relationship between a screen addition indication page in the desktop editing mode and another screen in the desktop editing mode.

According to the interface display method provided in this implementation, arranging the two screen addition page navigation points on the third interface achieves intuitive guidance for a screen addition interface in the desktop editing mode, so that the user learns that the user can add a new screen on a left side of a main screen of the desktop and/or a right side of the rightmost screen of the desktop.

In an optional implementation of the first aspect, after the displaying a third interface and before the existing the desktop editing mode, the method further includes: displaying the second interface or the first interface in response to an operation used for exiting the desktop editing mode inputted by the user on the third interface, to exit the desktop editing mode.

In an optional implementation of the first aspect, after the exiting the desktop editing mode and before the connecting to a network, the method further includes: skipping responding when receiving, at a third time point, a long press operation or a dragging operation performed by the user on a target card on the second interface, wherein the third time point is later than the first time point and earlier than the second time point.

According to the interface display method provided in this implementation, the electronic device does not response to the long press operation or the dragging operation performed by the user on the target card on the target screen in a case that the electronic device was not connected to a network since the first power-on. Because the user cannot delete or drag the target card on the target screen when the electronic device was not connected to a network since the first power-on, effective promotion of the card function of the electronic device can be achieved.

In an optional implementation of the first aspect, after the connecting to the network, the method further includes: displaying an editing menu of the target card in response to the long press operation performed by the user on the target card on the second interface, where the editing menu includes a removal control for the target card.

According to the interface display method provided in this implementation, when the electronic device was connected to a network since the first power-on, the electronic device allows the user to remove any card from the target screen, which can improve usage experience for the user.

According to a second aspect, an embodiment of this application provides another interface display method, which is applicable to an electronic device. The interface display method includes:

displaying a first interface;

displaying a second interface in response to a first switching operation inputted by a user on the first interface, where the second interface is a target screen of a desktop of the electronic device, and the target screen is configured to display a pre-recommended card;

displaying a third interface at a first time point in response to an operation of dragging a desktop element on the first interface to another screen performed by the user, where the third interface is not a display interface of the second interface, the electronic device was not connected to a network since first power-on to the first time point, and the another screen is a screen of the desktop of the electronic device other than the first interface;

connecting the electronic device to a network in response to a networking operation; and displaying the second interface at a second time point in response to the operation of dragging the desktop element on the first interface to the another screen performed by the user after connecting to the network.

In an optional implementation of the second aspect, after the displaying a second interface and before the connecting to the network, the method further includes: receiving, at a third time point, a long press operation or a dragging operation performed by the user on a target card on the target screen, and skipping responding to the long press operation or the dragging operation, where the electronic device was not connected to a network since the first power-on to a fourth time point.

In an optional implementation of the second aspect, after the connecting to a network, the method further includes: displaying an editing menu of the target card in response to the long press operation performed by the user on the target card on the second interface, where the editing menu includes a removal control for the target card.

According to a third aspect, an embodiment of this application provides an electronic device, including one or more processors and one or more memories. The one or more memories store one or more computer-executable programs. The one or more computer-executable programs include computer instructions. The computer instructions, when executed by the one or more processors, cause the electronic device to perform the interface display method in any implementation of the above first aspect or second aspect.

According to a fourth aspect, an embodiment of this application provides a computer-readable storage medium, storing a computer-executable program. The computer-executable program, when invoked by a computer, causes the computer to perform the interface display method in any implementation of the above first aspect or second aspect.

According to a fifth aspect, an embodiment of this application provides a chip system, including a processor. The processor is coupled to a memory. The processor is configured to execute a computer-executable program stored in the memory, to implement the interface display method in any implementation of the above first aspect or second aspect. The chip system may be a single chip or a chip module composed of a plurality of chips.

According to a sixth aspect, an embodiment of this application provides a computer-executable program product. The computer-executable program product, when running in an electronic device, causes the electronic device to perform the interface display method of any implementation of the above first aspect or second aspect.

It may be understood that, for beneficial effects of the third aspect to the fifth aspect, refer to the relevant description in the above first aspect or second aspect, and details are not described herein.

BRIEF DESCRIPTION OF DRAWINGS

FIG. 4A(1) to FIG. 4B(2) are schematic diagrams of a view structure of a desktop of a mobile phone according to an embodiment of this application;

FIG. 5A(1) to FIG. 5A(6) are schematic diagrams of user interfaces that may be involved when a mobile phone enters a desktop editing mode in a first network state according to an embodiment of this application;

FIG. 5B(1) to FIG. 5B(5) are schematic diagrams of user interfaces that may be involved when a mobile phone exits a desktop editing mode in a first network state according to an embodiment of this application;

FIG. 5C(1) to FIG. 5C(3) are schematic diagrams of user interfaces that may be involved when a mobile phone exits a desktop editing mode in a first network state according to another embodiment of this application;

FIG. 6A(1) to FIG. 6A(3) are schematic diagrams of user interfaces that may be involved when a mobile phone enters a desktop editing mode and exits the desktop editing mode in a second network state according to an embodiment of this application;

FIG. 6B(1) to FIG. 6B(4) are schematic diagrams of user interfaces that may be involved after a mobile phone exits the desktop editing mode editing mode in a second network state according to an embodiment of this application;

FIG. 6C(1) to FIG. 6C(3) are schematic diagrams of user interfaces that may be involved when a mobile phone enters a desktop editing mode and exits the desktop editing mode in a second network state according to another embodiment of this application;

FIG. 6D(1) to FIG. 6D(5) are schematic diagrams of user interfaces that may be involved when a mobile phone enters a desktop editing mode and exits the desktop editing mode in a second network state according to still another embodiment of this application;

FIG. 9A(1) to FIG. 9A(4) are schematic diagrams of user interfaces that may be involved when a mobile phone enters a desktop element dragging mode and exits the desktop element dragging mode in a first network state according to an embodiment of this application;

FIG. 9B(1) to FIG. 9B(4) are schematic diagrams of user interfaces that may be involved when a mobile phone enters a desktop element dragging mode and exits the desktop element dragging mode in a second network state according to an embodiment of this application;

FIG. 9C(1) to FIG. 9C(4) are schematic diagrams of user interfaces that may be involved when a mobile phone enters a desktop element dragging mode and exits the desktop element dragging mode in a second network state according to another embodiment of this application; and FIG. 9D(1) to FIG. 9D(4) are schematic diagrams of user interfaces that may be involved when a mobile phone enters a desktop element dragging mode and exits the desktop element dragging mode in a second network state according to still another embodiment of this application.

DESCRIPTION OF EMBODIMENTS

It should be noted that, terms used in implementations of embodiments of this application are merely used to explain specific embodiments of this application, and are not intended to limit this application. In the description of embodiments of this application, "/" means "or", unless otherwise specified. For example, A/B may represent A or B. In this specification, "and/or" is merely an association relationship for describing associated objects, and indicates that three relationships may exist. For example, A and/or B may represent the following three cases: only A exists, both A and B exist, and only B exists. In addition, in the description of embodiments of this application, unless otherwise specified, "a plurality of" means two or more, and "at least one" and "one or more" mean one, two, or more.

The following terms "first" and "second" are merely used for description, and cannot be construed as indicating or implying relative importance or implicitly indicating a quantity of indicated technical features. Therefore, a feature defined by "first" or "second" may explicitly or implicitly include one or more of the features.

Reference to "an embodiment" or "some embodiments" described in this specification means that a specific characteristic, structure, or feature described in combination with this embodiment is included in one or more embodiments of this application. Therefore, statements "in an embodiment", "in some embodiments", "in some other embodiments", "in some additional embodiments", and the like in different places in this specification do not necessarily refer to the same embodiment, but mean "one or more but not all embodiments", unless otherwise specially emphasized in another manner. Terms "comprise", "include", "have", and variations thereof all mean "including but not limited to", unless otherwise specifically emphasized in another manner.

A user interface is a medium for interaction between an electronic device and a user. A desktop of an electronic device is one of user interfaces frequently used by users, which is usually a user interface displayed after the electronic device is powered on. The desktop of the electronic device may include at least one screen. When the desktop of the electronic device includes a plurality of screens, a user may switch the electronic device between different screens of the desktop through a leftward/rightward swiping operation. The desktop of the electronic device is described below by using an example in which the electronic device is a mobile phone.

FIG. 1A to FIG. 1F are schematic diagrams of a desktop of a mobile phone according to an embodiment of this application.

Figure 1A:
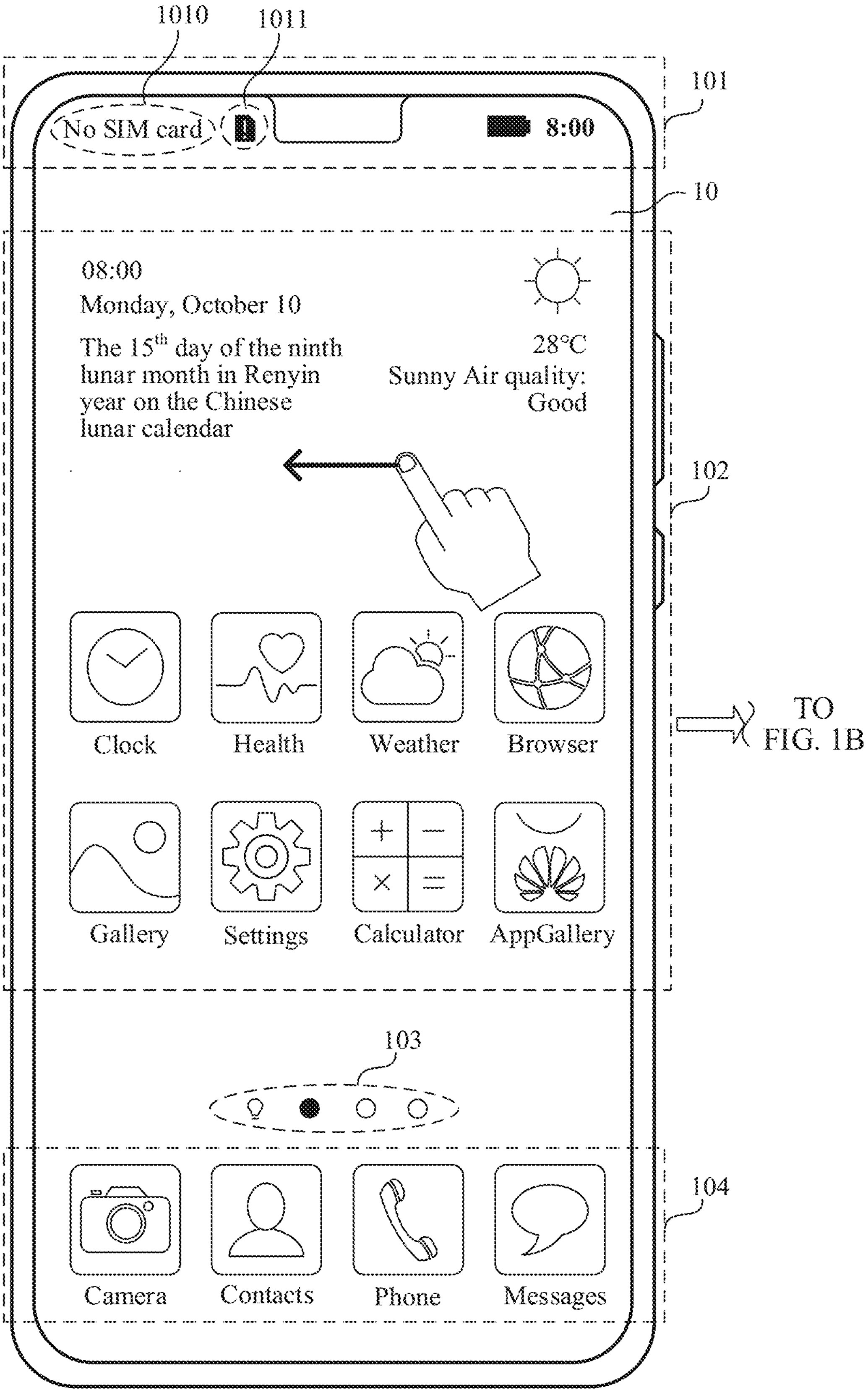
FIG. 1A to FIG. 1F are schematic diagrams of a desktop of a mobile phone according to an embodiment of this application.
Figure 1B:
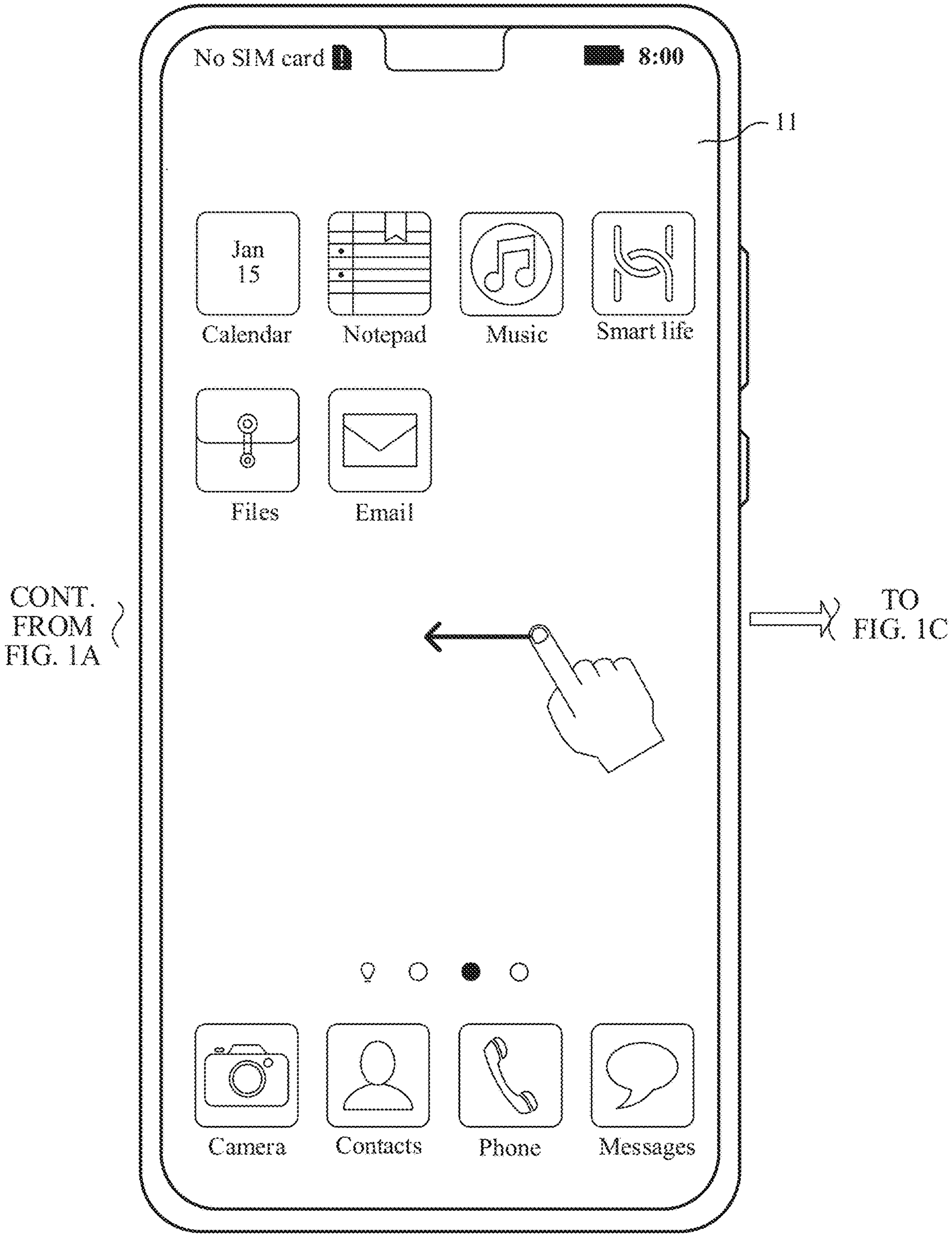
Figure 1C:
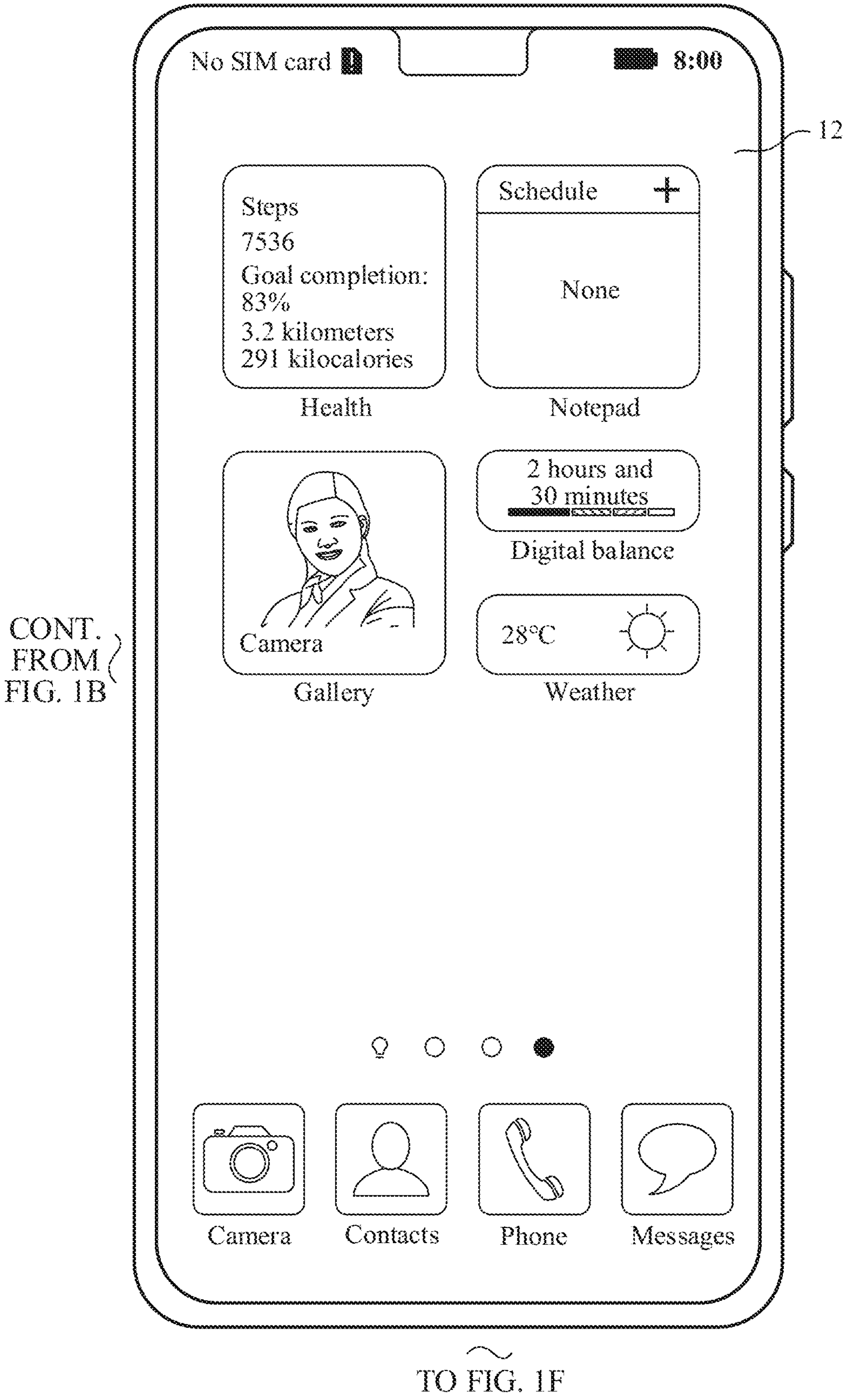
Figure 1D:
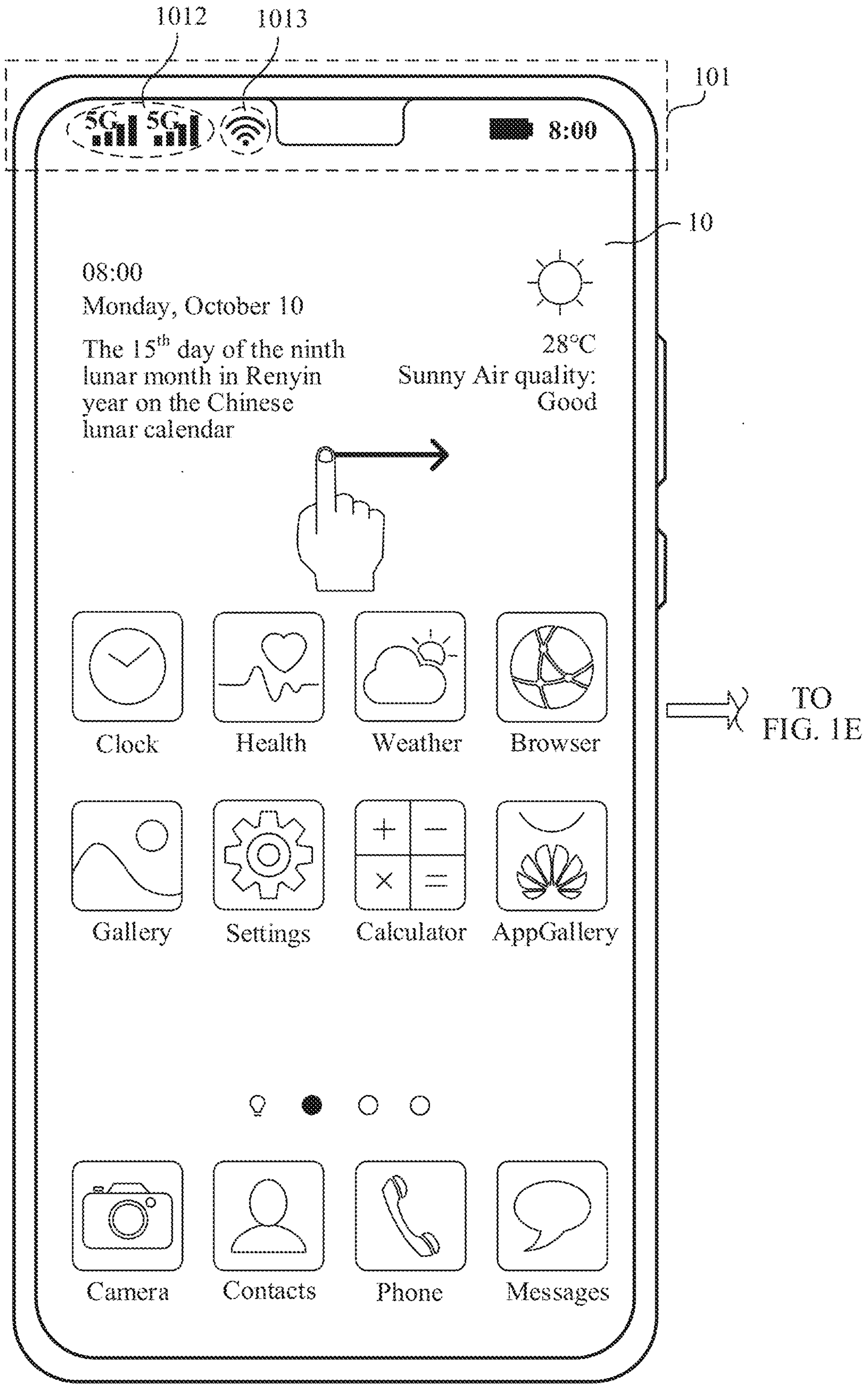
Figure 1E:
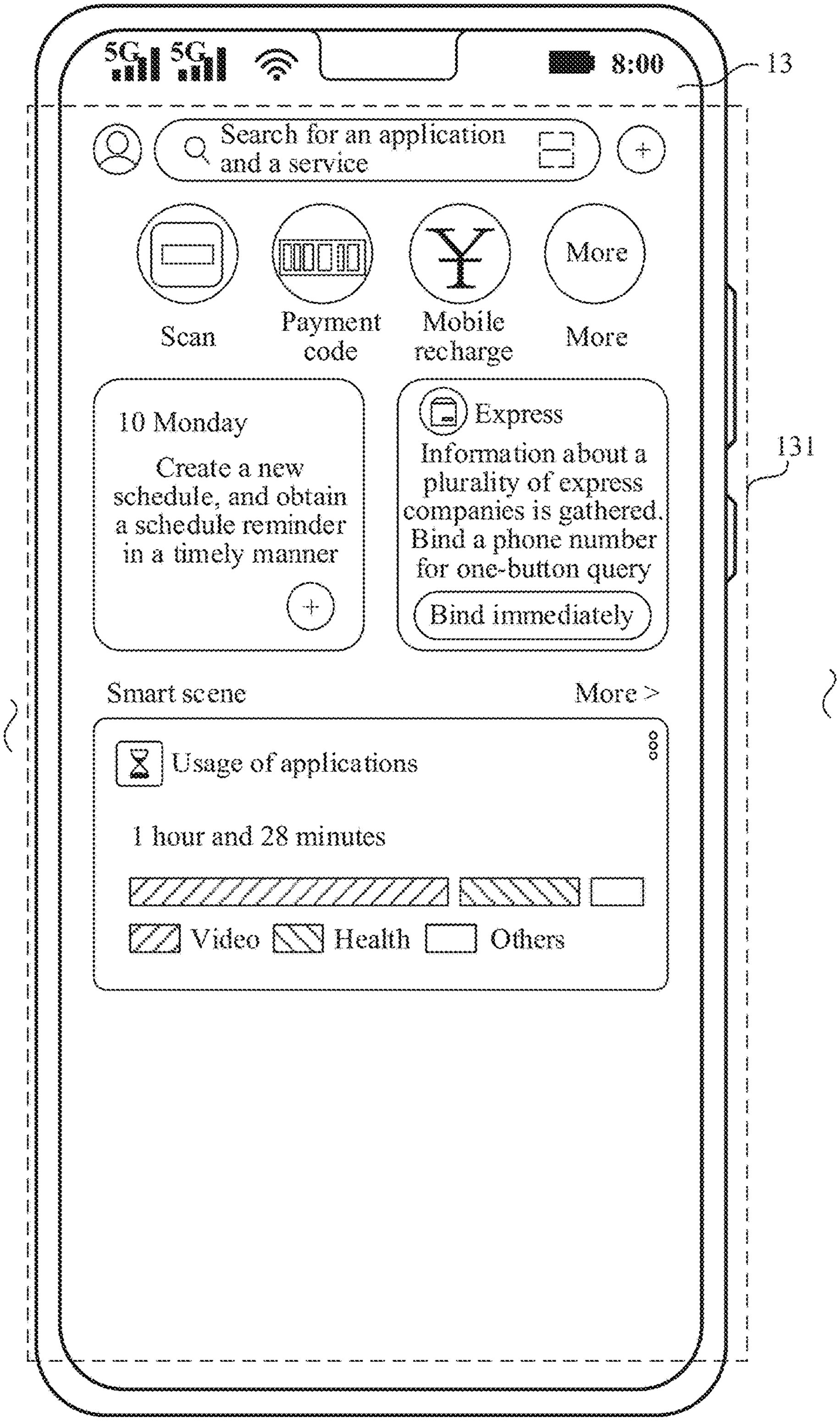

User interfaces shown in FIG. 1A and FIG. 1D are a main screen 10 of the desktop of the mobile phone, which may also be referred to as a main interface of the mobile phone, and is usually a user interface displayed after the mobile phone is powered on. A user interface shown in FIG. 1B is a rightmost home screen 11 (that is, a first screen on a right side of the main screen 10) of the desktop of the mobile phone, which is a user interface displayed on the mobile phone after the main screen 10 of the desktop of the mobile phone is swiped leftward. A user interface shown in FIG. 1C is a second right screen 12 (that is, a second screen on the right side of the main screen 10) of the desktop of the mobile phone, which is a user interface displayed on the mobile phone after the rightmost home screen 11 of the desktop of the mobile phone is swiped leftward. A user interface shown in FIG. 1E is a leftmost home screen 13 of the desktop of the mobile phone, which is a user interface displayed on the mobile phone after the desktop of the mobile phone is swiped to the leftmost side.

It should be noted that, FIG. 1A to FIG. 1F are merely an example of the desktop of the mobile phone. In other embodiments, one or more screens may exist between the main screen 10 and the leftmost home screen 13 of the desktop of the mobile phone, and the right side of the main screen 10 of the desktop of the mobile phone may include more or fewer screens than that in FIG. 1A to FIG. 1F. This is not limited in this embodiment of this application. For ease of understanding, in this embodiment of this application, a description is provided by using an example in which the desktop of the mobile phone includes the main screen 10, the rightmost home screen 11, the second right screen 12, and the leftmost home screen 13 shown in FIG. 1A to FIG. 1F.

As shown in FIG. 1A, when a user interface currently displayed on the mobile phone is the main screen 10 of the desktop of the mobile phone, a user may input a leftward swiping operation on the main screen 10 of the desktop of the mobile phone. When receiving the leftward swiping operation inputted by the user on the main screen 10, the mobile phone may display the rightmost home screen 11 of the desktop of the mobile phone shown in FIG. 1B in response to the leftward swiping operation.

As shown in FIG. 1B, when the user interface currently displayed on the mobile phone is the rightmost home screen 11 of the desktop of the mobile phone, the user may input a leftward swiping operation on the rightmost home screen 11 of the desktop of the mobile phone. When receiving the leftward swiping operation inputted by the user on the rightmost home screen 11, the mobile phone may display the second right screen 12 of the desktop of the mobile phone shown in FIG. 1C in response to the leftward swiping operation.

As shown in FIG. 1D, when the user interface currently displayed on the mobile phone is the main screen 10 of the desktop of the mobile phone, the user may input a rightward swiping operation on the main screen 10 of the desktop of the mobile phone. When receiving the rightward swiping operation inputted by the user on the main screen 10, the mobile phone may display the leftmost home screen 13 of the desktop of the mobile phone shown in FIG. 1E in response to the rightward swiping operation.

It may be understood that the screens of the desktop of the mobile phone other than the leftmost home screen 13 may have a same interface layout, and an interface layout of the leftmost home screen 13 of the desktop of the mobile phone may be different from the interface layouts of the other screens of the desktop of the mobile phone. The interface layouts of the screens of the desktop of the mobile phone other than the leftmost home screen 13 and the interface layout of the leftmost home screen 13 are described below.

For the screens (for example, the main screen 10, the rightmost home screen 11, and the second right screen 12) of the desktop of the mobile phone other than the leftmost home screen 13, for example, the main screen 10 of the desktop of the mobile phone, as shown in FIG. 1A, the screen may include a status bar 101, a first display area 102, first navigation points 103, and a second display area 104 distributed from top to bottom.

The status bar 101 may include a description about a current networking status, a battery level indicator, a time indicator, and the like of the mobile phone.

In an example, as shown in FIG. 1A, when the mobile phone currently has no SIM card installed therein (that is, the mobile phone currently is not connected to a mobile communication network) and the mobile phone currently is not connected to a wireless local area network (WLAN) (for example, a wireless fidelity (Wi-Fi) network), the description about the current networking status may include a text description 1010 and/or a graphic indicator 1011 indicating that the mobile phone currently has no SIM card installed therein. The text description 1010 indicating that the mobile phone currently has no SIM card installed therein, for example, may be "No SIM card".

In an example, as shown in FIG. 1D, when the mobile phone is currently connected to the mobile communication network, the description about the current networking status may include one or more signal strength indicators 1012 of a mobile communication network signal. When the mobile phone is currently connected to the Wi-Fi network, the description of the current networking status may include a signal strength indicator 1013 of a Wi-Fi network signal.

The first display area 102 may be configured to display various types of desktop elements, including but not limited to an application icon and/or a widget (web widget). A presentation form of the widget may include but is not limited to a window widget, a card, and a card stack.

The first navigation points 103 indicate positional relationships between a currently displayed screen of the desktop of the mobile phone and the other screens of the desktop of the mobile phone. In some embodiments, a quantity of the first navigation points 103 on each screen (other than the leftmost home screen 13) of the desktop of the mobile phone is equal to a quantity of screens of the desktop of the mobile phone. For example, assuming that the desktop of the mobile phone includes four screens: the main screen 10, the rightmost home screen 11, the second right screen 12, and the leftmost home screen 13, each screen (other than the leftmost home screen 13) of the desktop of the mobile phone includes four first navigation points 103.

The second display area 104 is configured to display an application icon. A first difference between the second display area 104 and the first display area 102 is that when the desktop of the mobile phone is switched between the screens other than the leftmost home screen 13, the application icon displayed in the second display area 104 does not change with the switching of the desktop of the mobile phone, but desktop elements displayed in the first display area 102 change with the switching of the desktop of the mobile phone. In an example, as shown in FIG. 1A, FIG. 1B, and FIG. 1C, different desktop elements are displayed in the first display area 102 of the main screen 10, a first display area of the rightmost home screen 11, and a first display area of the second right screen 12 of the desktop of the mobile phone while same application icons are displayed in the second display area 104 of the main screen 10, a second display area of the rightmost home screen 11, and a second display area of the second right screen 12 of the desktop of the mobile phone.

A second difference between the second display area 104 and the first display area 102 is that only one type of desktop elements, that is, application icons may be displayed in the second display area 104 while a plurality of types of desktop elements may be displayed in the first display area 102.

As shown in FIG. 1E, the leftmost home screen 13 of the desktop of the mobile phone may include a status bar and a third display area 131 below the status bar. The status bar on the leftmost home screen 13 is the same as the status bar of the screen of the desktop of the mobile phone other than the leftmost home screen 13. Therefore, for the status bar on the leftmost home screen 13, refer to the above relevant description of the status bar of the screen of the desktop of the mobile phone other than the leftmost home screen 13. The status bar on the leftmost home screen 13 is not described herein.

The third display area 131 may include a search box, one or more quick service entrances, one or more cards, and the like. The search box may allow the user to search for local or online applications, services, and the like of the mobile phone. The quick service entrances help a user quickly open an application or a service of the mobile phone. The quick service entrances, for example, may include “Scan”, “Payment code”, and “Mobile recharge”. The cards may be configured to display information, for example, express information or schedule information of a user.

Usually, to facilitate operations on the mobile phone for the user, to improve experience of using the mobile phone for the user, to achieve customization of the desktop of the mobile phone, or the like, the mobile phone allows the user to set the desktop of the mobile phone. For example, the mobile phone allows the user to add a screen to or remove a screen from the desktop of the mobile phone. The mobile phone allows the user to drag an existing desktop element (for example, an application icon, a window widget, or a card) on a screen of the desktop of the mobile phone to another screen of the desktop of the mobile phone (other than the leftmost home screen). The mobile phone allows the user to delete an existing desktop element on each screen of the desktop of the mobile phone. The mobile phone allows the user to add a desktop element on each screen of the desktop of the mobile phone.

In combination with the description in the background, to promote a card function of the mobile phone to the user, a manufacturer of the mobile phone may use a screen (for example, the second right screen 12) of the desktop of the mobile phone as a card display screen before delivery of the mobile phone, so that the mobile phone displays some pre-recommended cards to the user on the card display screen after first power-on since delivery. The pre-recommended cards usually include a card corresponding to a local service of the mobile phone and a card corresponding to an online service of the mobile phone. For the card corresponding to the online service of the mobile phone, the mobile phone needs to connect to a network to obtain information about the corresponding service from a cloud server, so as to achieve effective display of the type of card information. In other words, the mobile phone needs to connect to the wide area network (the Internet) to obtain data. If the mobile phone was not connected to a network since the first power-on, the mobile phone cannot obtain the information about the corresponding service. In this case, the mobile phone can display only cards corresponding to some local services on the card display screen, and cannot display the card corresponding to the online service.

In addition, for a cloned user, the manufacturer of the mobile phone usually hopes to recommend cards of interest on a card display page, based on a user profile of the cloned user since the first power-on of the mobile phone, to achieve personalized card recommendation for the user. If the mobile phone was not connected to a network since the first power-on, the mobile phone cannot obtain the user profile of the cloned user, and therefore cannot achieve personalized information recommendation for the user in the form of the card. An example in which the second right screen 12 of the desktop of the mobile phone is a preset card display screen is used. As shown in FIG. 1C, when the mobile phone was not connected to a network since the first power-on, only preset base cards are displayed on the card display screen. The base cards may be cards corresponding to the local service of the mobile phone, and may include, for example, “Health”, “Notepad”, “Gallery”, “Digital balance”, and “Weather”.

After the mobile phone is connected to a network, the mobile phone can obtain the user profile from the cloud server, and determine information of interest of the user based on the user profile. In an example, assuming that the mobile phone determines that the user is interested in music, health, digital balance, weather, and video based on the user profile, as shown in FIG. 1E, the mobile phone may display cards such as “Music”, “Health”, “Digital balance”, “Weather”, and “Video” on the card display screen. In other words, a quantity and content of cards displayed on the card display screen of the mobile phone may vary in different network states.

In combination with the above description, if the user removes the card display screen from the desktop of the mobile phone when the mobile phone was not connected to a network since the first power-on (that is, in the scenario corresponding to FIG. 1C), the mobile phone can neither achieve effective promotion of the card function nor achieve effective personalized information recommendation for the user in the form of the card. In other words, if an editing time of the card display screen is not limited, neither the effective promotion of the card function can be achieved, nor the effective personalized information recommendation for the user in the form of the card can be achieved.

For the above technical problem, embodiments of this application provide an interface display method and an electronic device. An editing interface of a target screen is not displayed after an electronic device enters a desktop editing mode when the electronic device was not connected to a network since first power-on. Because a user cannot edit the target screen when the electronic device was not connected to a network since the first power-on, effective promotion of a card function of the electronic device can be achieved.

The interface display method provided in embodiments of this application is applicable to an electronic device such as a mobile phone, a tablet computer, a wearable device, an on-board device, an augmented reality (AR) device/virtual reality (VR) device, a notebook computer, an ultra-mobile personal computer (UMPC), a netbook, or a personal digital assistant (PDA). A specific type of the electronic device is not limited in embodiments of this application.

Figure 2:
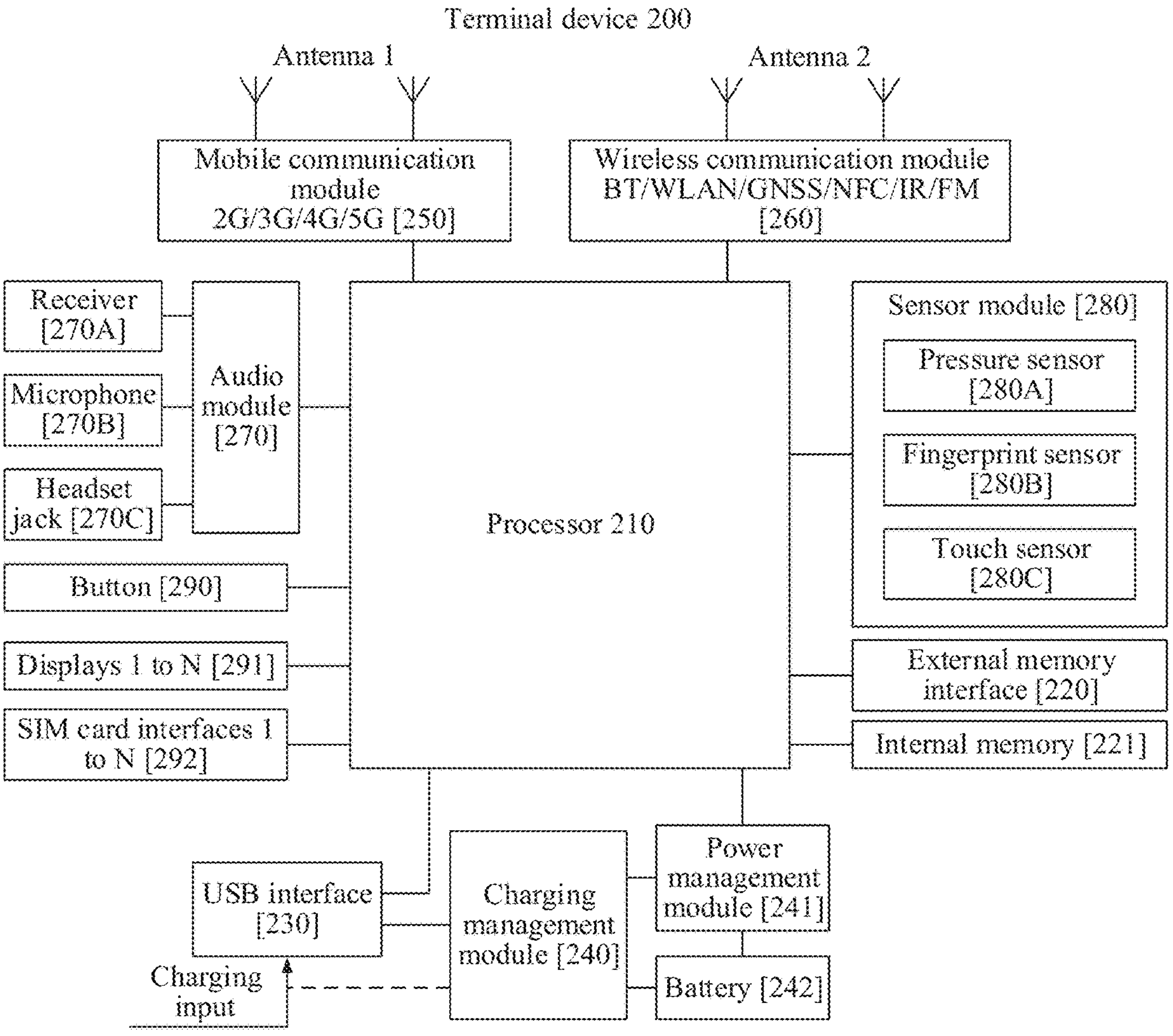
FIG. 2 is a schematic structural diagram of an electronic device according to an embodiment of this application.

A structure of the electronic device to which the interface display method provided in embodiments of this application is applicable is described below by using an example in which the electronic device is a mobile phone. FIG. 2 is a schematic structural diagram of an electronic device according to an embodiment of this application.

An electronic device 200 may include a processor 210, an external memory interface 220, an internal memory 221, a universal serial bus (USB) interface 230, a charging management module 240, a power management module 241, a battery 242, an antenna 1, an antenna 2, a mobile communication module 250, a wireless communication module 260, an audio module 270, a receiver 270A, a microphone 270B, a headset jack 270C, a sensor module 280, a button 290, a display 291, a subscriber identification module (SIM) card interface 292, and the like. The sensor module 280 may include a pressure sensor 280A, a fingerprint sensor 280B, a touch sensor 280C, and the like.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and command center of the electronic device 200. The controller may generate an operation control signal based on instruction operation code and a timing signal, and control instruction obtaining and instruction execution.

A memory may be further arranged in the processor 210, which is configured to store instructions and data. In some embodiments, the memory in the processor 210 is a cache. The memory may store instructions or data recently used or cyclically used by the processor 210. If the processor 210 needs to use the instructions or the data again, the processor may directly invoke the instructions or the data from the memory. This avoids repeated access, and reduces a waiting time of the processor 210, thereby improving system efficiency.

In some embodiments, the processor 210 may include one or more interfaces. The interface may include an inter-integrated circuit (I2C) interface, an inter-integrated circuit sound (12S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus, and includes a serial data line (SDA) and a serial clock line (SCL). In some embodiments, the processor 210 may include a plurality of I2C buses. The processor 210 may be respectively coupled to the touch sensor 280C, a charger, a flash, and the like through different I2C bus interfaces. For example, the processor 210 may be coupled to the touch sensor 280C through the I2C interface, so that the processor 210 communicates with the touch sensor 280C through the I2C bus interface, to implement a touch function of the electronic device 200.

The I2S interface may be configured to perform audio communication. In some embodiments, the processor 210 may include a plurality of 12S buses. The processor 210 may be coupled to the audio module 270 through the I2S bus, to implement communication between the processor 210 and the audio module 270. In some embodiments, the audio module 270 may transmit an audio signal to the wireless communication module 260 through the I2S interface, to implement a call answering function through a Bluetooth headset.

The PCM interface may be configured to perform audio communication, to sample, quantize, and encode an analog signal. In some embodiments, the audio module 270 may be coupled to the wireless communication module 260 through a PCM bus interface. In some embodiments, the audio module 270 may transmit the audio signal to the wireless communication module 260 through the PCM interface, to implement the answering function through the Bluetooth headset. The I2S interface and the PCM interface both may be configured to perform audio communication.

The UART interface is a universal serial data bus, and is configured to perform asynchronous communication. The bus may be a bidirectional communication bus. The UART interface may convert to-be-transmitted data between serial communication and parallel communication. In some embodiments, the UART interface is usually configured to connect the processor 210 to the wireless communication module 260. For example, the processor 210 communicates with a Bluetooth module in the wireless communication module 260 through the UART interface, to implement a Bluetooth function.

The MIPI interface may be configured to connect the processor 210 to a peripheral device such as the display 291. The MIPI interface includes a camera serial interface (CSI), a display serial interface (DSI), and the like.

The GPIO interface may be configured by software. The GPIO interface may be configured as a control signal or a data signal. In some embodiments, the GPIO interface may be configured to connect the processor 210 to the display 291, the wireless communication module 260, the audio module 270, the sensor module 280, and the like. The GPIO interface may alternatively be configured as an I2C interface, an 12S interface, a UART interface, an MIPI, or the like.

The USB interface 230 is an interface that complies with the USB standard specification, and may be specifically a mini USB interface, a micro USB interface, a USB type C interface, or the like. The USB interface 230 may be configured to connect to the charger to charge the electronic device 200, or may be configured to perform data transmission between the electronic device 200 and the peripheral device. The USB interface may alternatively be configured to connect to a headset to play an audio through the headset. The interface may alternatively be configured to connect to another terminal such as an AR device.

It may be understood that an interface connection relationship between the modules illustrated in this embodiment of the present disclosure is merely an example for description, and does not constitute a limitation on a structure of the electronic device 200. In some other embodiments of this application, the electronic device 200 may alternatively use an interface connection manner different from that in the above embodiment, or use a combination of a plurality of the interface connection manners.

The charging management module 240 is configured to receive a charging input from the charger. The charger may be a wireless charger, or may be a wired charger. In some embodiments of wired charging, the charging management module 240 may receive a charging input of the wired charger through the USB interface 230. In some embodiments of wireless charging, the charging management module 240 may receive a wireless charging input through a wireless charging coil of the electronic device 200. The charging management module 240 may supply power to a terminal through the power management module 241 while charging the battery 242.

The power management module 241 is configured to connect to the battery 242, the charging management module 240, and the processor 210. The power management module 241 receives an input from the battery 242 and/or the charging management module 240, to supply power to the processor 210, the internal memory 221, the external memory, the display 291, the wireless communication module 260, and the like. The power management module 241 may be further configured to monitor parameters such as a battery capacity, battery recycling times, and a battery health status (leakage and impedance). In some other embodiments, the power management module 241 may be arranged in the processor 210. In some other embodiments, the power management module 241 and the charging management module 240 may be arranged in a same device.

A wireless communication function of the electronic device 200 may be implemented through the antenna 1, the antenna 2, the mobile communication module 250, the wireless communication module 260, the modem processor, the baseband processor, and the like.

The mobile communication module 250 may provide a wireless communication solution including 2G/3G/4G/5G and the like applicable to the electronic device 200. The mobile communication module 250 may include at least one filter, a switch, a power amplifier, and a low noise amplifier (LNA), and the like. The mobile communication module 250 may receive an electromagnetic wave through the antenna 1, perform processing such as filtering and amplification on the received electromagnetic wave, and send the electromagnetic wave to the modem processor for demodulation. The mobile communication module 250 may further amplify a signal modulated by the modem processor, and convert the signal into an electromagnetic wave through the antenna 1 for radiation. In some embodiments, at least some functional modules of the mobile communication module 250 may be arranged in the processor 210. In some embodiments, the at least some functional modules of the mobile communication module 250 may be arranged in the same device as at least some modules of the processor 210.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then the demodulator transmits the demodulated low-frequency baseband signal to the baseband processor for processing. The low-frequency baseband signal is processed by the baseband processor and then transmitted to the application processor. The application processor outputs a sound signal through an audio device (which is not limited to the receiver 270A), or displays an image or a video through the display 291. In some embodiments, the modem processor may be an independent device. In some other embodiments, the modem processor may be independent of the processor 210, and is arranged in the same device as the mobile communication module 250 or another function module.

The wireless communication module 260 may provide a wireless communication solution including a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and the like applicable to the electronic device 200. The wireless communication module 260 may be one or more components into which at least one communication processing module is integrated. The wireless communication module 260 receives an electromagnetic wave through the antenna 2, performs frequency modulation and filtering on the electromagnetic wave signal, and sends the processed signal to the processor 210. The wireless communication module 260 may further receive a to-be-sent signal from the processor 210, perform frequency modulation and amplification on the to-be-sent signal, and convert the to-be-sent signal into an electromagnetic wave for radiation through the antenna 2.

The electronic device 200 may implement a display function through the GPU, the display 291, the application processor, and the like.

The display 291 includes a display panel. The display panel may be a liquid crystal display (LCD), an organic light-emitting diode (OLED), an active-matrix organic light emitting diode (AMOLED), a flexible light-emitting diode (FLED), a miniLED, a microLED, a micro-OLED, a quantum dot light emitting diode (QLED), or the like. In some embodiments, the electronic device 200 may include 1 or N displays 291. N is a positive integer greater than 1. In some embodiments, the display 291 may be a touchscreen.

The digital signal processor is configured to process a digital signal. In addition to a digital image signal, the digital signal processor may further process another digital signal. For example, when the electronic device 200 performs frequency selection, the digital signal processor is configured to perform Fourier transform and the like on frequency energy. The video codec is configured to compress or decompress a digital video. The NPU is a neural-network (NN) computing processor, which quickly processes input information by referring to a structure of a biological neural network, for example, a transmission mode between neurons in a human brain, and may further continuously perform self-learning.

The external memory interface 220 may be configured to connect to an external storage card such as a micro SD card, to expand a storage capability of the electronic device 200. The external storage card communicates with the processor 210 through the external memory interface 220, to implement a data storage function. For example, files such as music and a video are stored in the external storage card.

The internal memory 221 may be configured to store computer-executable program code. The executable program code includes instructions. The internal memory 221 may include a program storage area and a data storage area. The program storage area may store an operating system, an application required by at least one function (for example, a sound playback function and an image display function), and the like. The data storage area may store data (for example, audio data and an address book) and the like created during use of the electronic device 200. In addition, the internal memory 221 may include a high-speed random access memory, and may further include a non-volatile memory, for example, at least one disk storage device, a flash memory device, or a universal flash storage (UFS). The processor 210 runs the instructions stored in the internal memory 221, and/or the instructions stored in the memory arranged in the processor, to perform various functional applications and data processing of the electronic device 200.

The electronic device 200 may implement, through the audio module 270, the receiver 270A, the microphone 270B, the headset jack 270C, the application processor, and the like, audio functions such as music playback and sound recording.

The pressure sensor 280A is configured to sense a pressure signal, and can convert the pressure signal into an electrical signal. In some embodiments, the pressure sensor 280A may be arranged in the display 291. Many types of pressure sensors 280A such as a resistive pressure sensor, an inductive pressure sensor, and a capacitive pressure sensor exist. The capacitive pressure sensor may be a parallel plate including at least two conductive materials. When a force is applied to the pressure sensor 280A, a capacitance between electrodes changes. The electronic device 200 determines a strength of the pressure based on the change in the capacitance. When a touch operation is performed on the display 291, the electronic device 200 detects a strength of the touch operation through the pressure sensor 280A. The electronic device 200 may further calculate a touch position based on a detection signal of the pressure sensor 280A. In some embodiments, touch operations that are applied to a same touch position but have different touch operation strengths may correspond to different operation instructions. For example, when a touch operation having a touch operation strength less than a first pressure threshold is applied to an SMS message application icon, an instruction of viewing an SMS message is executed. When a touch operation having a touch operation strength greater than or equal to the first pressure threshold is applied to the SMS message application icon, an instruction of creating a new SMS message is executed.

The touch sensor 280C is also referred to as a "touch device". The touch sensor 280C may be arranged on the display 291. The touch sensor 280C and the display 291 form a touchscreen, which is also referred to as a "touch control screen". The touch sensor 280C is configured to detect a touch operation performed on or near the touch sensor. The touch sensor may transfer the detected touch operation to the application processor to determine a touch event type. The touch sensor may provide a visual output related to the touch operation through the display 291. In some other embodiments, the touch sensor 280C may be arranged on a surface of the electronic device 200 at a position other than that of the display 291.

The button 290 includes a power button (which is also referred to as a power switch), a volume button, and the like. The button 290 may be a mechanical button (which is also referred to as a physical button), or may be a touch button. The electronic device 200 may receive a button input, and generate a button signal input related to user setting and function control of the electronic device 200.

It may be understood that the example structure in this embodiment of this application does not constitute a specific limitation on the electronic device 200. In some other embodiments of this application, the electronic device 200 may include more or fewer components than those shown in the figure, or some merged components, or some split components, or different components arrangements. The components shown in the figure may be implemented by hardware, software, or a combination of software and hardware. This is not limited in this embodiment of this application.

Figure 3:
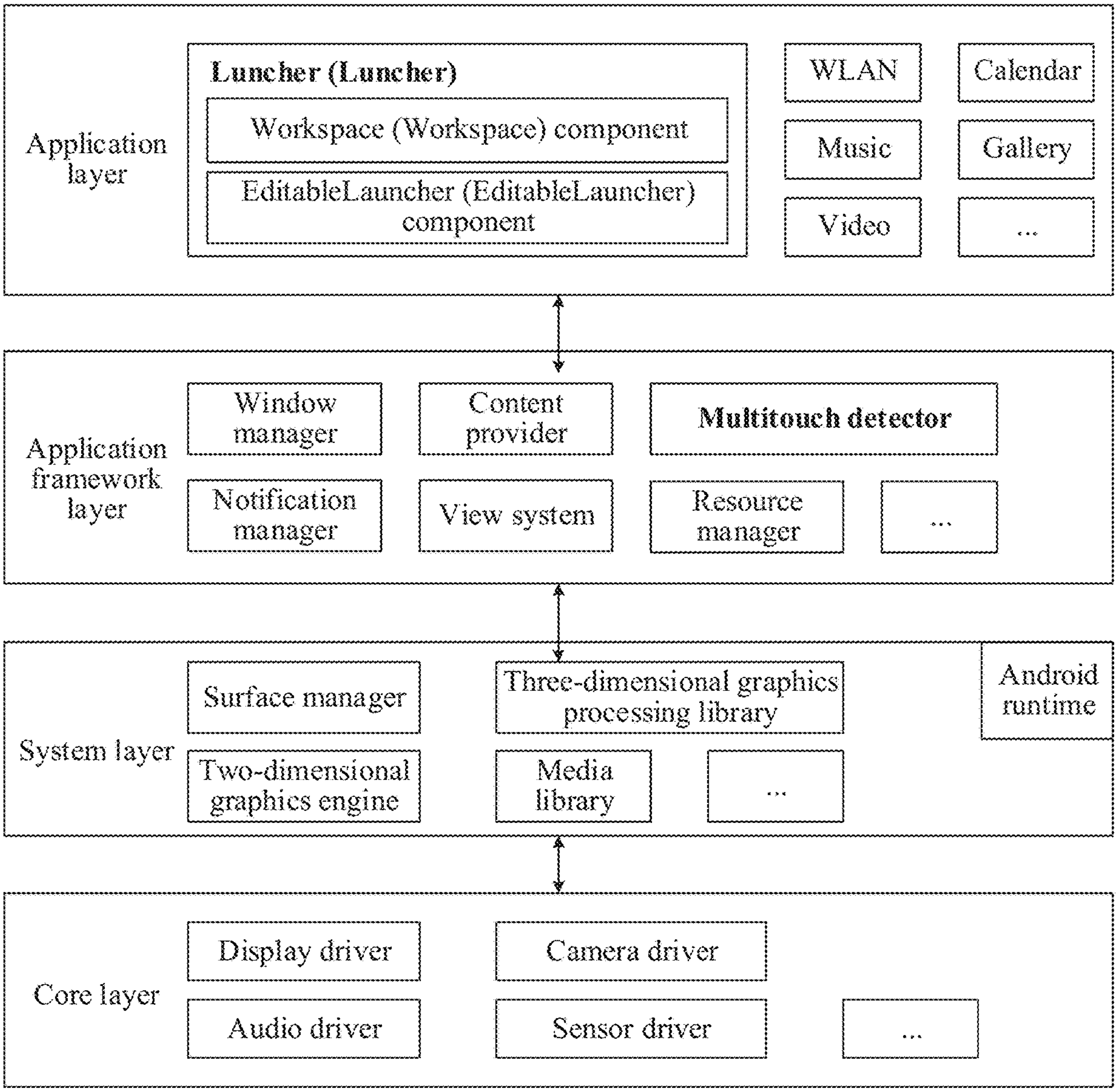
FIG. 3 is a schematic diagram of a software architecture of an electronic device according to an embodiment of this application.

In an example, a software system of the electronic device 200 may use a layered architecture, an event-driven architecture, a microcore architecture, a microservice architecture, a cloud architecture, or the like. In this embodiment of this application, the software structure of the electronic device 200 is described by using an example in which the electronic device 200 uses an Android® system with a hierarchical architecture. FIG. 3 is a schematic diagram of a software structure of an electronic device 200 according to an embodiment of this application. In a hierarchical architecture, software is divided into a plurality of layers, and each layer has a clear role and task. The layers communicate with each other through a software interface. In some embodiments, an operating system of the electronic device 200 is divided into four layers, which are respectively an application layer, an application framework layer, an Android runtime and system layer, and a core layer from top to bottom.

The application layer may include a series of application packages.

Referring to FIG. 3, the application layer may include applications such as Launcher, WLAN, Music, Video, and Gallery.

Launcher is configured to manage a desktop of a mobile phone.

In an example, a view structure of the desktop of the mobile phone managed by the Launcher may include a drag layer (DragLayer) view, a workspace (Workspace) view, and a page (CellLayout) view. The DragLayer view is a root view of Launcher, and the DragLayer view is a parent view of the Workspace view. The CellLayout view is a child view of the Workspace view. The Workspace view may include one or more CellLayout views.

FIG. 4A(1) to FIG. 4B(2) are schematic layout diagrams of a view structure of a desktop of a mobile phone according to an embodiment of this application.

41 shown in FIG. 4A(2) and FIG. 4B(2) represents a DragLayer view, 42 shown in FIG. 4B(2) represents a Workspace view, and 43 shown in FIG. 4B(1) is a CellLayout view.

The DragLayer view is configured to describe a draggable area of the desktop of the mobile phone. The draggable area of the desktop of the mobile phone usually may be described as an area composed of all screens of the desktop of the mobile phone other than a leftmost home screen and blank screens located on a left side and a right side of all of the other screens. The workspace view usually includes thumbnail pages of all of the screens of the desktop of the mobile phone other than the leftmost home screen and screen addition indication pages located on a left side and a right side of the thumbnail pages of all of the other screens in a desktop editing mode. The thumbnail page of each screen (other than the leftmost home screen) or each screen addition indication page in the desktop editing mode is a CellLayout view.

It should be noted that, the thumbnail page of each screen of the desktop of the mobile phone (other than the leftmost home screen) and the screen addition indication page in the desktop editing mode are described in subsequent embodiments. Details are not described herein.

Correspondingly, as shown in FIG. 3, in some embodiments, Launcher may specifically include a workspace (Workspace) component and a desktop editing (EditableLauncher) component.

The Workspace component is configured to manage an event in the Workspace view.

The EditableLauncher component is configured to implement edition of the desktop of the mobile phone.

The application framework layer provides an application programming interface (API) and a programming framework for applications at the application layer. The application framework layer includes some predefined functions.

As shown in FIG. 3, the application framework layer may include a window manager, a content provider, a multitouch detector (MultiTouchDetector), a notification manager, a view system, a resource manager, and the like.

The MultiTouchDetector is configured to monitor a multitouch operation performed on a touch area of the mobile phone.

The window manager is configured to manage a window application. The window manager may obtain a size of a display, determine whether a status bar exists, perform screen locking, perform screenshot, and the like.

The content provider is configured to store and obtain data and enable the data accessible to an application. The data may include a video, an image, audio, calls that are made and answered, a browsing history, a bookmark, a phonebook, and the like.

The notification manager enables an application to display notification information in a status bar, and may be configured to convey a message of a notification type. The message may disappear automatically after a short stay without user interaction. For example, the notification manager is configured to provide a notification indicating download completion, a message notification, and the like. The notification manager may alternatively be a notification that appears on a top status bar of a system in a form of a graph or a scroll bar text, for example, a notification of an application running on a backend, or may be a notification that appears on a screen in a form of a dialog window. For example, text information is prompted on a status bar, a prompt tone is made, the electronic device vibrates, or an indicator light flashes.

The view system includes visual controls such as a control configured to display a text and a control configured to display an image. The view system may be configured to construct an application. A display interface may be composed of one or more views. For example, a display interface including an SMS message notification icon may include a view for displaying a text and a view for displaying an image.

The resource manager provides various resources such as a localized character string, an icon, an image, a layout file, and a video file for an application.

The Android Runtime includes a core library and a virtual machine. The Android Runtime is responsible for scheduling and managing the Android system.

The core library includes two parts: a functional function that needs to be invoked by a java language and a core library of Android.

The application layer and the application framework layer run in the virtual machine. The virtual machine executes java files of the application layer and the application framework layer as binary files. The virtual machine is configured to perform functions such as object lifecycle management, stack management, thread management, security and anomaly management, and garbage collection.

The system library may include a plurality of function modules, for example, a surface manager, a media library, a three-dimensional graphics processing library (for example, OpenGL ES), and a 2D graphics engine (for example, an SGL).

The surface manager is configured to manage a display subsystem, and provide fusion of 2D layers and 3D layers for a plurality of applications.

The media library supports playback and recording in a plurality of common audio and video formats, static image files, and the like. The media library supports a plurality of audio/video encoding formats, such as MPEG4, H.264, MP3, AAC, AMR, JPG, and PNG.

The three-dimensional graphics processing library is configured to implement three-dimensional graphics drawing, image rendering, synthesis, layer processing, and the like.

The 2D graphics engine is a drawing engine for 2D drawing.

The core layer is a layer between hardware and software. The core layer includes at least a display driver, a camera driver, an audio driver, and a sensor driver.

The interface display method provided in embodiments of this application is applicable to a desktop editing scenario or a desktop element dragging scenario of the electronic device 200. For ease of understanding, the interface display methods in the desktop editing scenario and the desktop element dragging scenario are respectively described below by using an example in which the electronic device 200 is a mobile phone, a desktop of the mobile phone includes a main screen 10, a rightmost home screen 11, a second right screen 12, and a leftmost home screen 13, and the second right screen 12 of the desktop of the mobile phone is used as a target screen (that is, a preset card display screen).

Scenario I: Desktop Editing Scenario

In combination with the desktop of the mobile phone shown in FIG. 1A to FIG. 1F, when a user interface currently displayed on the mobile phone is any screen of the desktop of the mobile phone other than the leftmost home screen 13, a user may instruct the mobile phone to enter the desktop editing mode by inputting an operation used for entering the desktop editing mode on the corresponding screen. The operation used for entering the desktop editing mode may be a pinch-in operation, a long press operation, or the like. The pinch-in operation is a touch operation with two fingers moving toward each other.

It should be noted that, in this embodiment of this application, the interface display method varies when the mobile phone enters the desktop editing mode in different network states, and the interface display method also varies when the mobile phone exits the desktop editing mode in different network states.

The network states may include, for example, a first network state and a second network state.

The first network state indicates that the mobile phone was not connected to a network since first power-on.

The second network state indicates that the mobile phone was connected to a network at least once since the first power-on.

Optionally, it should be further noted that, in this embodiment of this application, that the electronic device is connected to a network means being connected to a wide area network. For example, the wide area network may be the Internet. Optionally, that the electronic device (the mobile phone) was not connected to a network since the first power on means that the electronic device neither was connected to the Internet through a mobile communication network or the WLAN since the first power-on, nor obtained data from the Internet. That the electronic device (the mobile phone) was connected to the network at least once since the first power-on means that the electronic device was connected to the Internet through the mobile communication network or the WLAN since the first power-on and obtained the data from the Internet. In an example, if the electronic device was connected to the WLAN since the first power-on, but the WLAN was not connected to the Internet, a status of the electronic device is that the electronic device was not connected to a network since the first power-on. Therefore, even if the electronic device was connected to the WLAN, but if the electronic device neither was not connected to the Internet nor obtained data from the Internet, the status of the electronic device is still the first network state.

In an example, the network may include the mobile communication network and the WLAN. Based on the above, the first network state may indicate that the mobile phone was connected to neither a network nor the WLAN since the first power-on. The second network state may indicate that the mobile phone was connected to the mobile communication network at least once and/or was connected to the WLAN at least once since the first power-on.

Interface display methods for two cases in which the mobile phone enters the desktop editing mode and exits the desktop editing mode in the first network state and in the second network state are respectively described below.

Case 1: The mobile phone enters desktop editing mode and exits the desktop editing mode in the first network state.

FIG. 5A(1) to FIG. 5A(6) are schematic diagrams of user interfaces that may be involved when a mobile phone enters a desktop editing mode in a first network state according to an embodiment of this application. For ease of understanding, a description is provided below by using an example in which the mobile phone enters the desktop editing mode from a second right screen 12 of a desktop of the mobile phone in the first network state.

It should be noted that, for a specific process in which the mobile phone switches from another screen of the desktop of the mobile phone to the second right screen 12, refer to the relevant description in the embodiment corresponding to FIG. 1A to FIG. 1F. Details are not described herein.

As shown in FIG. 5A(1), when the mobile phone is in the first network state and a user interface currently displayed on the mobile phone is the second right screen 12 of the desktop of the mobile phone, the user may input an operation used for entering the desktop editing mode on the second right screen 12. When receiving the operation used for entering the desktop editing mode inputted by the user on the second right screen 12, the mobile phone may display a first desktop editing interface 15 shown in FIG. 5A(2) in response to the operation used for entering the desktop editing mode. The first desktop editing interface 15 is an interface of a rightmost home screen 11 of the desktop of the mobile phone in the desktop editing mode.

As shown in FIG. 5A(2), the first desktop editing interface 15 may include a thumbnail page 151 of the rightmost home screen of the desktop of the mobile phone, first navigation points 152 located below the thumbnail page 151 of the rightmost home screen, screen addition page navigation points 153 located below the thumbnail page 151 of the rightmost home screen, a desktop editing option 154 located below the first navigation points 152 and the screen addition page navigation points 153, and a thumbnail page editing description 155 located above the thumbnail page 151 of the rightmost home screen.

The thumbnail page 151 of the rightmost home screen includes desktop elements displayed in a first display area of the rightmost home screen 11, and a size of each desktop element on the thumbnail page 151 of the rightmost home screen is less than a size of the corresponding desktop element displayed in the first display area of the rightmost home screen 11.

A quantity of the first navigation points 152 on the first desktop editing interface 15 is less than a quantity of the first navigation points on the rightmost home screen 11. Optionally, when the user enables the leftmost home screen 13 of the desktop of the mobile phone, the quantity of the first navigation points 152 on the first desktop editing interface 15 is less than the quantity of the first navigation points on the rightmost home screen 11 by 2. When the user disables the leftmost home screen 13, the quantity of the first navigation points 152 on the first desktop editing interface 15 is less than the quantity of the first navigation points on the rightmost home screen 11 by 1.

The screen addition page navigation points 153 indicate positional relationships between a screen addition indication page and other screens of the desktop of the mobile phone in the desktop editing mode. Optionally, the quantity of the screen addition page navigation points 153 may be 2. When the first navigation points 152 are arranged horizontally, the two screen addition page navigation points 153 may be respectively located on a left side and a right side of the first navigation points 152.

In an example, the desktop editing option 154 may include a desktop wallpaper editing option, a desktop card editing option, a desktop switching effect editing option, a desktop setting option, and the like. The desktop wallpaper editing option is configured for a user to edit a wallpaper of the desktop of the mobile phone. The desktop card editing option user is configured for the user to edit a card of the desktop of the mobile phone. The desktop switching effect editing option is configured for the user to edit a switching effect of the desktop of the mobile phone when switching between different screens. The desktop setting option is configured for the user to edit a layout, an icon, the leftmost home screen 13, or the like of the desktop of the mobile phone.

The thumbnail page editing description 155 describes operations that may be performed by the user on corresponding thumbnail pages of the screens in the desktop editing mode. The thumbnail page editing description 155 may be a text description, for example, "Drag a page to change a page order".

As shown in FIG. 5A(2), when the user interface currently displayed on the mobile phone is the first desktop editing interface 15, the user may input a leftward swiping operation on a target touch area of the first desktop editing interface 15. When receiving the leftward swiping operation inputted by the user on the target touch area of the first desktop editing interface 15, the mobile phone may display a first screen addition interface 16 shown in FIG. 5A(3) in response to the leftward swiping operation. The target touch area of the first desktop editing interface 15 is display areas on the first desktop editing interface 15 other than a display area of the desktop editing option.

As shown in FIG. 5A(3), the first screen addition interface 16 may include a first screen addition indication page 161, first navigation points located below the first screen addition indication page 161, screen addition page navigation points located below the first screen addition indication page 161, a desktop editing option located below the first navigation points and the screen addition page navigation points, and a thumbnail page located above the first screen addition indication page 161.

The first screen addition indication page 161 may include a first screen addition control 1611. The user may instruct the mobile phone to add a blank screen on a right side of the second right screen 12 of the desktop of the mobile phone by tapping the first screen addition control 1611.

It should be noted that, the first navigation points, the screen addition page navigation points, the desktop editing option, and the thumbnail page editing description on the first screen addition interface 16 are respectively the same as the first navigation points, the screen addition page navigation points, the desktop editing option, and the thumbnail page editing description on the first desktop editing interface 15. Therefore, for details of the first navigation points, the screen addition page navigation points, the desktop editing option, and the thumbnail page editing description on the first screen addition interface 16, refer to the relevant descriptions of the items on the first desktop editing interface 15 in the above embodiment. The details are not described herein.

As shown in FIG. 5A(4), when the user interface currently displayed on the mobile phone is the first desktop editing interface 15, the user may input a rightward swiping operation on the target touch area of the first desktop editing interface 15. When receiving the rightward swiping operation inputted by the user on the target touch area of the first desktop editing interface 15, the mobile phone may display a second desktop editing interface 17 shown in FIG. 5A(5) in response to the rightward swiping operation. The second desktop editing interface 17 is an interface of a main screen 10 of the desktop of the mobile phone in the desktop editing mode.

As shown in FIG. 5A(5), the second desktop editing interface 17 may include a thumbnail page 171 of the main screen of the desktop of the mobile phone, first navigation points located below the thumbnail page 171 of the main screen, screen addition page navigation points located below the thumbnail page 171 of the main screen, a desktop editing option located below the first navigation points and the screen addition page navigation points, and a thumbnail page editing description located above the thumbnail page 171 of the main screen.

The thumbnail page 171 of the main screen includes desktop elements displayed in a first display area of the main screen 10, and a size of each desktop element on the thumbnail page 171 of the main screen is less than a size of the corresponding desktop element displayed in the first display area of the main screen 10. Optionally, the thumbnail page 171 of the main screen further includes a main screen indicator 1711.

It should be noted that, the first navigation points, the screen addition page navigation points, the desktop editing option, and the thumbnail page editing description on the second desktop editing interface 17 are respectively the same as the first navigation points, the screen addition page navigation points, the desktop editing option, and the thumbnail page editing description on the first desktop editing interface 15. Therefore, for details of the first navigation points, the screen addition page navigation points, the desktop editing option, and the thumbnail page editing description on the second desktop editing interface 17, refer to the relevant descriptions of the items on the first desktop editing interface 15 in the above embodiment. The details are not described herein.

As shown in FIG. 5A(5), when the user interface currently displayed on the mobile phone is the second desktop editing interface 17, the user may input a rightward swiping operation on a target touch area of the second desktop editing interface 17. When receiving the rightward swiping operation inputted by the user on the target touch area of the second desktop editing interface 17, the mobile phone may display a second screen addition interface 18 shown in FIG. 5A(6) in response to the rightward swiping operation. The target touch area of the second desktop editing interface 17 is other display areas on the second desktop editing interface 17 other than a display area of the desktop editing option.

As shown in FIG. 5A(6), the second screen addition interface 18 may include a second screen addition indication page 181, first navigation points located below the second screen addition indication page 181, screen addition page navigation points located below the second screen addition indication page 181, a desktop editing option located below the first navigation points and the screen addition page navigation points, and a thumbnail page editing description located above the second screen addition indication page 181. The second screen addition indication page 181 may include a second screen addition control 1811. The user may instruct the mobile phone to add a blank screen on a left side of the main screen 10 of the desktop of the mobile phone by tapping the second screen addition control 1811.

It should be noted that, the first navigation points, the screen addition page navigation points, the desktop editing option, and the thumbnail page editing description on the second screen addition interface 18 are respectively the same as the first navigation points, the screen addition page navigation points, the desktop editing option, and the thumbnail page editing description on the first desktop editing interface 15. Therefore, for details of the first navigation points, the screen addition page navigation points, the desktop editing option, and the thumbnail page editing description on the second screen addition interface 18, refer to the relevant descriptions of the items on the first desktop editing interface 15 in the above embodiment. The details are not described herein.

It should be noted that, the user interfaces displayed on the mobile phone in the desktop editing mode each include neither a status bar nor an application icon in a second display area of each screen of the desktop of the mobile phone.

FIG. 5B(1) to FIG. 5B(5) are schematic diagrams of user interfaces that may be involved when a mobile phone exits a desktop editing mode in a first network state according to another embodiment of this application. For ease of understanding, a description is provided below by using an example in which the mobile phone exits the desktop editing mode from a first desktop editing interface 15 in the first network state.

As shown in FIG. 5B(1), when a user interface currently displayed on the mobile phone is the first desktop editing interface 15, the user may input an operation used for exiting the desktop editing mode on a target touch area of the first desktop editing interface 15, to instruct the mobile phone to exit the desktop editing mode. The operation used for exiting the desktop editing mode may be a tapping operation or a pinch-out operation. The pinch-out operation is a touch operation with two fingers moving in opposite directions.

In an optional implementation, as shown in FIG. 5B(1), when receiving the pinch-out operation performed by the user on the first desktop editing interface 15, the mobile phone may display a second right screen 12 of a desktop of the mobile phone shown in FIG. 5B(2), to exit the desktop editing mode.

After the mobile phone exits the desktop editing mode, when the mobile phone is still in the first network state, as shown in FIG. 5B(3), if the mobile phone receives a long press operation performed by the user on any card on the second right screen 12, the mobile phone may not respond to the long press operation performed by the user on the card. In other words, the mobile phone does not allow the user to edit (for example, delete) the card on the second right screen 12.

Optionally, after the mobile phone exits the desktop editing mode, when the mobile phone is still in the first network state, as shown in FIG. 5B(3), if the mobile phone receives a dragging operation performed by the user on any card on the second right screen 12, the mobile phone may not respond to the dragging operation performed by the user on the card. In other words, the mobile phone does not allow the user to drag the card on the second right screen 12.

Optionally, after the mobile phone exits the desktop editing mode, when the mobile phone is still in the first network state, as shown in FIG. 5B(4), if the mobile phone receives a dragging operation performed by the user on any card on the second right screen 12, the mobile phone may dynamically display, in response to the operation of dragging the card to any position in a first display area 122 of the second right screen 12 performed by the user, the card in the second display area 122 of the second right screen 12 with the dragging operation performed by the user on the card. When the user drags a card on the second right screen 12 to a rightmost side of the second right screen 12 and further drags the card rightward, as shown in FIG. 5B(5), the mobile phone may not respond to the operation of dragging the card to an adjacent screen on a right side of the second right screen 12 performed by the user. In other words, the mobile phone still displays the second right screen 12. Similarly, when the user drags a card on the second right screen 12 to a leftmost side of the second right screen 12 and further drags the card leftward, the mobile phone may not respond to the operation of dragging the card to an adjacent screen on a left side of the second right screen 12 performed by the user. In other words, the mobile phone still displays the second right screen 12. To be specific, the mobile phone allows the user to adjust display positions of all cards on the second right screen 12, but does not allow the user to drag the card on the second right screen 12 to any screen other than the second right screen 12.

When the user enables the rightmost home screen of the desktop of the mobile phone, quantities of first navigation points 123 on the second right screens 12 respectively shown in FIG. 5B(4) and FIG. 5B(5) may be less than a quantity of first navigation points on the second right screen 12 shown in FIG. 5B(2) by 1. When the user disables the rightmost home screen of the desktop of the mobile phone, the quantities of the first navigation points 123 on the second right screens 12 shown in FIG. 5B(4) and FIG. 5B(5) may be equal to the quantity of the first navigation points on the second right screen 12 shown in FIG. 5B(2).

In an optional implementation, as shown in FIG. 5C(1), when receiving a tapping operation performed by the user on the first desktop editing interface 15, the mobile phone may display a rightmost home screen 11 of the desktop of the mobile phone shown in FIG. 5C(2), to exit the desktop editing mode. Next, when receiving a leftward swiping operation inputted by the user on the rightmost home screen 11, the mobile phone may display a second right screen 12 of the desktop of the mobile phone shown in FIG. 5C(3) in response to the leftward swiping operation. When the mobile phone is still in the first network state, and the user operates the card in the second right screen 12, the mobile phone responds the operation in the way in the embodiment corresponding to FIG. 5B(1) to FIG. 5B(5). For details, refer to the relevant description in the embodiment corresponding to FIG. 5B(1) to FIG. 5B(5). This is not described herein.

Case 2: The mobile phone enters the desktop editing mode and exits the desktop editing mode in the second network state.

FIG. 6A(1) and FIG. 6C(3) are schematic diagrams of user interfaces that may be involved when a mobile phone enters a desktop editing mode and exits the desktop editing mode in a second network state according to an embodiment of this application. For ease of understanding, a description is provided below by using an example in which the mobile phone enters the desktop editing mode from a second right screen 12 of a desktop of the mobile phone in the second network state.

It should be noted that, for a specific process in which the mobile phone switches from another screen of the desktop of the mobile phone to the second right screen 12, refer to the relevant description in the embodiment corresponding to FIG. 1A to FIG. 1F. Details are not described herein.

It should be further noted that, a quantity of cards and content displayed on the second right screen 12 when the mobile phone is in the second network state are different from a quantity of cards and content displayed on the second right screen when the mobile phone is in the first network state. For details, refer to the relevant descriptions in the embodiments respectively corresponding to FIG. 1B and FIG. 1C. The details are not described herein.

As shown in FIG. 6A(1), when the mobile phone is in the second network state and a user interface currently displayed on the mobile phone is the second right screen 12 of the desktop of the mobile phone, a user may input an operation used for entering the desktop editing mode on the second right screen 12. When receiving the operation used for entering the desktop editing mode inputted by the user on the second right screen 12, the mobile phone may display a third desktop editing interface 19 shown in FIG. 6A(2) in response to the operation used for entering the desktop editing mode. The third desktop editing interface 19 is an interface of the second right screen 12 of the desktop of the mobile phone in the desktop editing mode.

As shown in FIG. 6A(2), the third desktop editing interface 19 may include a thumbnail page 191 of the second right screen of the desktop of the mobile phone, first navigation points 192 located below the thumbnail page 191 of the second right screen, screen addition page navigation points located below the thumbnail page 191 of the second right screen, a desktop editing option located below the first navigation points 192 and the screen addition page navigation points, and a thumbnail page editing description located above the thumbnail page 191 of the second right screen.

The thumbnail page 191 of the second right screen includes cards displayed in a first display area of the second right screen 12 in the second network state, and a size of each card on the thumbnail page 191 of the second right screen is less than a size of the corresponding card displayed in the first display area of the second right screen 12.

Optionally, when the user enables a leftmost home screen 13 of the desktop of the mobile phone, a quantity of first navigation points 192 on the third desktop editing interface 19 is less than a quantity of first navigation points on the second right screen 12 by 1. When the user disables the leftmost home screen 13, the quantity of the first navigation points 192 on the third desktop editing interface 19 is equal to the quantity of the first navigation points on the second right screen 12.

It should be noted that, the screen addition page navigation points, the desktop editing option, and the thumbnail page editing description on the third desktop editing interface 19 are respectively the same as the screen addition page navigation points, the desktop editing option, and the thumbnail page editing description on the first desktop editing interface 15. Therefore, for details of the screen addition page navigation points, the desktop editing option, and the thumbnail page editing description on the third desktop editing interface 19, refer to the relevant descriptions of the items on the first desktop editing interface 15. The details are not described herein.

As shown in FIG. 6A(2), when the user interface currently displayed on the mobile phone is the third desktop editing interface 19, the user may input an operation used for exiting the desktop editing mode on a target touch area of the third desktop editing interface 19. When receiving the operation used for exiting the desktop editing mode inputted by the user on the target touch area of the third desktop editing interface 19, the mobile phone may display a second right screen 12 of the desktop of the mobile phone shown in FIG. 6A(3) in response to the operation used for exiting the desktop editing mode, to exit the desktop editing mode.

Next, as shown in FIG. 6B(1), if the mobile phone receives a long press operation performed by the user on any card (for example, a video card 124) on the second right screen 12, the mobile phone may blur display areas on the second right screen 12 other than a status bar, highlight the video card 124, and display an editing menu 125 of the video card 124. Optionally, the editing menu 125 may include a removal control for the video card 124. Optionally, the editing menu 125 may further include another editing control for the video card 124. This is not specially limited in this embodiment of this application.

As shown in FIG. 6B(2), when receiving a tapping operation performed by the user on the removal control for the video card 124, the mobile phone may display a second right screen 12 shown in FIG. 6B(3) in response to the tapping operation. The second right screen 12 shown in FIG. 6B(3) does not include the video card 124. It may be learned that, when the mobile phone is in the second network state, the mobile phone allows the user to delete any card on the second right screen 12.

In addition, when the user interface currently displayed on the mobile phone is the third desktop editing interface 19, the user may edit a card on the thumbnail page 191 of the second right screen on the third desktop editing interface 19. For example, the user may delete a card on the thumbnail page 191 of the second right screen, or may add a new card to the thumbnail page 191 of the second right screen. An example in which the user deletes a weather card on the thumbnail page 191 of the second right screen is used. As shown in FIG. 6C(1), when the mobile phone receives a long press operation performed by the user on the weather card on the thumbnail page 191 of the second right screen, the mobile phone may display a removal control 193 for the weather card above the thumbnail page 191 of the second right screen, and the mobile phone may not display the thumbnail page editing description. As shown in FIG. 6C(2), the user may drag the weather card to a removal area corresponding to the removal control 193 and release the weather card. After receiving the operations of dragging the weather card to the removal area corresponding to the removal control 193 and releasing the weather card performed by the user, the mobile phone may display an edited third desktop editing interface 19 shown in FIG. 6C(3).

As shown in FIG. 6C(3), the thumbnail page 191 of the second right screen on the edited third desktop editing interface 19 does not include the weather card. When receiving an operation used for exiting the desktop editing mode (for example, a tapping operation) inputted by the user on the edited third desktop editing interface 19, the mobile phone may display a second right screen 12 of the desktop of the mobile phone shown in FIG. 9C(2) in response to the operation. The second right screen 12 does not include the weather card.

In an optional embodiment, as shown in FIG. 6D(1), the thumbnail page 191 of the second right screen on the third desktop editing interface 19 may further include a page deletion control 1911. When receiving a tapping operation performed by the user on the page deletion control 1911, the mobile phone may display a first desktop editing interface 15 shown in FIG. 6D(2). It should be noted that, a quantity of first navigation points on the first desktop editing interface 15 shown in FIG. 6D(2) is less than a quantity of first navigation points on the third desktop editing interface 19 shown in FIG. 6D(1) by 1.

As shown in FIG. 6D(2), when receiving an operation used for exiting the desktop editing mode (for example, a tapping operation) inputted by the user on a target touch area of the first desktop editing interface 15, the mobile phone may display a rightmost home screen 11 of the desktop of the mobile phone shown in FIG. 6D(3) or FIG. 6D(4) in response to the operation used for exiting the desktop editing mode. Optionally, when the user enables the leftmost home screen of the desktop of the mobile phone, a quantity of first navigation points on the rightmost home screen 11 of the desktop of the mobile phone shown in FIG. 6D(3) or FIG. 6D(4) may be greater than the quantity of the first navigation points on the first desktop editing interface 15 shown in FIG. 6D(2) by 1.

As shown in FIG. 6D(3), when receiving a leftward swiping operation inputted by the user on the first desktop editing interface 15, the mobile phone may still display the rightmost home screen 11 of the desktop of the mobile phone.

As shown in FIG. 6D(4), when receiving a rightward swiping operation inputted by the user on the first desktop editing interface 15, the mobile phone may display a main screen 10 of the desktop of the mobile phone shown in FIG. 6D(5) in response to the operation.

It should be noted that, the above description is provided by using the user interfaces involved when the mobile phone enters the desktop editing mode from the second right screen 12 of the desktop of the mobile phone in the first network state as an example. User interfaces involved when the mobile phone enters the desktop editing mode from another screen of the desktop of the mobile phone in the first network state is similar to the above implementation. Details are not described herein.

Figure 7:
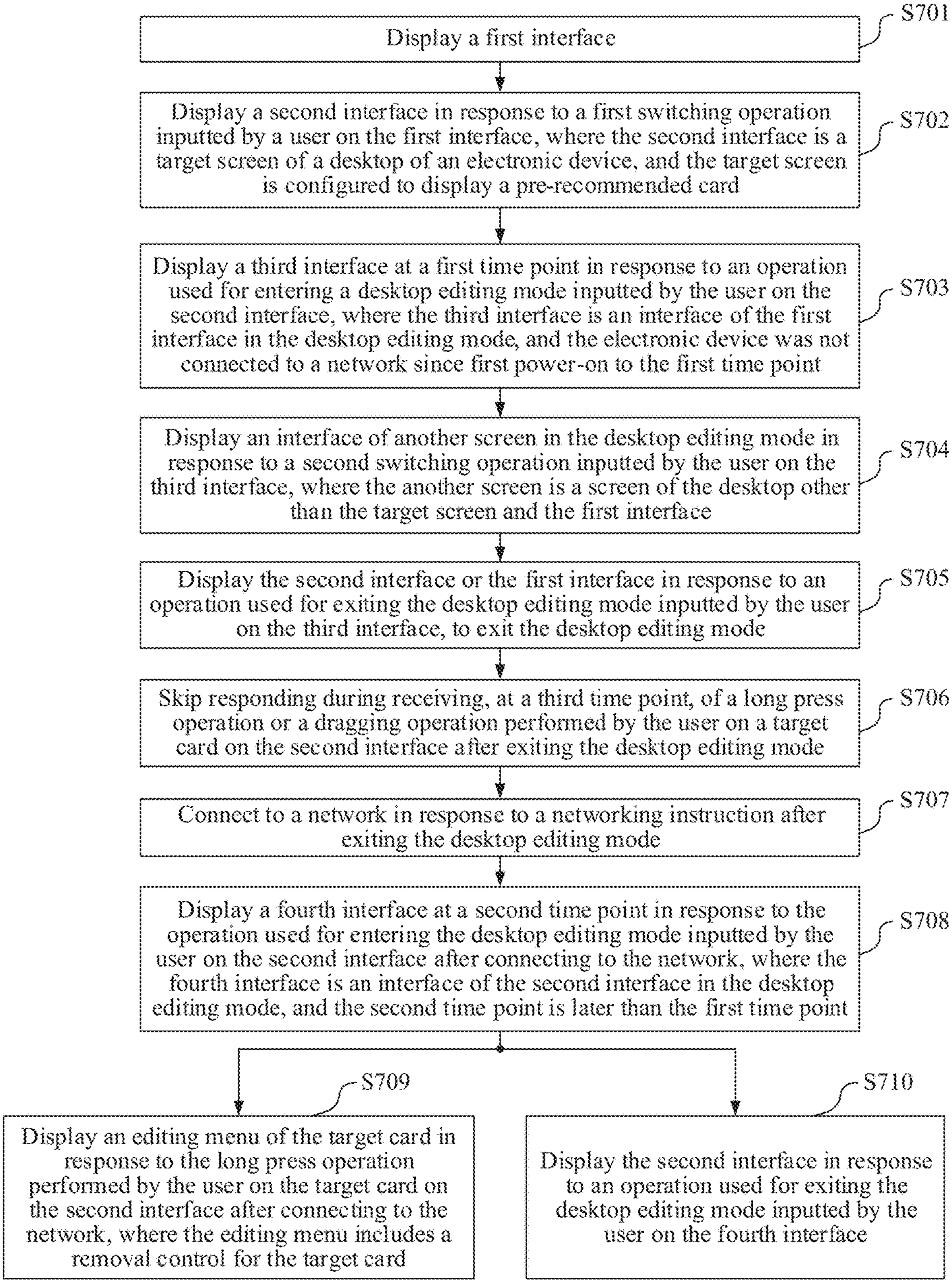
FIG. 7 is a schematic flowchart of an interface display method according to an embodiment of this application.

In a specific embodiment of this application, an interface display method in the desktop editing scenario involved in FIG. 5A(1) to FIG. 6D(5) may specifically include S701 to S710 in FIG. 7. Details are as follows.

S701: Display a first interface.

In some embodiments, the first interface may be a screen located on a left side of a target screen of a desktop of a mobile phone.

The target screen is a preset card display screen, and is configured to display a pre-recommended card. The pre-recommended card may be a card that is determined based on a user profile and needs to be recommended to a user. The target screen may be any screen of the desktop of the mobile phone other than a leftmost home screen and a main screen.

In an example, in combination with the desktop of the mobile phone shown in FIG. 1A to FIG. 1F, when the target screen is the second right screen 12 of the desktop of the mobile phone, the first interface may be the rightmost home screen 11 of the desktop of the mobile phone. In an example, when the target screen is the rightmost home screen 11 of the desktop of the mobile phone, the first interface may be the main screen 10 of the desktop of the mobile phone.

In some other embodiments, the first interface may be a screen of the desktop of the mobile phone located on a right side of the target screen.

In this embodiment, the target screen may be any screen of the desktop of the mobile phone other than the leftmost home screen.

In an example, in combination with the desktop of the mobile phone shown in FIG. 1A to FIG. 1F, when the target screen is the rightmost home screen 11 of the desktop of the mobile phone, the first interface may be the second right screen 12 of the desktop of the mobile phone. When the target screen is the main screen 10 of the desktop of the mobile phone, the first interface may be the rightmost home screen 11 of the desktop of the mobile phone.

Optionally, when the mobile phone displays the first interface, the user may input a first switching operation on the first interface, to instruct the mobile phone to display the target screen. The first switching operation may be, for example, a leftward swiping operation or a rightward swiping operation.

S702: Display a second interface in response to a first switching operation inputted by a user on the first interface, where the second interface is a target screen of a desktop of the electronic device, and the target screen is configured to display a pre-recommended card.

In some embodiments, when the first interface is the screen of the desktop of the mobile phone located on the left side of the target screen and the mobile phone receives the leftward swiping operation inputted by the user on the first interface, the mobile phone may display the second interface in response to the leftward swiping operation inputted by the user on the first interface. In an example, referring to FIG. 1A to FIG. 1F, it is assumed that the first interface is the rightmost home screen 11 of the desktop of the mobile phone and the second interface is the second right screen 12 of the desktop of the mobile phone. As shown in FIG. 1B, when receiving the leftward swiping operation inputted by the user on the rightmost home screen 11, the mobile phone may display the second right screen 12 of the desktop of the mobile phone shown in FIG. 1C in response to the leftward swiping operation.

In some other embodiments, when the first interface is the screen of the desktop of the mobile phone located on the right side of the target screen and the mobile phone receives the rightward swiping operation inputted by the user on the first interface, the mobile phone may display the second interface in response to the rightward swiping operation inputted by the user on the first interface.

Optionally, when the mobile phone displays the second interface, the user may input an operation used for entering a desktop editing mode on the second interface, to instruct the mobile phone to enter the desktop editing mode from the second interface. The operation used for entering the desktop editing mode may include, for example, a pinch-in operation or a long press operation.

S703: Display a third interface at a first time point in response to an operation used for entering a desktop editing mode inputted by the user on the second interface, where the third interface is an interface of the first interface in the desktop editing mode, and the electronic device was not connected to a network since first power-on to the first time point.

When receiving, at the first time point, the operation used for entering the desktop editing mode inputted by the user on the second interface, the mobile phone may obtain a network state identifier at the first time point in response to the operation used for entering the desktop editing mode.

The network state identifier indicates whether the mobile phone was connected to a network since the first power-on. In an example, the network state identifier may include a first identifier and a second state identifier. The first identifier indicates that the mobile phone was not connected to a network since the first power-on, and the second state identifier indicates that the mobile phone was connected to a network at least once since the first power-on.

In some embodiments, the first identifier may be, for example, "true", and the second state identifier may be, for example, "false". In some other embodiments, the first identifier may be, for example, "1", and the second state identifier may be, for example, "0".

In an example, the network state identifier may be stored in a register of the mobile phone, and the mobile phone may update the network identifier stored in the register of the mobile phone in real time based on a current networking status thereof. For example, a default network state identifier of a newly minted mobile phone may be "1" or "true", which indicates that the mobile phone was not connected to a network since first power-on. Assuming that the mobile phone detects that the mobile phone is connected to a mobile communication network at a time point, the mobile phone may update the network identifier stored in the memory to "O" or "false".

Optionally, when the network state identifier at the first time point is the first identifier, the mobile phone may display a third interface.

In an example, referring to FIG. 5A(1) to FIG. 5A(6), it is assumed that the second interface is the second right screen 12 of the desktop of the mobile phone. As shown in FIG. 5A(1), when receiving a pinch-in operation inputted by the user on the second right screen 12, the mobile phone may obtain the network state identifier. When the network state identifier is the first identifier, the mobile phone may display the first desktop editing interface 15 shown in FIG. 5A(2). The first desktop editing interface 15 is the third interface, also, the interface of the rightmost home screen 11 in the desktop editing mode.

In a specific embodiment, S703 may be implemented through a plurality of components in the electronic device. In an example, S703 may include S7031 to S7038 in 8. Details are as follows.

S7031: A Workspace component receives a first touch operation at the first time point.

S7032: The Workspace component sends a first touch operation identification instruction to a multitouch detector.

When receiving the first touch operation inputted by the user, the Workspace component may send the first touch operation identification instruction to the multitouch detector. The first touch operation identification instruction is used for instructing the multitouch detector to identify a type of the first touch operation.

S7033: The multitouch detector returns a first touch operation identification result to the Workspace component.

When receiving the first touch operation identification instruction, the multitouch detector may identify the type of the first touch operation, and return the type of the first touch operation (that is, the first touch operation identification result) to the Workspace component.

S7034: The Workspace component sends a desktop editing mode entering instruction to an EditableLauncher component when the first touch operation is a pinch-in operation.

The desktop editing mode entering instruction is used for instructing the mobile phone to enter the desktop editing mode.

S7035: The EditableLauncher component obtains a network state identifier.

After receiving the desktop editing mode entering instruction, the EditableLauncher component may obtain the network state identifier at the first time point.

S7036: The EditableLauncher component deletes the target screen from a workspace view when the network state identifier is the first identifier and the desktop of the mobile phone includes the target screen.

S7037: The EditableLauncher component performs a preparation operation for entering the desktop editing mode.

It may be understood that, the preparation operation for entering the desktop editing mode is the same as that in the related art. Details are not described herein.

S7038: The EditableLauncher component displays the third interface.

That the EditableLauncher component displays the third interface means that the mobile phone enters the desktop editing mode.

It should be noted that, for user interfaces involved in the implementation process of S703, refer to the relevant description regarding the process in which the mobile phone switches from FIG. 5A(1) to FIG. 5A(2) in the embodiment corresponding to FIG. 5A(1) to FIG. 5A(6). The user interfaces involved in the implementation process of S703 are not described in detail herein.

S704: Display an interface of another screen in the desktop editing mode in response to a second switching operation inputted by the user on the third interface, where the another screen is a screen of the desktop other than the target screen and the first interface.

The second switching operation may be, for example, a leftward swiping operation a rightward swiping operation.

It should be noted that, for user interfaces involved in the implementation process of S704, refer to the relevant descriptions regarding the process in which the mobile phone switches from FIG. 5A(2) to FIG. 5A(3), the process in which the mobile phone switches from FIG. 5A(4) to FIG. 5A(5), and the process in which the mobile phone switches from FIG. 5A(5) to FIG. 5A(6) in the embodiment corresponding to FIG. 5A(1) to FIG. 5A(6). The user interfaces involved in the implementation process of S704 are not described in detail herein.

S705: Display the second interface or the first interface in response to an operation used for exiting the desktop editing mode inputted by the user on the third interface, to exit the desktop editing mode.

The operation used for exiting the desktop editing mode may be, for example, a pinch-out operation or a tapping operation.

Optionally, for a process in which the mobile phone displays the second interface in response to the operation used for exiting the desktop editing mode inputted by the user on the third interface, refer to the relevant description regarding the process in which the mobile phone switches from FIG. 5B(1) to FIG. 5B(2) in the embodiment corresponding to FIG. 5B(1) to FIG. 5B(5).

Optionally, for a process in which the mobile phone displays the first interface in response to the operation used for exiting the desktop editing mode inputted by the user on the third interface, refer to the relevant description regarding the process in which the mobile phone switches from FIG. 5C(1) to FIG. 5C(2) in the embodiment corresponding to FIG. 5C(1) to FIG. 5C(3). User interfaces involved in the implementation process of S705 are not described in detail herein.

S706: Skip responding when receiving, at a third time point, a long press operation or a dragging operation performed by the user on a target card on the second interface after exiting the desktop editing mode.

The third time point is later than the first time point and earlier than the second time point.

It should be noted that, for user interfaces involved in the implementation process of S706, refer to the embodiment corresponding to FIG. 5B(3). The user interfaces involved in the implementation process of S706 are not described in detail herein.

S707: Connect the electronic device to a network in response to a networking operation after exiting the desktop editing mode.

Optionally, the networking operation may be as follows. The user installs a subscriber identification module (SIM) card in the electronic device, so that the electronic device is triggered to connect to the network. Alternatively, the user taps a wireless local area network connection control, to trigger the electronic device to connect to the network.

In response to the networking operation, the mobile phone is connected to the network.

The network may include a wide area network. In an example, the connecting the electronic device to the network may include connecting to the wide area network (which may be the Internet) through a mobile communication network or a wireless local area network. Optionally, after being connected to the wide area network, the electronic device may obtain data through the network.

S708: Display a fourth interface at a second time point in response to the operation used for entering the desktop editing mode inputted by the user on the second interface after connecting to the network, where the fourth interface is an interface of the second interface in the desktop editing mode, and the second time point is later than the first time point.

It should be noted that, for user interfaces involved in the implementation process of S708, refer to the relevant description regarding the process in which the mobile phone switches from FIG. 6A(1) to FIG. 6A(2) in the embodiment corresponding to FIG. 6A(1) to FIG. 6A(3). The user interfaces involved in the implementation process of S708 are not described in detail herein.

S709: Display an editing menu of the target card in response to the long press operation performed by the user on the target card on the second interface after connecting to the network, where the editing menu includes a removal control for the target card.

The target card may be any card on the second interface.

It should be noted that, for user interfaces involved in the implementation process of S709, refer to the relevant description of FIG. 6B(1). The user interfaces involved in the implementation process of S709 are not described in detail herein.

S710: Display the second interface in response to an operation used for exiting the desktop editing mode inputted by the user on the fourth interface.

The operation used for exiting the desktop editing mode may be, for example, a pinch-out operation, or a tapping operation.

It should be noted that, for user interfaces involved in the implementation process of S10, refer to the relevant description regarding the process in which the mobile phone switches from FIG. 6A(2) to FIG. 6A(3) in the embodiment corresponding to FIG. 6A(1) to FIG. 6A(3). The user interfaces involved in the implementation process of S710 are not described in detail herein.

Figure 8:
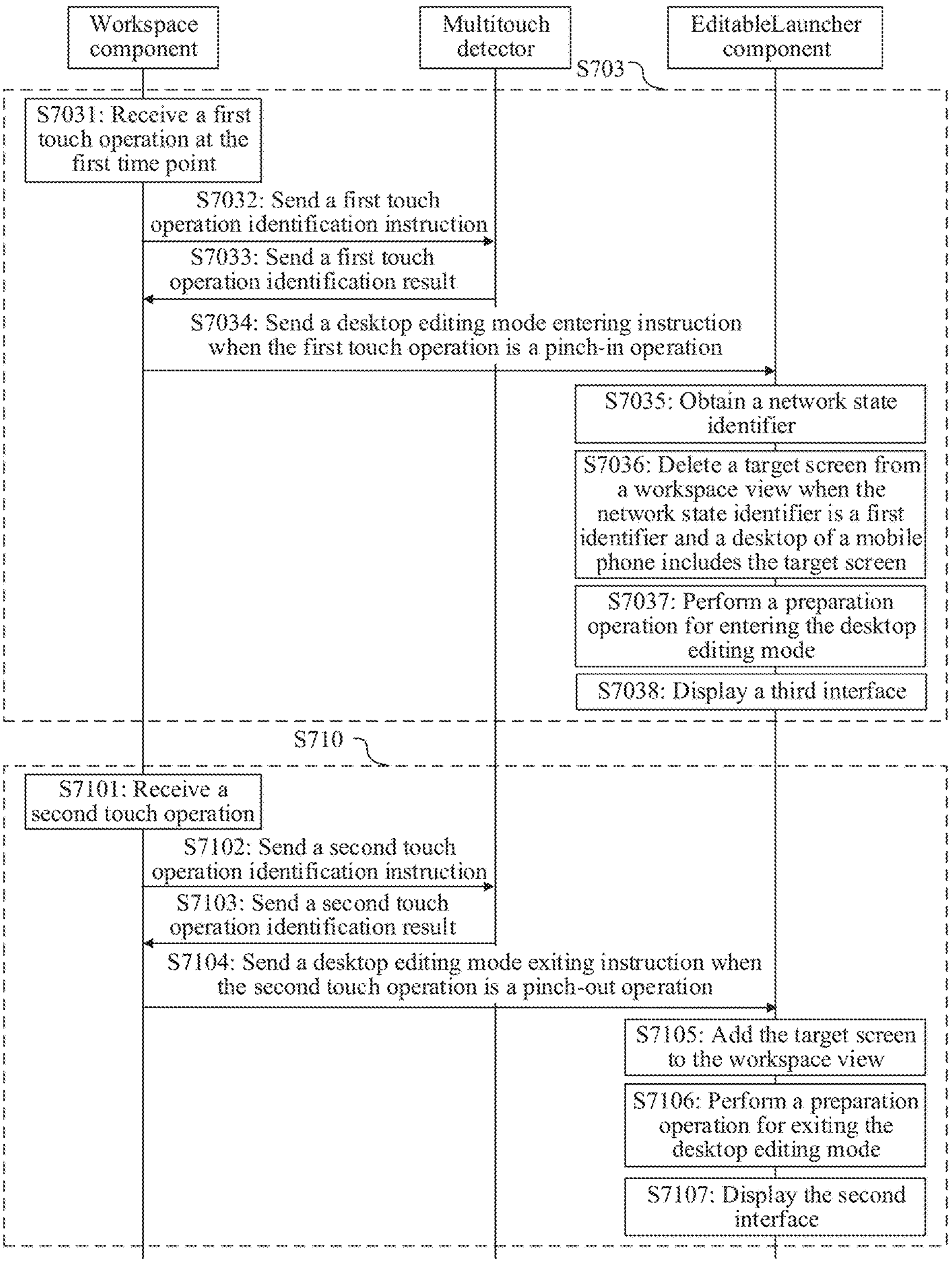
FIG. 8 is a timing diagram of an interface display method according to an embodiment of this application.

In a specific embodiment, S710 may be implemented through a plurality of components in the electronic device. In an example, S710 may include S7101 to S7107 in FIG. 8. Details are as follows.

S7101: A Workspace component receives a second touch operation.

S7102: The Workspace component sends a second touch operation identification instruction to a multitouch detector.

When receiving the second touch operation inputted by the user, the Workspace component may send the second touch operation identification instruction to the multitouch detector. The second touch operation identification instruction is used for instructing the multitouch detector to identify a type of the second touch operation.

S7103: The multitouch detector returns a second touch operation identification result to the Workspace component.

When receiving the second touch operation identification instruction, the multitouch detector may identify the type of the second touch operation, and return the type of the second touch operation (that is, the second touch operation identification result) to the Workspace component.

S7104: The Workspace component sends a desktop editing mode exiting instruction to an EditableLauncher component when the second touch operation is a pinch-out operation.

The desktop editing mode exiting instruction is used for instructing the mobile phone to exit the desktop editing mode.

S7105: The EditableLauncher component adds the target screen to a workspace view.

After receiving the desktop editing mode exiting instruction, the EditableLauncher component may add the target screen to the workspace (Workspace) view.

S7106: The EditableLauncher component performs a preparation operation for exiting the desktop editing mode.

It may be understood that, the preparation operation for exiting the desktop editing mode is the same as that in the related art. Details are not described herein.

S7107: The EditableLauncher component displays the second interface.

That the EditableLauncher component displays the second interface means that the mobile phone exits the desktop editing mode.

It may be learned from the above that, when the electronic device enters the desktop editing mode from the target screen of the desktop in a case that the electronic device was not connected to a network since the first power-on, the interface of the first interface in the desktop editing mode, that is, the third interface, is displayed. Moreover, when the user inputs the second switching operation on the third interface, the electronic device displays the interface of the another screen in the desktop editing mode. The another screen is a screen of the desktop other than the target screen and the first interface. In other words, the electronic device does not display an editing interface of the target screen. Because the user cannot edit the target screen when the electronic device was not connected to a network since the first power-on, effective promotion of a card function of the electronic device can be achieved. In addition, when the electronic device enters the desktop editing mode from the target screen of the desktop in a case that the electronic device was connected to a network since the first power-on, the electronic device displays the interface of the second interface in the desktop editing mode, that is, the fourth interface. The user can edit the target screen when the electronic device was connected to a network after the first power-on. That the electronic device was connected to a network means that the electronic device completes effective promotion of the card function. In this case, the user is allowed to edit the target screen, which can improve usage experience for the user.

Scenario II: Desktop Element Dragging Mode

In this embodiment of this application, the interface display method varies when the mobile phone enters the desktop element dragging mode in different network states. The interface display method also varies when the mobile phone exits the desktop element dragging mode in different network states.

Interface display methods for two cases in which the mobile phone enters the desktop element dragging mode and exits the desktop element dragging mode in the first network state and in the second network state are respectively described below.

Case 1: The mobile phone enters the desktop element dragging mode and exits the desktop element dragging mode in the first network state.

Referring to FIG. 1A to FIG. 1F, when the mobile phone is in the first network state, the user may drag a desktop element on any screen of the desktop of the mobile phone other than the leftmost home screen 13 and the second right screen 12 to any another screen other than the leftmost home screen 13 and the second right screen 12.

For ease of understanding, a description is provided below by using an example in which the user drags a desktop element on the rightmost home screen 11 of the desktop of the mobile phone rightward when the mobile phone is in the first network state. FIG. 9A(1) to FIG. 9C(4) are schematic diagrams of user interfaces that may be involved when a mobile phone enters a desktop element dragging mode and exits the desktop element dragging mode in a first network state according to an embodiment of this application.

As shown in FIG. 9A(1), when the mobile phone is in the first network state and a user interface currently displayed on the mobile phone is a rightmost home screen 11 of a desktop of the mobile phone, a user may perform a long press operation on any application icon (for example, an icon of an email APP) on the rightmost home screen 11. When receiving the long press operation performed by the user on the icon of the email APP, the mobile phone may blur display areas on the rightmost home screen 11 other than a status bar, highlight the icon of the email APP, and display an editing menu 111 of the email APP. Optionally, the editing menu 111 may include an uninstall control, a sharing control, and the like of the email APP. When the user drags the icon of the email APP after performing the long press operation on the icon of the email APP, the mobile phone may display a rightmost home screen 11 in the desktop element dragging mode as shown in FIG. 9A(2), and does not display the editing menu 111 of the email APP.

Optionally, when the user enables a leftmost home screen of the desktop of the mobile phone, as shown in FIG. 9A(2), a quantity of first navigation points on the rightmost home screen 11 in the desktop element dragging mode is less than the quantity of the first navigation points on the rightmost home screen 11 shown in FIG. 1B by 2. Optionally, when the user disables the leftmost home screen of the desktop of the mobile phone, the quantity of the first navigation points on the rightmost home screen 11 in the desktop element dragging mode is less than the quantity of the first navigation points on the rightmost home screen 11 shown in FIG. 1B by 1.

Still referring to FIG. 9A(2), when the mobile phone detects that the user drags the icon of the email APP to a rightmost side of the rightmost home screen 11 and further drags rightward, the mobile phone may display a first blank screen 91 in the desktop element dragging mode shown in FIG. 9A(3), so that the user drags the icon of the email APP to the first blank screen 91 in the desktop element dragging mode. The first blank screen 91 is a screen newly added by the mobile phone to the desktop of the mobile phone in the desktop element dragging mode.

As shown in FIG. 9A(3), when the user drags the icon of the email APP to the first blank screen 91 in the desktop element dragging mode but does not release the icon of the email APP, a quantity of first navigation points on the first blank screen 91 in the desktop element dragging mode is greater than the quantity of the first navigation points on the rightmost home screen 11 in the desktop element dragging mode by 1.

After the user releases the icon of the email APP, the mobile phone exits the desktop element dragging mode and displays a first blank screen 91 shown in FIG. 9A(4). The first blank screen 91 includes the icon of the email APP, and a quantity of first navigation points on the first blank screen 91 in the desktop element dragging mode is greater than a quantity of first navigation points on the rightmost home screen 11 shown in FIG. 9A(1) by 1.

Case 2: The mobile phone enters the desktop element dragging mode and exits the desktop element dragging mode in the second network state.

When the mobile phone is in the second network state, the user may drag a desktop element on any screen of the desktop of the mobile phone other than the leftmost home screen 13 to any another screen other than the leftmost home screen 13.

In an example, as shown in FIG. 9B, the user may drag a desktop element on a rightmost home screen 11 to a second right screen 12.

Specifically, as shown in FIG. 9B(1), when the mobile phone is in the second network state and a user interface currently displayed on the mobile phone is a rightmost home screen 11 of a desktop of the mobile phone, a user may perform a long press operation on any application icon (for example, an icon of an email application) on the rightmost home screen 11. When receiving the long press operation performed by the user on the icon of the email APP, the mobile phone may blur display areas on the rightmost home screen 11 other than a status bar, highlight the icon of the email APP, and display an editing menu 111 of the email APP. Optionally, the editing menu 111 may include an uninstall control, a sharing control, and the like of the email APP. When the user drags the email APP after the long press operation, the mobile phone may display a rightmost home screen 11 in the desktop element dragging mode as shown in FIG. 9B(2), and does not display the editing menu 111 of the email APP.

Optionally, when the user enables a leftmost home screen of the desktop of the mobile phone, as shown in FIG. 9B(2), a quantity of first navigation points on the rightmost home screen 11 in the desktop element dragging mode is less than the quantity of first navigation points on the rightmost home screen 11 shown in FIG. 1B by 2. Optionally, when the user disables the leftmost home screen of the desktop of the mobile phone, the quantity of the first navigation points on the rightmost home screen 11 in the desktop element dragging mode is less than the quantity of the first navigation points on the rightmost home screen 11 shown in FIG. 1B by 1.

Still referring to FIG. 9B(2), when the mobile phone detects that the user drags the icon of the email APP to a rightmost side of the rightmost home screen 11 and further drags rightward, the mobile phone may display a second right screen 12 in the desktop element dragging mode shown in FIG. 9B(3). A quantity of first navigation points on the second right screen 12 in the desktop element dragging mode is equal to the quantity of the first navigation points on the rightmost home screen 11 in the desktop element dragging mode.

As shown in FIG. 9B(3), when the user drags the icon of the email APP to the second right screen 12 in the desktop element dragging mode but does not release the icon of the email APP, the quantity of the first navigation points on the second right screen 12 in the desktop element dragging mode remains unchanged.

After the user releases the icon of the email APP, the mobile phone exits the desktop element dragging mode and displays an edited second right screen 12 shown in FIG. 9B(4). In addition to original cards, the edited second right screen 12 further includes the icon of the email APP. When the user enables a leftmost home screen of the desktop of the mobile phone, as shown in FIG. 9B(4), a quantity of first navigation points on the edited second right screen 12 is greater than a quantity of first navigation points on the second right screen 12 in the desktop element dragging mode shown in FIG. 9B(3) by 1. When the user disables the leftmost home screen of the desktop of the mobile phone, the quantity of the first navigation points on the edited second right screen 12 is equal to the quantity of the first navigation points on the second right screen 12 in the desktop element dragging mode.

It may be learned from the above that, when the mobile phone is in the second network state, the mobile phone allows the user to drag desktop elements on screens other than the second right screen 12 and the leftmost home screen to the second right screen 12 of the desktop of the mobile phone.

In an example, as shown in FIG. 9C(1) to FIG. 9C(4), the user may further drag a card on the second right screen 12 to a newly added screen.

Specifically, as shown in FIG. 9C(1), if the mobile phone receives a long press operation performed by the user on any card (for example, a video card 124) on the second right screen 12, the mobile phone may blur display areas on the second right screen 12 other than a status bar, highlight the video card 124, and display an editing menu 125 of the video card 124. Optionally, the editing menu 125 may include a removal control for the video card 124. Optionally, the editing menu 125 may further include another editing control for the video card 124. This is not specially limited in this embodiment of this application.

When the user drags the video card 124 after performing the long press operation on the video card, the mobile phone may display a second right screen 12 in the desktop element dragging mode shown in (2) in FIG. 9C, and does not display the editing menu 125 of the video card 124.

Figure 1F:
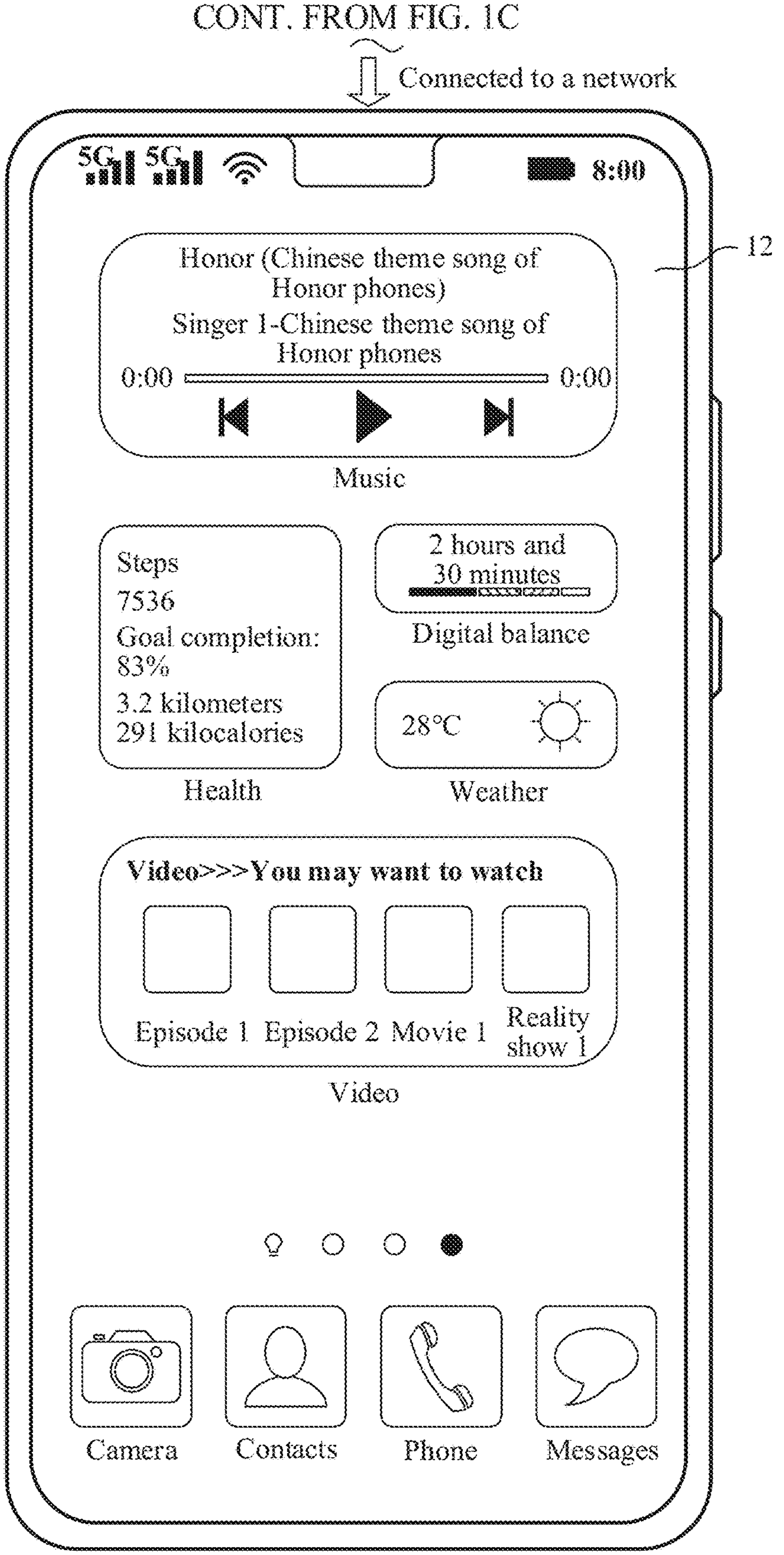

Optionally, when the user enables a leftmost home screen of the desktop of the mobile phone, a quantity of first navigation points on the second right screen 12 in the desktop element dragging mode shown in FIG. 9C(2) is less than the quantity of the first navigation points on the second right screen 12 shown in FIG. 1F by 1. Optionally, when the user disables the leftmost home screen of the desktop of the mobile phone, the quantity of the first navigation points on the second right screen 12 in the desktop element dragging mode shown in FIG. 9C(2) is equal to the quantity of the first navigation points on the second right screen 12 shown in FIG. 1F.

As shown in FIG. 9C(2), when the user drags the video card 124 to a rightmost side of the second right screen 12 and further drags the video card rightward, the mobile phone may display a third right screen 92 of the desktop of the mobile phone in the desktop element dragging mode shown in FIG. 9C(3). The third right screen 92 of the desktop of the mobile phone is a screen newly added by the mobile phone to a right side of the second right screen 12.

Optionally, as shown in FIG. 9C(3), when the user does not release the video card 124, a quantity of first navigation points on the third right screen 92 of the desktop of the mobile phone in the desktop element dragging mode is greater than the quantity of the first navigation points on the second right screen 12 in the desktop element dragging mode shown in FIG. 9C(2) by 1.

When the user releases the video card 124 on the third right screen 92, the mobile phone may display a third right screen 92 shown in FIG. 9C(4). Optionally, when the user enables the leftmost home screen of the desktop of the mobile phone, a quantity of first navigation points on the third right screen 92 in the desktop element dragging mode shown in FIG. 9C(4) is greater than the quantity of the first navigation points on the third right screen 92 in the desktop element dragging mode shown in FIG. 9C(3) by 1. Optionally, when the user disables the leftmost home screen of the desktop of the mobile phone, the quantity of the first navigation points on the third right screen 92 shown in FIG. 9C(4) is equal to the quantity of the first navigation points on the third right screen 92 in the desktop element dragging mode shown in FIG. 9C(3).

In an example, as shown in FIG. 9D, the user may further drag a card on the second right screen 12 to the rightmost home screen 11.

Specifically, as shown in FIG. 9D(1), if the mobile phone receives a long press operation performed by the user on a video card 124 on the second right screen 12, the mobile phone may blur display areas on the second right screen 12 other than a status bar, highlight the video card 124, and display an editing menu 125 of the video card 124. When the user drags the video card 124 after performing the long press operation on the video card, the mobile phone may display a second right screen 12 in the desktop element dragging mode shown in (2) in FIG. 9D, and does not display the editing menu 125 of the video card 124.

As shown in FIG. 9D(2), when the user drags the video card 124 to a leftmost side of the second right screen 12 and further drags the video card leftward, the mobile phone may display a rightmost home screen 11 of the desktop of the mobile phone in the desktop element dragging mode shown in FIG. 9D(3). A quantity of first navigation points on the rightmost home screen 11 of the desktop of the mobile phone in the desktop element dragging mode is equal to the quantity of the first navigation points on the second right screen 12 in the desktop element dragging mode.

When the user releases the video card 124 on the rightmost home screen 11, the mobile phone may display a rightmost home screen 11 shown in FIG. 9D(4). Optionally, when the user enables the leftmost home screen of the desktop of the mobile phone, a quantity of first navigation points on the rightmost home screen 11 shown in FIG. 9D(4) is greater than the quantity of the first navigation points on the rightmost home screen 11 in the desktop element dragging mode shown in FIG. 9D(3) by 1. Optionally, when the user disables the leftmost home screen of the desktop of the mobile phone, the quantity of the first navigation points on the rightmost home screen 11 shown in FIG. 9D(4) is equal to the quantity of the first navigation points on the rightmost home screen 11 in the desktop element dragging mode shown in FIG. 9D(3).

It may be learned from the above that, when the mobile phone is in the second network state, the mobile phone allows the user to drag any card on the second right screen 12 to any screen of the desktop of the mobile phone other than the leftmost home screen. In other words, when the mobile phone is in the second network state, an editable attribute of the second right screen 12 is the same as an editable attribute of any screen of the desktop of the mobile phone other than the second right screen 12 and the leftmost home screen 13.

It may be learned from the above that, when the mobile phone was not connected to a network since the power-on, the mobile phone neither allows the user to drag an interface element of another screen of the desktop of the mobile phone to the target screen, nor allows the user to drag a card on the target screen to another screen. In other words, the user is not allowed to edit the target screen, thereby achieving effective recommendation of the card function of the mobile phone.

Based on the same technical concept, an embodiment of this application further provides an electronic device. The electronic device may include a display, one or more processors, and one or more memories. The one or more memories store one or more computer programs. The one or more computer programs includes instructions. The instructions, when executed by the one or more processors, cause the electronic device to perform one or more steps of any one of the above methods.

Based on the same technical concept, an embodiment of this application further provides a computer-readable storage medium. The computer-readable storage medium stores a computer-executable program. The computer-executable program, when invoked by a computer, causes the computer to perform one or more steps of any one of the above methods.

Based on the same technical concept, an embodiment of this application further provides a chip system. The chip system includes a processor. The processor is coupled to a memory. The processor is configured to execute a computer-executable program stored in the memory, to implement one or more steps of any one of the above methods. The chip system may be a single chip or a chip module composed of a plurality of chips.

Based on the same technical concept, an embodiment of this application provides a computer-executable program product. The computer-executable program product, when running on an electronic device, causes the electronic device to perform one or more steps of any one of the above methods.

In the above embodiments, the descriptions of the embodiments have respective focuses. For a part not described in detail in an embodiment, refer to relevant descriptions in other embodiments. It should be understood that the sequence number of each step in the above embodiments does not mean the order of execution, and the order of execution of each process should be determined by a function and an internal logic of the process, and should not constitute any limitation on the implementation process of embodiments of this application.

All or some of the above embodiments may be implemented by using software, hardware, firmware, or any combination thereof. When embodiments are implemented by using software, all or some of the embodiments may be implemented in a form of a computer program product. The computer program product includes one or more computer instructions. When the computer program instructions are loaded and executed on a computer, all or some of the processes or functions according to embodiments of this application are generated. The computer may be a general-purpose computer, a dedicated computer, a computer network, or another programmable apparatus. The computer instruction may be stored in a computer-readable storage medium, or may be transmitted by using the computer-readable storage medium. The computer instructions may be transmitted from a website, a computer, a server, or a data center to another website, computer, server, or data center in a wired manner (for example, a coaxial cable, an optical fiber, or a digital subscriber line) or a wireless manner (for example, infrared, radio, or microwave). The computer-readable storage medium may be any usable medium that can be accessed by a computer, or may be a data storage device, such as a server or a data center in which one or more usable mediums are integrated. The usable medium may be a magnetic medium (for example, a soft disk, a hard disk, or a magnetic tape), an optical medium (for example, a DVD), a semiconductor medium (for example, a solid state disk (SSD)), or the like.

A person of ordinary skill in the art may understand that all or some of the processes in the methods in the above embodiments may be implemented by a computer program by instructing relevant hardware. The program may be stored in a computer-readable storage medium. When the program is executed, the processes of the above method embodiments may be performed. The storage medium includes any medium that can store program code, such as a ROM, a random access memory RAM, a magnetic disk, or an optical disc.

The above descriptions are merely specific implementations of embodiments of this application, but the protection scope of embodiments of this application is not limited thereto. Any variation or replacement within the technical scope disclosed in embodiments of this application shall fall within the protection scope of embodiments of this application. Therefore, the protection scope of embodiments of this application shall be subject to the protection scope of the claims.

The invention claimed is:

1. An interface display method, wherein the interface display method is applied to an electronic device, and comprises:

displaying a first interface;

displaying a second interface in response to a first switching operation inputted by a user on the first interface, wherein the second interface is a target screen of a desktop of the electronic device, and the target screen is configured to display a pre-recommended card;

displaying a third interface at a first time point in response to an operation used for entering a desktop editing mode inputted by the user on the second interface, wherein the third interface is an interface of the first interface in the desktop editing mode, and the electronic device was not connected to a network since first power-on to the first time point;

displaying an interface of another screen in the desktop editing mode in response to a second switching operation inputted by the user on the third interface, wherein the another screen is a screen of the desktop other than the target screen and the first interface;

connecting the electronic device to a network in response to a networking operation, after the desktop editing mode is exited; and after connecting to the network, displaying a fourth interface at a second time point in response to the operation used for entering the desktop editing mode inputted by the user on the second interface wherein the fourth interface is an interface of the second interface in the desktop editing mode, and the second time point is later than the first time point.

2. The interface display method according to claim 1, wherein each of the first interface, the second interface, the third interface, and the fourth interface comprises first navigation points, and a quantity of the first navigation points on the first interface is equal to a quantity of the first navigation points on the second interface;

when a leftmost home screen of the desktop is enabled, a quantity of the first navigation points on the third interface is less than the quantity of the first navigation points on the first interface by 2, and a quantity of the first navigation points on the fourth interface is less than the quantity of the first navigation points on the first interface by 1; and when the leftmost home screen of the desktop is disabled, the quantity of the first navigation points on the third interface is less than the quantity of the first navigation points on the first interface by 1, and the quantity of the first navigation points on the fourth interface is equal to the quantity of the first navigation points on the first interface.

3. The interface display method according to claim 1, wherein an application icon and/or a widget is displayed in a first display area of the first interface, and an application icon is displayed in a second display area of the first interface; and wherein the third interface does not comprise the application icon displayed in the second display area of the first interface.

4. The interface display method according to claim 3, wherein the third interface further comprises a thumbnail page of the first interface, a desktop editing option, and two screen addition page navigation points; and wherein the thumbnail page comprises the application icon/or the widget displayed in the first display area of the first interface.

5. The interface display method according to claim 1, wherein after the displaying the third interface and before exiting the desktop editing mode, the interface display method further comprises:

displaying the second interface or the first interface in response to an operation used for exiting the desktop editing mode inputted by the user on the third interface, to exit the desktop editing mode.

6. The interface display method according to claim 5, wherein after the exiting the desktop editing mode and before the connecting to the network, the interface display method further comprises:

skipping responding when receiving, at a third time point, a long press operation or a dragging operation performed by the user on a target card on the second interface, wherein the third time point is later than the first time point and earlier than the second time point.

7. The interface display method according to claim 6, wherein after the connecting to the network, the interface display method further comprises:

displaying an editing menu of the target card in response to the long press operation performed by the user on the target card on the second interface, wherein the editing menu comprises a removal control for the target card.

8. The interface display method according to claim 1, wherein after the displaying the fourth interface, the interface display method further comprises:

displaying the second interface in response to an operation used for exiting the desktop editing mode inputted by the user on the fourth interface.

9. An electronic device, comprising:

one or more memories storing one or more computer-executable programs; and one or more processors configured to execute the one or more computer-executable programs to cause the electronic device to perform an interface display method comprising:

displaying a first interface;

displaying a second interface in response to a first switching operation inputted by a user on the first interface, wherein the second interface is a target screen of a desktop of the electronic device, and the target screen is configured to display a pre-recommended card;

displaying a third interface at a first time point in response to an operation used for entering a desktop editing mode inputted by the user on the second interface, wherein the third interface is an interface of the first interface in the desktop editing mode, and the electronic device was not connected to a network since first power-on to the first time point;

displaying an interface of another screen in the desktop editing mode in response to a second switching operation inputted by the user on the third interface, wherein the another screen is a screen of the desktop other than the target screen and the first interface;

connecting the electronic device to a network in response to a networking operation, after the desktop editing mode is exited; and after connecting to the network, displaying a fourth interface at a second time point in response to the operation used for entering the desktop editing mode inputted by the user on the second interface wherein the fourth interface is an interface of the second interface in the desktop editing mode, and the second time point is later than the first time point.

10. The electronic device according to claim 9, wherein each of the first interface, the second interface, the third interface, and the fourth interface comprises first navigation points, and a quantity of the first navigation points on the first interface is equal to a quantity of the first navigation points on the second interface;

when a leftmost home screen of the desktop is enabled, a quantity of the first navigation points on the third interface is less than the quantity of the first navigation points on the first interface by 2, and a quantity of the first navigation points on the fourth interface is less than the quantity of the first navigation points on the first interface by 1; and when the leftmost home screen of the desktop is disabled, the quantity of the first navigation points on the third interface is less than the quantity of the first navigation points on the first interface by 1, and the quantity of the first navigation points on the fourth interface is equal to the quantity of the first navigation points on the first interface.

11. The electronic device according to claim 9, wherein an application icon and/or a widget is displayed in a first display area of the first interface, and an application icon is displayed in a second display area of the first interface; and wherein the third interface does not comprise the application icon displayed in the second display area of the first interface.

12. The electronic device according to claim 11, wherein the third interface further comprises a thumbnail page of the first interface, a desktop editing option, and two screen addition page navigation points; and wherein the thumbnail page comprises the application icon/or the widget displayed in the first display area of the first interface.

13. The electronic device according to claim 9, wherein after the displaying the third interface and before exiting the desktop editing mode, the interface display method further comprises:

displaying the second interface or the first interface in response to an operation used for exiting the desktop editing mode inputted by the user on the third interface, to exit the desktop editing mode.

14. The electronic device according to claim 13, wherein after the exiting the desktop editing mode and before the connecting to the network, the interface display method further comprises:

skipping responding when receiving, at a third time point, a long press operation or a dragging operation performed by the user on a target card on the second interface, wherein the third time point is later than the first time point and earlier than the second time point.

15. The electronic device according to claim 14, wherein after the connecting to the network, the interface display method further comprises:

displaying an editing menu of the target card in response to the long press operation performed by the user on the target card on the second interface, wherein the editing menu comprises a removal control for the target card.

16. The electronic device according to claim 9, wherein after the displaying fourth interface, the interface display method further comprises:

displaying the second interface in response to an operation used for exiting the desktop editing mode inputted by the user on the fourth interface.

17. A non-transitory computer-readable storage medium storing a computer-executable program that, when invoked by a computer, causes the computer to perform an interface display method comprising:

displaying a first interface;

displaying a second interface in response to a first switching operation inputted by a user on the first interface, wherein the second interface is a target screen of a desktop of the electronic device, and the target screen is configured to display a pre-recommended card;

displaying a third interface at a first time point in response to an operation used for entering a desktop editing mode inputted by the user on the second interface, wherein the third interface is an interface of the first interface in the desktop editing mode, and the electronic device was not connected to a network since first power-on to the first time point;

displaying an interface of another screen in the desktop editing mode in response to a second switching operation inputted by the user on the third interface, wherein the another screen is a screen of the desktop other than the target screen and the first interface;

connecting the electronic device to a network in response to a networking operation, after the desktop editing mode is exited; and after connecting to the network, displaying a fourth interface at a second time point in response to the operation used for entering the desktop editing mode inputted by the user on the second interface wherein the fourth interface is an interface of the second interface in the desktop editing mode, and the second time point is later than the first time point.

18. The computer-readable storage medium according to claim 17, wherein each of the first interface, the second interface, the third interface, and the fourth interface comprises first navigation points, and a quantity of the first navigation points on the first interface is equal to a quantity of the first navigation points on the second interface;

when a leftmost home screen of the desktop is enabled, a quantity of the first navigation points on the third interface is less than the quantity of the first navigation points on the first interface by 2, and a quantity of the first navigation points on the fourth interface is less than the quantity of the first navigation points on the first interface by 1; and when the leftmost home screen of the desktop is disabled, the quantity of the first navigation points on the third interface is less than the quantity of the first navigation points on the first interface by 1, and the quantity of the first navigation points on the fourth interface is equal to the quantity of the first navigation points on the first interface.

* * * * *